US012388582B2

United States Patent
Zhang et al.

(10) Patent No.: US 12,388,582 B2
(45) Date of Patent: Aug. 12, 2025

(54) RESOURCE CONFIGURATION METHOD AND APPARATUS

(71) Applicant: Huawei Technologies Co., Ltd., Shenzhen (CN)

(72) Inventors: Xingxin Zhang, Chengdu (CN); Hang Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 449 days.

(21) Appl. No.: 17/887,615

(22) Filed: Aug. 15, 2022

(65) Prior Publication Data

US 2022/0393810 A1 Dec. 8, 2022

Related U.S. Application Data

(63) Continuation of application No. PCT/CN2020/075409, filed on Feb. 14, 2020.

(51) Int. Cl.
| | | |
|---|---|---|
| *H04W 4/40* | (2018.01) | |
| *H04L 5/00* | (2006.01) | |
| *H04W 72/044* | (2023.01) | |
| *H04W 72/20* | (2023.01) | |

(52) U.S. Cl.
CPC ......... *H04L 5/0005* (2013.01); *H04W 72/044* (2013.01); *H04W 72/20* (2023.01); *H04W 4/40* (2018.02)

(58) Field of Classification Search
CPC ............................. H04W 72/20; H04W 72/044
USPC .......................................... 370/329, 400, 401
See application file for complete search history.

(56) References Cited

U.S. PATENT DOCUMENTS

| | | |
|---|---|---|
| 2005/0169205 A1 | 8/2005 | Grilli et al. |
| 2012/0275394 A1 | 11/2012 | Gunnarsson et al. |
| 2013/0279392 A1 | 10/2013 | Rubin et al. |
| 2015/0018027 A1 | 1/2015 | Noh et al. |
| 2017/0079070 A1 | 3/2017 | Lu |

(Continued)

FOREIGN PATENT DOCUMENTS

| | | |
|---|---|---|
| CN | 103796323 A | 5/2014 |
| CN | 104283636 A | 1/2015 |

(Continued)

OTHER PUBLICATIONS

R1-1910650, Intel Corporation, "Resource Allocation Mode-2 for NR V2X Sidelink Communication," 3GPP TSG RAN WG1 Meeting #98bis, Oct. 8, 2019, 28 pages.

(Continued)

*Primary Examiner* — Dang T Ton
(74) *Attorney, Agent, or Firm* — Conley Rose, P.C.

(57) ABSTRACT

A resource configuration method includes: determining a first time-frequency resource used by at least one second apparatus; determining a target time-frequency resource used by the at least one second apparatus; and sending first information, where the first information is used to indicate at least one of a first time domain resource offset and a first frequency domain resource offset, the first time domain resource offset is an offset from the first time-frequency resource to the target time-frequency resource in time domain, or the first frequency domain resource offset is an offset from the first time-frequency resource to the target time-frequency resource in frequency domain.

20 Claims, 31 Drawing Sheets

(56) References Cited

U.S. PATENT DOCUMENTS

| | | | |
|---|---|---|---|
| 2019/0141590 A1 | | 5/2019 | Li et al. |
| 2019/0149365 A1 | | 5/2019 | Chatterjee et al. |
| 2019/0357224 A1 | | 11/2019 | Li et al. |
| 2021/0185645 A1 | | 6/2021 | Huang et al. |
| 2021/0377956 A1 | | 12/2021 | Lee et al. |
| 2023/0354185 A1 | * | 11/2023 | Liu .................. H04W 52/0229 |

FOREIGN PATENT DOCUMENTS

| | | |
|---|---|---|
| CN | 106534233 A | 3/2017 |
| CN | 108200650 A | 6/2018 |
| CN | 108282879 A | 7/2018 |
| CN | 109219146 A | 1/2019 |
| CN | 110035536 A | 7/2019 |
| EP | 3836687 A1 | 6/2021 |
| WO | 2018127001 A1 | 7/2018 |
| WO | 2018145225 A1 | 8/2018 |
| WO | 2020027637 A1 | 2/2020 |
| WO | 2020030116 A1 | 2/2020 |

OTHER PUBLICATIONS

R1-1904073, vivo, "Discussion on mode 1 resource allocation mechanism," 3GPP TSG RAN WG1 #96bis, Apr. 2, 2019, 9 pages.

* cited by examiner

RESOURCE CONFIGURATION METHOD AND APPARATUS

CROSS-REFERENCE TO RELATED APPLICATIONS

This is a continuation of International Patent Application No. PCT/CN2020/075409 filed on Feb. 14, 2020, which is hereby incorporated by reference in its entirety.

TECHNICAL FIELD

This disclosure relates to the field of intelligent cockpit technologies, and provides a resource configuration method and an apparatus. This disclosure further relates to the field of short-range communication technologies.

BACKGROUND

As self-driving technologies and intelligent cockpit technologies continuously develop, a vehicle driving task can be implemented by a machine in the future, and richer media & entertainment experience and office experience are provided in a vehicle by the intelligent cockpit technologies, so that the vehicle is not only a means of transportation, but also a living space for people.

Devices related in an intelligent cockpit include a cockpit domain controller (CDC) and a vehicle-mounted audio device (such as a speaker or a microphone). To avoid complex cabling in a narrow vehicle environment and reduce costs, a head unit is connected to the vehicle-mounted audio device in a wireless manner instead of an original wired manner.

Because a wireless channel/frequency band is usually shared in a wireless connection, in a short-range communication scenario, for example, in an area with a concentration of vehicles, further such as a traffic light intersection or a high-speed service area, time-frequency resources used by a plurality of vehicles are prone to overlap or conflict, accordingly causing communication interference. Such interference results in a transmission failure of a vehicle-mounted wireless audio signal, a packet loss, invalid noise cancellation function, and distortion of audio played by a loudspeaker, severely affects experience of a passenger in a vehicle, even causes a transmission failure or fault of a signal related to driving safety, and endangers driving security.

SUMMARY

Embodiments of this disclosure disclose a resource configuration method and an apparatus, to effectively reduce or even eliminate wireless transmission interference, especially transmission interference inside and outside a cockpit, and improve signal transmission performance and quality.

According to a first aspect, an embodiment of this disclosure provides a resource configuration method, the method may be applied to a first apparatus, and the method includes determining a first time-frequency resource used by at least one second apparatus, determining a target time-frequency resource used by the at least one second apparatus, and sending first information, where the first information is used to indicate at least one of a first time domain resource offset and a first frequency domain resource offset, and the first time domain resource offset is an offset from the first time-frequency resource to the target time-frequency resource in time domain, and/or the first frequency domain resource offset is an offset from the first time-frequency resource to the target time-frequency resource in frequency domain.

In this embodiment of this disclosure, the first time-frequency resource is a current time-frequency resource or an initial time-frequency resource used by the second apparatus. Further, the first time-frequency resource is a time-frequency resource that is configured by the first apparatus and used by the second apparatus.

Optionally, the first apparatus may be a CDC in a vehicle or another device that can manage and coordinate a wireless resource, or an element in the CDC or the device, for example, a chip or an integrated circuit. The second apparatus may be a vehicle-mounted device (for example, a speaker, a microphone, a camera, or a display), a non-vehicle-mounted device such as a mobile phone, or a headset, another device that can perform communication with the first apparatus, or an element in the foregoing device, for example, a chip or an integrated circuit. The first apparatus communicates with the second apparatus through a wireless connection. The CDC may also be referred to as a head unit. The following describes the solution only by using an example in which the CDC is replaced with the head unit. However, the first apparatus is not limited to only the CDC in this disclosure.

In this embodiment of this disclosure, information that needs to be carried on the first time-frequency resource may be transferred to the target time-frequency resource for transmission, to obtain better transmission quality.

For example, a width of a frequency domain range in which the target time-frequency resource is located is the same as a width of a frequency domain range in which the first time-frequency resource is located, and/or duration of a time domain range in which the target time-frequency resource is located is the same as duration of a time domain range in which the first time-frequency resource is located.

The first time domain resource offset represents a difference between the first time-frequency resource and the target time-frequency resource in time domain, and the first frequency domain resource offset represents a difference between the first time-frequency resource and the target time-frequency resource in frequency domain. The first information is used to indicate the first time domain resource offset and/or the first frequency domain resource offset. In a specific implementation, the first information may be a message carrying the first time domain resource offset and/or the first frequency domain resource offset, for example, a resource reconfiguration message, or other types of information. A message name and a message type that carry the first time domain resource offset and/or the first frequency domain resource offset are not limited in this embodiment of this disclosure.

It can be learned that a current time-frequency resource (namely, the first time-frequency resource) used by the at least one second apparatus (for example, a vehicle-mounted device) is adjusted in at least one dimension of time domain and frequency domain to obtain a new time-frequency resource (namely, the target time-frequency resource). Manners of adjusting the current time-frequency resource are diversified. The current time-frequency resources used by a plurality of second apparatuses are adjusted as a whole, thereby improving resource configuration efficiency, and implementing quick configuration of the time-frequency resources. For example, if the current time-frequency resource (namely, the first time-frequency resource) encounters interference, in this case, an adjustment operation is performed on the current time-frequency resource in frequency domain and/or time domain, so that the determined new time-frequency resource (namely, the target time-frequency resource) is not interfered with or interference to the new time-frequency resource is reduced compared with interference to the current time-frequency resource, thereby effectively reducing or even eliminating interference, and improving data transmission performance and quality.

With reference to the first aspect, in a possible embodiment, before determining a target time-frequency resource used by the at least one second apparatus, the method further includes determining that the first time-frequency resource is interfered with.

In this embodiment of this disclosure, that the first time-frequency resource is interfered with indicates that an interference signal is detected on the first time-frequency resource. In other words, a part or all of a time-frequency resource to which the interference signal is mapped on a wireless channel overlaps the first time-frequency resource in both frequency domain and time domain. Such interference results in a transmission failure of information carried on the first time-frequency resource and a packet loss, reduces data transmission quality, and causes an invalid noise cancellation function, audio playing distortion, and the like.

It can be learned that after it is determined that the current time-frequency resource (namely, the first time-frequency resource) is interfered with, the adjustment operation is performed on the current time-frequency resource in frequency domain and/or time domain, so that the determined new time-frequency resource (namely, the target time-frequency resource) is not interfered with or interference to the new time-frequency resource is reduced compared with interference to the current time-frequency resource, thereby effectively reducing or even eliminating interference.

With reference to the first aspect, in a possible embodiment, determining that the first time-frequency resource is interfered with includes detecting an interference signal on the first time-frequency resource, or receiving interference indication information from the at least one second apparatus, where the interference indication information indicates that the first time-frequency resource is interfered with.

In this embodiment of this disclosure, a manner of determining that the first time-frequency resource is interfered with may be that the first apparatus (for example, a head unit) detects that the interference signal exists on the first time-frequency resource, or may be that the at least one second apparatus (for example, a microphone or a speaker) wirelessly connected to the first apparatus reports, to the first apparatus, that the first time-frequency resource is interfered with.

It may be learned that the first time-frequency resource is interfered with may be determined and detected by the first apparatus, or may be detected by the second apparatus and then reported to the first apparatus. This diversifies manners of determining that the first time-frequency resource is interfered with, makes full use of time-frequency resources in an entire system to perform interference monitoring, and improves a resource coordination capability of a system in which the first apparatus and the second apparatus are located.

With reference to the first aspect, in a possible embodiment, the first information is further used to indicate at least one of a time domain offset direction and a frequency domain offset direction.

For example, the first information may explicitly indicate the time domain offset direction and/or the frequency domain offset direction. For example, "0" and "1" in 1 bit are used to indicate different time domain offset directions or different frequency domain offset directions. For example, "1" indicates upward (namely, a frequency increase direction) in frequency domain, and "1" indicates backward (namely, a time delay direction) in time domain. "0" indicates downward (namely, a frequency decrease direction) in frequency domain, and "0" indicates forward (namely, a time advance direction) in time domain. Certainly, in some possible embodiments, "0" and "1" may further represent other directions, and this is not limited in this disclosure. Alternatively, the first information may implicitly indicate the time domain offset direction and/or the frequency domain offset direction. That is, positive and negative values are used to indicate different time domain offset directions or different frequency domain offset directions. It can be learned that the first information indicates the time domain offset direction and/or the frequency domain offset direction in various manners, thereby improving resource configuration flexibility.

With reference to the first aspect, in a possible embodiment, the first information is carried in broadcast information.

In this embodiment of this disclosure, the first information may be carried in the broadcast information, and the broadcast information is sent on a broadcast channel. In other words, the first information may be sent to the at least one second apparatus in a broadcast manner on the broadcast channel. The broadcast information that carries the first information is sent once when the first information is broadcast once. Because the broadcast information carries one piece of first information, sending the broadcast information once means sending the first information once. The broadcast information that carries the first information may be sent on the broadcast channel once, or may be sent for a plurality of times. This is not limited in this embodiment of this disclosure.

It can be learned that the first information is sent in the broadcast manner to the plurality of second apparatuses that can perform communication with the first apparatus, so that the second apparatuses can quickly learn related configuration information for determining the target time-frequency resource, thereby improving time-frequency resource configuration efficiency.

With reference to the first aspect, in a possible embodiment, the first information includes enabling indication information, and the enabling indication information is used to indicate an enabled moment of the target time-frequency resource.

In this embodiment of this disclosure, the first information further includes the enabling indication information, and the enabling indication information is used to indicate the enabled moment of the target time-frequency resource. In other words, the enabling indication information indicates a moment at which configuration information is updated and the target time-frequency resource starts to be used. After the target time-frequency resource is enabled, data from the at least one second apparatus may be received, and/or data may be sent to the at least one second apparatus on the target time-frequency resource. It should be noted that the enabled moment of the target time-frequency resource is different from a start moment of communication transmission, and there is a possible scenario in which the target time-frequency resource starts to be enabled before communication is performed on the target time-frequency resource.

It can be learned that the enabling indication information may be used to ensure that the first apparatus side and the at least one second apparatus side synchronously enable the target time-frequency resource or simultaneously enable the target time-frequency resource. Enabling the target time-frequency resource is a prerequisite for communication between the first apparatus and the at least one second apparatus on the target time-frequency resource, and helps improve resource configuration and use efficiency.

With reference to the first aspect, in a possible embodiment, the enabling indication information includes duration information, and the duration information is used to indicate the enabled moment.

In this embodiment of this disclosure, the enabling indication information of the target time-frequency resource may be indicated by the duration information, and the duration information indicates a time interval. For example, the duration information may be 100 milliseconds (ms), 200 ms, 500 ms, 1 second(s), 1.2 s, 1.3 s, 1.7 s, or another value. For example, the duration information is 1 s. To be specific, timing starts after the first information is sent, and the target time-frequency resource is enabled after 1 s. It should be noted herein that there is a delay in sending and receiving the first information that carries the enabling indication information. For the first apparatus, the enabled moment of the target time-frequency resource is calculated based on a sending moment of the first information. For the second apparatus, the enabled moment of the target time-frequency resource is calculated based on a receiving moment of the first information. In this embodiment of this disclosure, the delay between sending and receiving of the first information may be ignored, that is, the first apparatus and the at least one second apparatus may synchronously enable the target time-frequency resource based on the enabling indication information.

It can be learned that when the enabling indication information is the duration information that represents a time interval, the first information including the duration information is sent by the first apparatus only once, so that the first apparatus and the at least one second apparatus can synchronously enable the target time-frequency resource, thereby implementing quick resource configuration with fewer control signaling overheads.

With reference to the first aspect, in a possible embodiment, the enabling indication information includes count information, and the count information is a quantity of remaining transmitted times of the broadcast information used to carry the first information.

In this embodiment of this disclosure, the enabling indication information of the target time-frequency resource may be indicated by the count information, and the count information is the quantity of remaining transmitted times of the broadcast information used to carry the first information. The quantity of remaining transmitted times represents a quantity of remaining to-be-sent times of the broadcast information that carries the first information. Because the broadcast information is sent in a specific period, the enabled moment of the target time-frequency resource may be calculated based on the sending period of the broadcast information and the quantity of remaining transmitted times. In some possible embodiments, the broadcast information including the first information is sent for a plurality of times, and each time the broadcast information carries one piece of first information. The count information in the first information decreases progressively with each time the broadcast information is sent. The target time-frequency resource is enabled when the count information decreases progressively to 0.

It can be learned that, when the enabling indication information is the count information indicating the quantity of remaining transmitted times, it means that the broadcast information including the first information is sent for a plurality of times. Because each time the broadcast information carries one piece of first information, that the broadcast information is sent for the plurality of times is equivalent to that the first information is sent for a plurality of times. This ensures robustness of receiving the first message by the second apparatus, and effectively avoids a case in which the enabled moment of the target time-frequency resource becomes invalid because the second apparatus misses the first information sent by the first apparatus.

With reference to the first aspect, in a possible embodiment, the first information further includes at least one group identifier, and an identifier of a group in which the at least one second apparatus is located belongs to the at least one group identifier included in the first information.

In this embodiment of this disclosure, the at least one second apparatus may be grouped in advance, and each of the at least one second apparatus has an identifier corresponding to a group. Optionally, the second apparatus may be grouped by the first apparatus, or may be grouped based on a factory setting of the second apparatus or a standard definition. It should be noted that grouping may be performed based on factors such as a function or a purpose and a position of the second apparatus. Quantities of second apparatuses in each group may be the same or may be different. This is not limited in this disclosure. The at least one group identifier may be specified in the first information, and the identifier of the group in which the at least one second apparatus corresponding to the first time-frequency resource and the target time-frequency resource is located belongs to the group identifier specified in the first information. The group identifier is introduced to assist in resource configuration, thereby improving resource configuration flexibility, and improving resource configuration efficiency.

With reference to the first aspect, in a possible embodiment, the first information further includes transmission direction indication information, and if the transmission direction indication information indicates an uplink direction, the first time-frequency resource and the target time-frequency resource are uplink time-frequency resources, or if the transmission direction indication information indicates a downlink direction, the first time-frequency resource and the target time-frequency resource are downlink time-frequency resources, or if the transmission direction indication information indicates an uplink direction and a downlink direction, the first time-frequency resource and the target time-frequency resource include an uplink time-frequency resource and a downlink time-frequency resource.

In this embodiment of this disclosure, the first information further includes the transmission direction indication information, and the transmission direction indication information indicates at least one of the uplink direction and the downlink direction. If the transmission direction indication information indicates the uplink direction (for example, a microphone sends audio data to a head unit), the first time-frequency resource and the target time-frequency resource are the uplink time-frequency resources, that is, the first time-frequency resource and the target time-frequency resource carry data from the at least one second apparatus. If the transmission direction indication information indicates the downlink direction (for example, a head unit sends audio data to a speaker), the first time-frequency resource and the target time-frequency resource are the downlink time-frequency resources, that is, the first time-frequency resource and the target time-frequency resource carry data to be sent to the at least one second apparatus. If the transmission direction indication information indicates the uplink direction and the downlink direction, the first time-frequency resource and the target time-frequency resource have both the uplink time-frequency resource and the downlink time-frequency resource. The transmission direction indication information is introduced to assist in resource configuration, thereby improving resource configuration flexibility, and improving resource configuration efficiency.

With reference to the first aspect, in a possible embodiment, the first information further includes transmission direction indication information and at least one group identifier, and when an identifier of a group in which the at least one second apparatus is located belongs to the at least one group identifier included in the first information, if the transmission direction indication information indicates an uplink direction, the first time-frequency resource and the target time-frequency resource are uplink time-frequency resources, or if the transmission direction indication information indicates a downlink direction, the first time-frequency resource and the target time-frequency resource are downlink time-frequency resources, or if the transmission direction indication information indicates an uplink direction and a downlink direction, the first time-frequency resource and the target time-frequency resource include an uplink time-frequency resource and a downlink time-frequency resource.

In this embodiment of this disclosure, the first information may include both the transmission direction indication information and the at least one group identifier. The transmission direction indication information is used to indicate at least one of the uplink direction and the downlink direction. When the identifier of the group in which the at least one second apparatus corresponding to the first time-frequency resource and the target time-frequency resource is located belongs to the group identifier included in the first information, the first time-frequency resource and the target time-frequency resource are at least one of the uplink time-frequency resource and the downlink time-frequency resource corresponding to the transmission direction indication information. In another implementation, the transmission direction indication information and the group identifier may also be carried in another sub-message different from the first information in the broadcast information. The transmission direction indication information and the group identifier are introduced to assist in resource configuration, thereby improving resource configuration flexibility, and improving resource configuration efficiency.

With reference to the first aspect, in a possible embodiment, the first frequency domain offset is an integer multiple of a frequency domain range of a minimum time-frequency resource unit, and/or the first time domain offset is an integer multiple of a time domain range of a minimum time-frequency resource unit.

In this embodiment of this disclosure, an offset from the first time-frequency resource to the target time-frequency resource may be performed by using the minimum time-frequency resource unit as a minimum granularity. In frequency domain, the first frequency domain offset is the integer multiple of the frequency domain range of the minimum time-frequency resource unit. In time domain, the first time domain offset is the integer multiple of the time domain range of the minimum time-frequency resource unit. It can be learned that the minimum time-frequency resource unit is used as the minimum adjustment granularity in time domain and frequency domain, thereby helping implement neat and standard division into time-frequency resources, and improving resource configuration efficiency.

With reference to the first aspect, in a possible embodiment, when a quantity of the at least one group identifier is N1, a quantity of the first time-frequency resource offsets indicated by the first information is N2 and/or a quantity of the first frequency domain resource offsets indicated by the first information is N2, where N1 is a positive integer greater than or equal to 1, N2 is a positive integer greater than or equal to 1, and N1 is greater than or equal to N2.

In this embodiment of this disclosure, the first time-frequency resource offset indicated by the first information may be considered as a to-be-offset and/or the first frequency domain resource offset indicated by the first information may be considered as a to-be-offset. In other words, there are three types of to-be-offsets: a time domain offset, a frequency domain offset, and both a time domain offset and a frequency domain offset. When the first information includes a plurality of group identifiers, the first information may indicate a plurality of to-be-offsets. When the quantity of group identifiers is equal to the quantity of to-be-offsets, each group identifier corresponds to one to-be-offset, and different group identifiers correspond to different to-be-offsets. When the quantity of group identifiers is greater than the quantity of to-be-offsets, each group identifier is no longer in a one-to-one correspondence with each offset, and one to-be-offset may correspond to a plurality of group identifiers. This can improve resource configuration flexibility, and improve resource configuration efficiency.

With reference to the first aspect, in a possible embodiment, when the enabling indication information is the count information, the broadcast information that carries the first information is sent a plurality of times, and the count information progressively decreases with each sending of the broadcast information.

According to a second aspect, an embodiment of this disclosure provides a resource configuration method, the method may be applied to a second apparatus, and the method includes receiving first information from a first apparatus, where the first information is used to indicate at least one of a first time domain resource offset and a first frequency domain resource offset, and determining a target time-frequency resource based on a first time-frequency resource and the first information, where the first time domain resource offset is an offset from the first time-frequency resource to the target time-frequency resource in time domain, and/or the first frequency domain resource offset is an offset from the first time-frequency resource to the target time-frequency resource in frequency domain.

In this embodiment of this disclosure, the first time-frequency resource is a current time-frequency resource or an initial time-frequency resource used by the second apparatus. Further, the first time-frequency resource is a time-frequency resource that is configured by the first apparatus and used by the second apparatus. The first information is used to indicate the offset of the first time-frequency resource in frequency domain and/or the offset of the first time-frequency resource in time domain. After receiving the first information sent by the first apparatus, the second apparatus determines the target time-frequency resource based on the first time-frequency resource and the first information. In other words, the second apparatus adjusts the first time-frequency resource in frequency domain and/or time domain based on the first information, to adjust the first time-frequency resource to the target time-frequency resource.

Optionally, the first apparatus may be a CDC in a vehicle or another device that can manage and coordinate a wireless resource, or an element in the CDC or the device, for example, a chip or an integrated circuit. The second apparatus may be a vehicle-mounted device (for example, a speaker, a microphone, a camera, or a display), a non-vehicle-mounted device such as a mobile phone, or a headset, another device that can perform communication with the first apparatus, or an element in the foregoing device, for example, a chip or an integrated circuit. The first apparatus communicates with the second apparatus through a wireless connection. The CDC may also be referred to as a head unit. The following describes the solution only by using an example in which the CDC is replaced with the head unit. However, the first apparatus is not limited to only the CDC in this disclosure.

It can be learned that a current time-frequency resource (namely, the first time-frequency resource) used by the second apparatus (for example, a vehicle-mounted device) is adjusted in at least one dimension of time domain and frequency domain to obtain a new time-frequency resource (namely, the target time-frequency resource). The current time-frequency resource is adjusted in various manners, thereby improving resource configuration efficiency and implementing quick time-frequency resource configuration. For example, if the current time-frequency resource (namely, the first time-frequency resource) is interfered with, in this case, the second apparatus performs an adjustment operation on the current time-frequency resource in frequency domain and/or time domain, so that the determined new time-frequency resource (namely, the target time-frequency resource) is not interfered with or interference to the new time-frequency resource is reduced compared with interference to the current time-frequency resource, thereby effectively reducing or even eliminating interference, and improving data transmission performance and quality.

With reference to the second aspect, in a possible embodiment, before receiving first information from a first apparatus, the method further includes sending interference indication information to the first apparatus, where the interference indication information indicates that the first time-frequency resource is interfered with.

In this embodiment of this disclosure, before receiving the first information, the second apparatus may further detect, on the first time-frequency resource, whether an interference signal exists. When detecting that the interference signal exists, the second apparatus may send, to the first apparatus, the interference indication information indicating that the first time-frequency resource is encountering interference.

It can be learned that the second apparatus performs detection on the current time-frequency resource (namely, the first time-frequency resource) and reports the detected interference to the first apparatus, thereby improving resource utilization efficiency. In addition, the adjustment is performed on the interfered with current time-frequency resource in time domain and/or frequency domain, thereby reducing or even eliminating interference.

With reference to the second aspect, in a possible embodiment, the first information is further used to indicate at least one of a time domain offset direction and a frequency domain offset direction.

For example, the first information may explicitly indicate the time domain offset direction and/or the frequency domain offset direction. For example, "0" and "1" in 1 bit are used to indicate different time domain offset directions or different frequency domain offset directions. For example, "1" indicates upward (namely, a frequency increase direction) in frequency domain, and "1" indicates backward (namely, a time delay direction) in time domain. "0" indicates downward (namely, a frequency decrease direction) in frequency domain, and "0" indicates forward (namely, a time advance direction) in time domain. Certainly, in some possible embodiments, "0" and "1" may further represent other directions, and this is not limited in this disclosure. Alternatively, the first information may implicitly indicate the time domain offset direction and/or the frequency domain offset direction. That is, positive and negative values are used to indicate different time domain offset directions or different frequency domain offset directions. It can be learned that the first information indicates the time domain offset direction and/or the frequency domain offset direction in various manners, thereby improving resource configuration flexibility.

With reference to the second aspect, in a possible embodiment, the first information is carried in broadcast information.

It can be learned that the first information may be carried in the broadcast information, and the broadcast information is sent on a broadcast channel. In other words, the first information may be sent to the at least one second apparatus in a broadcast manner on the broadcast channel. The broadcast information that carries the first information is sent once when the first information is broadcast once. Because the broadcast information carries one piece of first information, sending the broadcast information once means sending the first information once. The first information is sent in the broadcast manner to the second apparatus, so that the second apparatuses can quickly learn related configuration information for determining the target time-frequency resource, thereby improving time-frequency resource configuration efficiency.

With reference to the second aspect, in a possible embodiment, the first information includes enabling indication information, and the enabling indication information is used to indicate an enabled moment of the target time-frequency resource.

In this embodiment of this disclosure, the first information further includes the enabling indication information, and the enabling indication information is used to indicate the enabled moment of the target time-frequency resource. In other words, the enabling indication information indicates a moment at which configuration information is updated and the target time-frequency resource starts to be used. After the target time-frequency resource is enabled, data from the first apparatus may be received, or data may be sent to the first apparatus on the target time-frequency resource. It should be noted that the enabled moment of the target time-frequency resource is different from a start moment of communication transmission between the first apparatus and the second apparatus, and there is a possible scenario in which the target time-frequency resource starts to be enabled before communication is performed on the target time-frequency resource.

It can be learned that the enabling indication information may be used to ensure that the first apparatus side and the second apparatus side synchronously enable the target time-frequency resource or simultaneously enable the target time-frequency resource. Enabling the target time-frequency resource is a prerequisite for communication between the first apparatus and the second apparatus on the target time-frequency resource, and helps improve resource configuration and use efficiency.

With reference to the second aspect, in a possible embodiment, the enabling indication information includes duration information, and the duration information is used to indicate the enabled moment.

In this embodiment of this disclosure, the enabling indication information of the target time-frequency resource may be indicated by the duration information, and the duration information indicates a time interval. For example, the duration information may be 100 ms, 200 ms, 500 ms, 1 s, 1.2 s, 1.3 s, 1.7 s, or another value. For example, the duration information is 1 s. To be specific, timing starts after the first information is received, and the target time-frequency resource is enabled after 1 s. It should be noted herein that there is a delay in sending and receiving the first information that carries the enabling indication information. For the first apparatus, the enabled moment of the target time-frequency resource is calculated based on a sending moment of the first information. For the second apparatus, the enabled moment of the target time-frequency resource is calculated based on a receiving moment of the first information. In this embodiment of this disclosure, the delay between sending and receiving of the first information may be ignored, that is, the first apparatus and the at least one second apparatus may synchronously enable the target time-frequency resource based on the enabling indication information.

It can be learned that when the enabling indication information is the duration information that represents a time interval, the first information including the duration information is received only once, so that the first apparatus and the second apparatus can synchronously enable the target time-frequency resource, thereby implementing quick resource configuration with fewer control signaling overheads.

With reference to the second aspect, in a possible embodiment, the enabling indication information includes count information, and the count information is a quantity of remaining transmitted times of the broadcast information used to carry the first information.

In this embodiment of this disclosure, the enabling indication information of the target time-frequency resource may be indicated by the count information. The count information is used to carry a quantity of remaining transmitted times of the broadcast information used to carry the first information. The quantity of remaining transmitted times represents a quantity of remaining to-be-sent times of the broadcast information that carries the first information. Because the broadcast information is sent in a specific period, the enabled moment of the target time-frequency resource may be calculated based on the sending period of the broadcast information and the quantity of remaining transmitted times. In some possible embodiments, the broadcast information including the first information is sent for a plurality of times, and each time the broadcast information carries one piece of first information. The count information in the first information decreases progressively with each time the broadcast information is sent, and correspondingly the second apparatus also receives the first information for a plurality of times. The target time-frequency resource is enabled when the count information in the first information is 0.

It can be learned that, when the enabling indication information is the count information indicating the quantity of remaining transmitted times, it means that the broadcast information including the first information is sent for a plurality of times. Because each time the broadcast information carries one piece of first information, that the broadcast information is sent for the plurality of times is equivalent to that the first information is sent for a plurality of times, that is, the first information including the count information is sent for a plurality of times. In this case, it ensures robustness of receiving the first message by the second apparatus, and effectively avoids a case in which the enabled moment of the target time-frequency resource becomes invalid because the second apparatus misses the first information sent by the first apparatus.

With reference to the second aspect, in a possible embodiment, the first information further includes at least one group identifier, and an identifier of a group in which a second apparatus corresponding to the first time-frequency resource and the target time-frequency resource is located belongs to one of the at least one group identifier.

In this embodiment of this disclosure, all the second apparatuses can be grouped based on factors such as functions or purposes and locations of the second apparatuses, and each second apparatus has an identifier corresponding to a group. Optionally, the second apparatus may be grouped by the first apparatus, or may be grouped based on a factory setting of the second apparatus or a standard definition. The second apparatus can determine the target time-frequency resource based on the first information and the first time-frequency resource only when the identifier of the group in which the second apparatus is located is equal to one of the group identifiers included in the first information. The group identifier is introduced to assist in resource configuration, thereby improving resource configuration flexibility, and improving resource configuration efficiency.

With reference to the second aspect, in a possible embodiment, the first information further includes transmission direction indication information, and if the transmission direction indication information indicates an uplink direction, the first time-frequency resource and the target time-frequency resource are uplink time-frequency resources, or if the transmission direction indication information indicates a downlink direction, the first time-frequency resource and the target time-frequency resource are downlink time-frequency resources, or if the transmission direction indication information indicates an uplink direction and a downlink direction, the first time-frequency resource and the target time-frequency resource include an uplink time-frequency resource and a downlink time-frequency resource.

In this embodiment of this disclosure, the first information further includes the transmission direction indication information, and the transmission direction indication information indicates at least one of the uplink direction and the downlink direction. If the transmission direction indication information indicates the uplink direction (for example, a microphone sends audio data to a head unit), the first time-frequency resource and the target time-frequency resource are the uplink time-frequency resources, that is, the first time-frequency resource and the target time-frequency resource carry data from the at least one second apparatus. If the transmission direction indication information indicates the downlink direction (for example, a head unit sends audio data to a speaker), the first time-frequency resource and the target time-frequency resource are the downlink time-frequency resources, that is, the first time-frequency resource and the target time-frequency resource carry data to be sent to the at least one second apparatus. If the transmission direction indication information indicates the uplink direction and the downlink direction, the first time-frequency resource and the target time-frequency resource have both the uplink time-frequency resource and the downlink time-frequency resource. The transmission direction indication information is introduced to assist in resource configuration, thereby improving resource configuration flexibility, and improving resource configuration efficiency.

With reference to the second aspect, in a possible embodiment, the first information further includes transmission direction indication information and at least one group identifier, and when an identifier of a group in which a second apparatus corresponding to the first time-frequency resource and the target time-frequency resource is located belongs to one of the at least one group identifier, if the transmission direction indication information indicates an uplink direction, the first time-frequency resource and the target time-frequency resource are uplink time-frequency resources, or if the transmission direction indication information indicates a downlink direction, the first time-frequency resource and the target time-frequency resource are downlink time-frequency resources, or if the transmission direction indication information indicates an uplink direction and a downlink direction, the first time-frequency resource and the target time-frequency resource include an uplink time-frequency resource and a downlink time-frequency resource.

In this embodiment of this disclosure, the first information may include both the transmission direction indication information and the at least one group identifier. The transmission direction indication information is used to indicate at least one of the uplink direction and the downlink direction. When the identifier of the group in which the second apparatus is located is equal to one of the group identifiers included in the first information, the first time-frequency resource and the target time-frequency resource are at least one of the uplink time-frequency resource and the downlink time-frequency resource corresponding to the transmission direction indication information. In another implementation, the transmission direction indication information and the group identifier may also be carried in another sub-message different from the first information in the broadcast information. The transmission direction indication information and the group identifier are introduced to assist in resource configuration, thereby improving resource configuration flexibility, and improving resource configuration efficiency.

With reference to the second aspect, in a possible embodiment, the first frequency domain offset is an integer multiple of a frequency domain range of a minimum time-frequency resource unit, and/or the first time domain offset is an integer multiple of a time domain range of a minimum time-frequency resource unit.

In this embodiment of this disclosure, an offset from the first time-frequency resource to the target time-frequency resource may be performed by using the minimum time-frequency resource unit as a minimum granularity. In frequency domain, the first frequency domain offset is the integer multiple of the frequency domain range of the minimum time-frequency resource unit. In time domain, the first time domain offset is the integer multiple of the time domain range of the minimum time-frequency resource unit. It can be learned that the minimum time-frequency resource unit is used as the minimum adjustment granularity in time domain and frequency domain, thereby helping implement neat and standard division into time-frequency resources, and improving resource configuration efficiency.

With reference to the second aspect, in a possible embodiment, when a quantity of the at least one group identifier is N1, a quantity of the first time-frequency resource offsets indicated by the first information is N2 and/or a quantity of the first frequency domain resource offsets indicated by the first information is N2, where N1 is a positive integer greater than or equal to 1, N2 is a positive integer greater than or equal to 1, and N1 is greater than or equal to N2.

In this embodiment of this disclosure, the first time-frequency resource offset indicated by the first information may be considered as a to-be-offset and/or the first frequency domain resource offset indicated by the first information may be considered as a to-be-offset. In other words, there are three types of to-be-offsets: a time domain offset, a frequency domain offset, and both a time domain offset and a frequency domain offset. When the first information includes a plurality of group identifiers, the first information may indicate a plurality of to-be-offsets. When the quantity of group identifiers is equal to the quantity of to-be-offsets, each group identifier corresponds to one to-be-offset, and different group identifiers correspond to different to-be-offsets. When the quantity of group identifiers is greater than the quantity of to-be-offsets, each group identifier is no longer in a one-to-one correspondence with each offset, and one to-be-offset may correspond to a plurality of group identifiers. This can improve resource configuration flexibility, and improve resource configuration efficiency.

With reference to the second aspect, in a possible embodiment, when the enabling indication information is the count information, the broadcast information that carries the first information is sent a plurality of times, and the count information progressively decreases with each sending of the broadcast information.

According to a third aspect, an embodiment of this disclosure provides an apparatus, the apparatus may be a first apparatus, and the apparatus includes at least one processor and a transmitter. The processor is configured to determine a first time-frequency resource used by at least one second apparatus, where the processor is further configured to determine a target time-frequency resource used by the at least one second apparatus. The transmitter is configured to send first information, where the first information is used to indicate at least one of a first time domain resource offset and a first frequency domain resource offset, the first time domain resource offset is an offset from the first time-frequency resource to the target time-frequency resource in time domain, and/or the first frequency domain resource offset is an offset from the first time-frequency resource to the target time-frequency resource in frequency domain. The apparatus is configured to implement the method according to any one of the first aspect or the possible embodiments of the first aspect.

In this embodiment of this disclosure, the apparatus may be a CDC in a vehicle or another device that can manage and coordinate a wireless resource, or an element in the CDC or the device, for example, a chip or an integrated circuit. The second apparatus may be a vehicle-mounted device (for example, a speaker, a microphone, a camera, or a display), a non-vehicle-mounted device such as a mobile phone, or a headset, another device that can perform wireless communication with the first apparatus, or an element in the foregoing device, for example, a chip or an integrated circuit. The apparatus communicates with the second apparatus through a wireless connection. The CDC may also be referred to as a head unit. The following describes the solution only by using an example in which the CDC is replaced with the head unit. However, the first apparatus is not limited to only the CDC in this disclosure.

According to a fourth aspect, an embodiment of this disclosure provides an apparatus, the apparatus may be a second apparatus, and the apparatus includes at least one processor and a receiver. The receiver is configured to receive first information from a first apparatus, where the first information is used to indicate at least one of a first time domain resource offset and a first frequency domain resource offset. The processor is configured to determine a target time-frequency resource based on a first time-frequency resource and the first information, where the first time domain resource offset is an offset from the first time-frequency resource to the target time-frequency resource in time domain, and/or the first frequency domain resource offset is an offset from the first time-frequency resource to the target time-frequency resource in frequency domain. The apparatus is configured to implement the method according to any one of the second aspect or the possible embodiments of the second aspect.

According to a fifth aspect, an embodiment of this disclosure provides an apparatus, and the apparatus includes a processing unit configured to determine a first time-frequency resource used by at least one second apparatus, where the processing unit is further configured to determine a target time-frequency resource used by the at least one second apparatus, and a sending unit configured to send first information, where the first information is used to indicate at least one of a first time domain resource offset and a first frequency domain resource offset, the first time domain resource offset is an offset from the first time-frequency resource to the target time-frequency resource in time domain, and/or the first frequency domain resource offset is an offset from the first time-frequency resource to the target time-frequency resource in frequency domain.

With reference to the fifth aspect, in a possible embodiment, the processing unit is further configured to determine that the first time-frequency resource is encountering interference.

With reference to the fifth aspect, in a possible embodiment, the processing unit is further configured to detect an interference signal on the first time-frequency resource, or the apparatus further includes a receiving unit, where the information receiving unit is further configured to receive interference indication information from the at least one second apparatus, where the interference indication information indicates that the first time-frequency resource is interfered with.

With reference to the fifth aspect, in a possible embodiment, the first information is further used to indicate at least one of a time domain offset direction and a frequency domain offset direction.

With reference to the fifth aspect, in a possible embodiment, the first information is carried in broadcast information.

With reference to the fifth aspect, in a possible embodiment, the first information includes enabling indication information, and the enabling indication information is used to indicate an enabled moment of the target time-frequency resource.

With reference to the fifth aspect, in a possible embodiment, the enabling indication information includes duration information, and the duration information is used to indicate the enabled moment.

With reference to the fifth aspect, in a possible embodiment, the enabling indication information includes count information, and the count information is a quantity of remaining transmitted times of the broadcast information used to carry the first information.

With reference to the fifth aspect, in a possible embodiment, the first information further includes at least one group identifier, and an identifier of a group in which the at least one second apparatus is located belongs to the at least one group identifier included in the first information.

With reference to the fifth aspect, in a possible embodiment, the first information further includes transmission direction indication information, and if the transmission direction indication information indicates an uplink direction, the first time-frequency resource and the target time-frequency resource are uplink time-frequency resources, or if the transmission direction indication information indicates a downlink direction, the first time-frequency resource and the target time-frequency resource are downlink time-frequency resources, or if the transmission direction indication information indicates an uplink direction and a downlink direction, the first time-frequency resource and the target time-frequency resource include an uplink time-frequency resource and a downlink time-frequency resource.

With reference to the fifth aspect, in a possible embodiment, when an identifier of a group in which the at least one second apparatus is located belongs to the at least one group identifier included in the first information, if the transmission direction indication information indicates an uplink direction, the first time-frequency resource and the target time-frequency resource are uplink time-frequency resources, or if the transmission direction indication information indicates a downlink direction, the first time-frequency resource and the target time-frequency resource are downlink time-frequency resources, or if the transmission direction indication information indicates an uplink direction and a downlink direction, the first time-frequency resource and the target time-frequency resource include an uplink time-frequency resource and a downlink time-frequency resource.

With reference to the fifth aspect, in a possible embodiment, the first frequency domain offset is an integer multiple of a frequency domain range of a minimum time-frequency resource unit, and/or the first time domain offset is an integer multiple of a time domain range of a minimum time-frequency resource unit.

With reference to the fifth aspect, in a possible embodiment, when a quantity of the at least one group identifier is N1, a quantity of the first time-frequency resource offsets indicated by the first information is N2 and/or a quantity of the first frequency domain resource offsets indicated by the first information is N2, where N1 is a positive integer greater than or equal to 1, N2 is a positive integer greater than or equal to 1, and N1 is greater than or equal to N2.

With reference to the fifth aspect, in a possible embodiment, when the enabling indication information is the count information, the broadcast information that carries the first information is sent a plurality of times, and the count information progressively decreases with each sending of the broadcast information.

According to a sixth aspect, an embodiment of this disclosure provides an apparatus, and the apparatus includes a receiving unit configured to receive first information from a first apparatus, where the first information is used to indicate at least one of a first time domain resource offset and a first frequency domain resource offset, and a processing unit configured to determine a target time-frequency resource based on a first time-frequency resource and the first information, where the first time domain resource offset is an offset from the first time-frequency resource to the target time-frequency resource in time domain, and/or the first frequency domain resource offset is an offset from the first time-frequency resource to the target time-frequency resource in frequency domain.

With reference to the sixth aspect, in a possible embodiment, the apparatus further includes a sending unit configured to send interference indication information to the first apparatus, where the interference indication information indicates that the first time-frequency resource is interfered with.

With reference to the sixth aspect, in a possible embodiment, the first information is further used to indicate at least one of a time domain offset direction and a frequency domain offset direction.

With reference to the sixth aspect, in a possible embodiment, the first information is carried in broadcast information.

With reference to the sixth aspect, in a possible embodiment, the first information includes enabling indication information, and the enabling indication information is used to indicate an enabled moment of the target time-frequency resource.

With reference to the sixth aspect, in a possible embodiment, the enabling indication information includes duration information, and the duration information is used to indicate the enabled moment.

With reference to the sixth aspect, in a possible embodiment, the enabling indication information includes count information, and the count information is a quantity of transmitted times of the broadcast information used to carry the first information.

With reference to the sixth aspect, in a possible embodiment, the first information further includes at least one group identifier, and an identifier of a group in which an apparatus corresponding to the first time-frequency resource and the target time-frequency resource is located belongs to one of the at least one group identifier.

With reference to the sixth aspect, in a possible embodiment, the first information further includes transmission direction indication information, and if the transmission direction indication information indicates an uplink direction, the first time-frequency resource and the target time-frequency resource are uplink time-frequency resources, or if the transmission direction indication information indicates a downlink direction, the first time-frequency resource and the target time-frequency resource are downlink time-frequency resources, or if the transmission direction indication information indicates an uplink direction and a downlink direction, the first time-frequency resource and the target time-frequency resource include an uplink time-frequency resource and a downlink time-frequency resource.

With reference to the sixth aspect, in a possible embodiment, the first information further includes transmission direction indication information and at least one group identifier, and when an identifier of a group to which a second apparatus corresponding to the first time-frequency resource and the target time-frequency resource belongs to one of the at least one group identifier, if the transmission direction indication information indicates an uplink direction, the first time-frequency resource and the target time-frequency resource are uplink time-frequency resources, or if the transmission direction indication information indicates a downlink direction, the first time-frequency resource and the target time-frequency resource are downlink time-frequency resources, or if the transmission direction indication information indicates an uplink direction and a downlink direction, the first time-frequency resource and the target time-frequency resource include an uplink time-frequency resource and a downlink time-frequency resource.

With reference to the sixth aspect, in a possible embodiment, the first frequency domain offset is an integer multiple of a frequency domain range of a minimum time-frequency resource unit, and/or the first time domain offset is an integer multiple of a time domain range of a minimum time-frequency resource unit.

With reference to the sixth aspect, in a possible embodiment, when a quantity of the at least one group identifier is N1, a quantity of the first time-frequency resource offsets indicated by the first information is N2 and/or a quantity of the first frequency domain resource offsets indicated by the first information is N2, where N1 is a positive integer greater than or equal to 1, N2 is a positive integer greater than or equal to 1, and N1 is greater than or equal to N2.

With reference to the sixth aspect, in a possible embodiment, when the enabling indication information is the count information, the broadcast information that carries the first information is sent a plurality of times, and the count information progressively decreases with each sending of the broadcast information.

According to a seventh aspect, an embodiment of this disclosure provides a computer-readable storage medium. The computer-readable storage medium stores program code to be executed by an apparatus. The program code includes instructions for performing the method according to any one of the first aspect or the possible implementations of the first aspect.

According to an eighth aspect, an embodiment of this disclosure provides a computer-readable storage medium. The computer-readable storage medium stores program code to be executed by an apparatus. The program code includes instructions for performing the method according to any one of the second aspect or the possible implementations of the second aspect.

According to a ninth aspect, an embodiment of this disclosure provides a computer software product. The computer program software product includes program instructions, and when the computer software product is executed by an apparatus, the apparatus performs the method according to any one of the first aspect or the possible embodiments of the first aspect. The computer software product may be a software installation package. When the method provided in any possible design of the first aspect needs to be used, the computer software product may be downloaded and executed on the apparatus, to implement the method according to any one of the first aspect or the possible implementations of the first aspect.

According to a tenth aspect, an embodiment of this disclosure provides a computer software product. The computer program software product includes program instructions, and when the computer software product is executed by an apparatus, the apparatus performs the method according to any one of the second aspect or the possible embodiments of the second aspect. The computer software product may be a software installation package. When the method provided in any possible design of the second aspect needs to be used, the computer software product may be downloaded and executed on the apparatus, to implement the method according to any one of the second aspect or the possible implementations of the second aspect.

According to an eleventh aspect, an embodiment of this disclosure provides an apparatus. The apparatus includes at least one processor and a communications interface, and the communications interface is configured to provide information input and/or output for the at least one processor. The apparatus may be a chip or an integrated circuit, or may be the first apparatus according to the third aspect. The apparatus is configured to implement the method according to any one of the first aspect or the possible embodiments of the first aspect.

According to a twelfth aspect, an embodiment of this disclosure provides an apparatus. The apparatus includes at least one processor and a communications interface, and the communications interface is configured to provide information input and/or output for the at least one processor. The apparatus may be a chip or an integrated circuit, or may be the second apparatus according to the fourth aspect. The apparatus is configured to implement the method according to any one of the second aspect or the possible embodiments of the second aspect.

It may be learned that, in embodiments of this disclosure, the offset is performed on the current time-frequency resource in at least one dimension of time domain and frequency domain to obtain the new time-frequency resource, thereby implementing fast configuration of the time-frequency resource. When the current time-frequency resource is interfered with, the corresponding offset adjustment operation is performed on the current time-frequency resource, thereby effectively reducing or even eliminating interference. In addition, the at least one of the group identifier and the transmission direction indication information is introduced to assist in time-frequency resource configuration, thereby improving resource configuration flexibility, improving resource configuration efficiency, and improving data transmission performance and quality.

BRIEF DESCRIPTION OF DRAWINGS

To describe the technical solutions in some embodiments of this disclosure more clearly, the following briefly describes the accompanying drawings for describing embodiments. It is clear that the accompanying drawings in the following description show merely some embodiments of this disclosure, and a person of ordinary skill in the art may still derive other drawings from these accompanying drawings without creative efforts.

DESCRIPTION OF EMBODIMENTS

Figure 1:
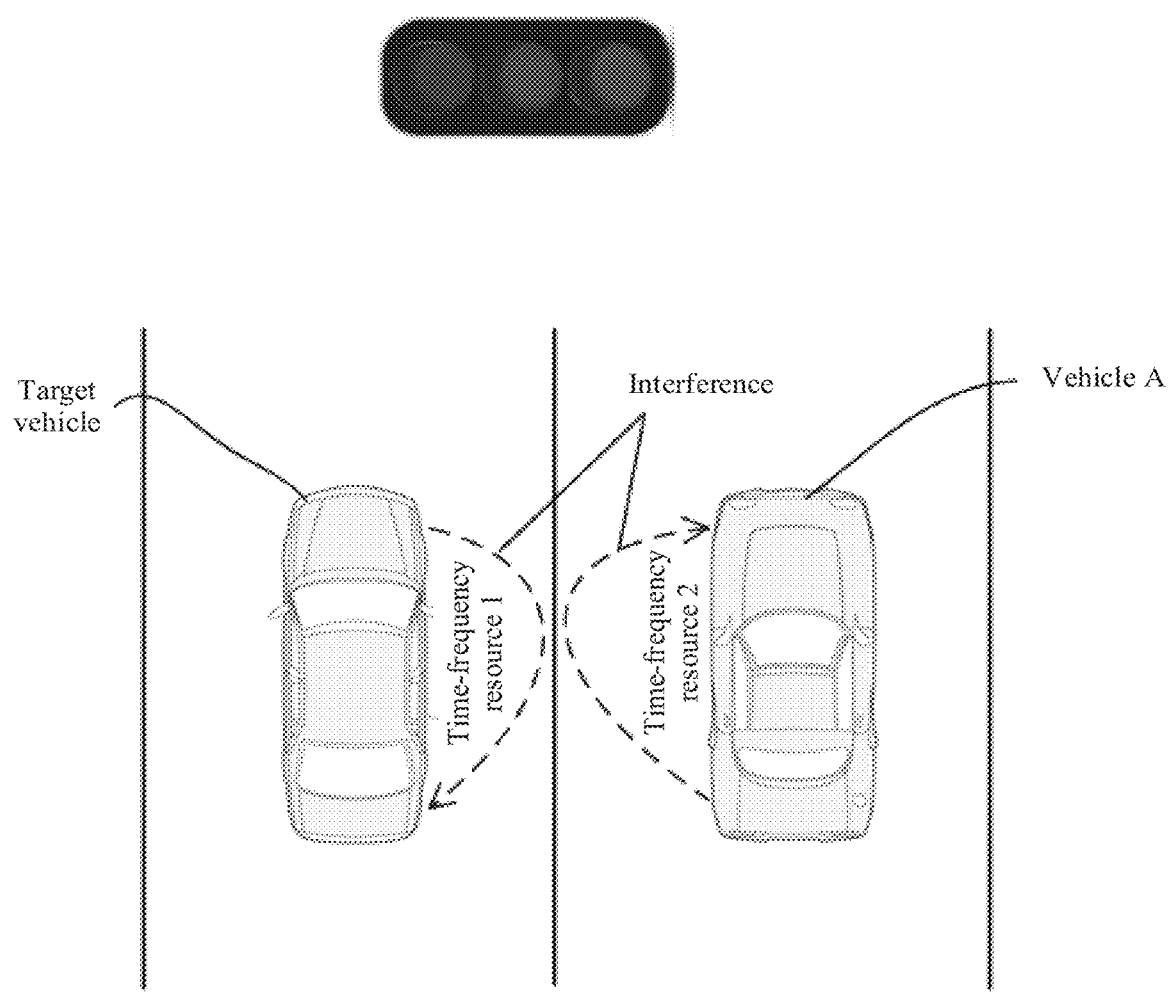
FIG. 1 is a schematic diagram of a scenario in which a time-frequency resource of a vehicle is interfered with in the conventional technology.

Terms used in embodiments of this disclosure are merely for the purpose of describing specific embodiments, but are not intended to limit this disclosure. In the specification and claims in embodiments of this disclosure, the terms "first", "second", and the like are intended to distinguish between different objects but do not indicate a particular order of the objects. Terms "a", "the", and "this" of singular forms used in embodiments and the appended claims of this disclosure are also intended to include plural forms, unless otherwise specified in the context clearly. In addition, the terms "including", "having", and any other variant thereof are intended to cover non-exclusive inclusion. It should also be understood that, the term "and/or" used herein indicates and includes any or all possible combinations of one or more associated listed items.

For ease of understanding, the following first describes related terms that may be used in embodiments of this disclosure.

(1) Head Unit and Cascaded Device:

A head unit is short for an automotive infotainment product installed in a vehicle. The head unit is wirelessly connected to a cascaded device (for example, a speaker/loudspeaker, a microphone, a display, a camera, a mobile phone, or a headset). The head unit may perform audio and video playing, voice control, navigation, and the like. A cascaded device is a device that is wirelessly connected to a head unit and that can perform communication with the head unit, and may be a vehicle-mounted device (for example, a speaker/loudspeaker, a microphone, a display, or a camera), or may be a non-vehicle-mounted device such as a mobile phone or a headset, or may be another device that can perform communication with the head unit, for example, another head unit. The cascaded device may be classified into a device used for uplink transmission and a device used for downlink transmission based on different data transmission directions. The device used for uplink transmission is a device that transmits data to the head unit, for example, the device may be a microphone, a camera, a vehicle-mounted keyboard, or a mobile phone. The device used for downlink transmission is a device that receives data sent by the head unit, for example, the device may be a speaker/a loudspeaker/an amplifier, a display, a headset, or a mobile phone. Interaction between the head unit and the cascaded device can implement information communication between a person and a vehicle, and between the vehicle and the outside world, thereby enhancing user experience and functions related to service security.

(2) Semi-Persistent Interference:

To understand semi-persistent interference, semi-persistent scheduling (SPS) needs to be described first. SPS indicates that a wireless spectrum resource is periodically allocated to a specific device for use, and division into the wireless spectrum resource needs to be performed only once. In this way, the corresponding device can send or receive data on a same time-frequency resource in each fixed period. It is easy to understand that, through SPS transmission, a feature that a transmission resource arrives periodically can be fully used. That is, the transmission resource is allocated once and used periodically, which can effectively reduce signaling overheads caused by scheduling and indicating a wireless resource by a communications system.

Therefore, in wireless communication between a head unit in a vehicle and a cascaded device, a head unit in each vehicle manages and coordinates only a wireless resource in the vehicle, and a function of the head unit is similar to a function of a "base station". Certainly, the head unit may also allocate a wireless resource to the cascaded device connected to the vehicle in the foregoing SPS manner. However, in an area with dense vehicles such as a crossroad, if a surrounding vehicle also uses SPS, and a time-frequency resource used by a vehicle-mounted device in the surrounding vehicle overlaps a time-frequency resource used by the vehicle, that is, a frequency domain range and a time domain range occupied by the time-frequency resources of the two parties totally or partially overlap. As a result, interference is inevitably generated on a transmission resource in the vehicle. Such interference is referred to as semi-persistent interference.

Development of self-driving technologies and intelligent cockpit technologies makes it possible for people to enjoy in-vehicle office, personalized media & entertainment experience, and personalized driving experience. Devices related in an intelligent cockpit include a head unit and a cascaded device (including a vehicle-mounted device such as a speaker or a microphone, and a non-vehicle-mounted device such as a mobile phone or a headset, or another device that can perform wireless communication with the head unit). It should be noted that, the following description is provided by using an example in which a cascaded device is a vehicle-mounted device. The head unit and the vehicle-mounted device are mainly connected in a wired manner. However, as a quantity of vehicle-mounted devices continuously increases, on one hand, cable costs are high, on the other hand, narrow in-vehicle space makes cabling increasingly difficult. Therefore, to avoid complex cabling in a narrow vehicle and reduce costs, the head unit is connected to the vehicle-mounted device in a wireless manner instead of the original wired connection manner. However, in a wireless connection between the head unit and the vehicle-mounted device, the head unit is responsible for management and coordination of entire wireless resources in the vehicle. Because a frequency band of a wireless channel is usually shared, in an area with dense vehicles, for example, in a traffic light intersection or a high-speed service area, a case in which transmission time-frequency resources used by a plurality of vehicles overlap or conflict or overlay easily occurs.

Refer to FIG. 1. A target vehicle stops and waits at a traffic light intersection, and a speaker in the target vehicle is playing music (that is, the speaker in the target vehicle is using a time-frequency resource 1). In this case, a speaker in a vehicle A in a right lane of the vehicle is also playing music (that is, the speaker in the vehicle A is using a time-frequency resource 2). Because a frequency band of a channel for transmitting time-frequency resources is shared, the time-frequency resource 2 used by the vehicle A and the time-frequency resource 1 used by the target vehicle overlap in both frequency domain and time domain. As a result, the time-frequency resource 1 in the target vehicle is interfered with, and the time-frequency resource 2 used by the vehicle A is an interference signal for the time-frequency resource 1, which results in a transmission failure of a wireless audio signal, a packet loss, invalid noise cancellation, and distortion of audio played by the speaker, and severely affects experience of a passenger in the vehicle. It should be noted that such interference may be semi-persistent interference.

Figure 2:
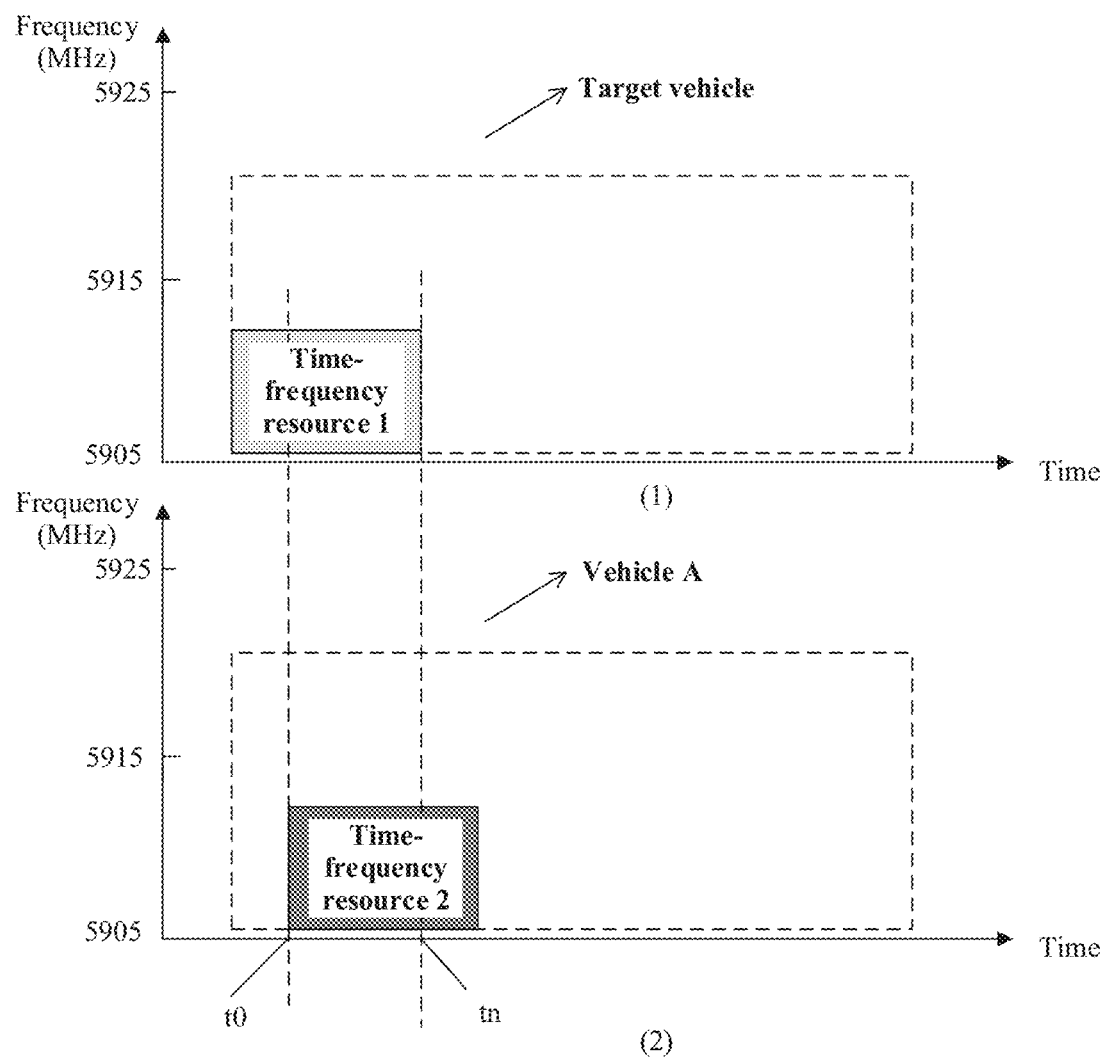
FIG. 2 is a schematic diagram of essence of signal interference in a vehicle according to an embodiment of this disclosure.

To further describe essence of interference from the time-frequency resource 2 to the time-frequency resource 1 in FIG. 1, refer to FIG. 2. A system bandwidth may be set to 15 megahertz (MHz). For example, a corresponding frequency domain range is from 5905 megahertz (MHz) to 5920 MHz. (1) in FIG. 2 is a schematic diagram of a time-frequency location in which the time-frequency resource 1 used by the target vehicle is located, and (2) in FIG. 2 is a schematic diagram of a time-frequency location in which the time-frequency resource 2 used by the vehicle A is located. It can be seen that: on one hand, frequency domain ranges occupied by the time-frequency resource 1 and the time-frequency resource 2 are from 5905 MHz to 5910 MHZ, that is, the frequency domain ranges occupied by the time-frequency resource 1 and the time-frequency resource 2 are consistent, on the other hand, the time-frequency resource 1 and the time-frequency resource 2 overlap from a moment to t0 a moment tn, which means that, from the moment to t0 the moment tn, the time-frequency resource 1 and the time-frequency resource 2 simultaneously occupy the frequency domain range from 5905 MHz to 5910 MHz. Overlapping between the time-frequency resource 1 and the time-frequency resource 2 occurs, resulting in interference.

It should be noted that interference inevitably occurs when overlapping occurs in frequency domain ranges and time domain ranges of two time-frequency resources at the same time. In FIG. 2, interference is described only by an example in which the frequency domain ranges of the time-frequency resource 1 and the time-frequency resource 2 totally overlap and the time domain ranges partially overlap. It should be noted that, in some other possible embodiments, interference is caused because the frequency domain ranges of the two time-frequency resources partially or totally overlap and the time domain ranges of the two time-frequency resources partially or totally overlap.

Figure 3:
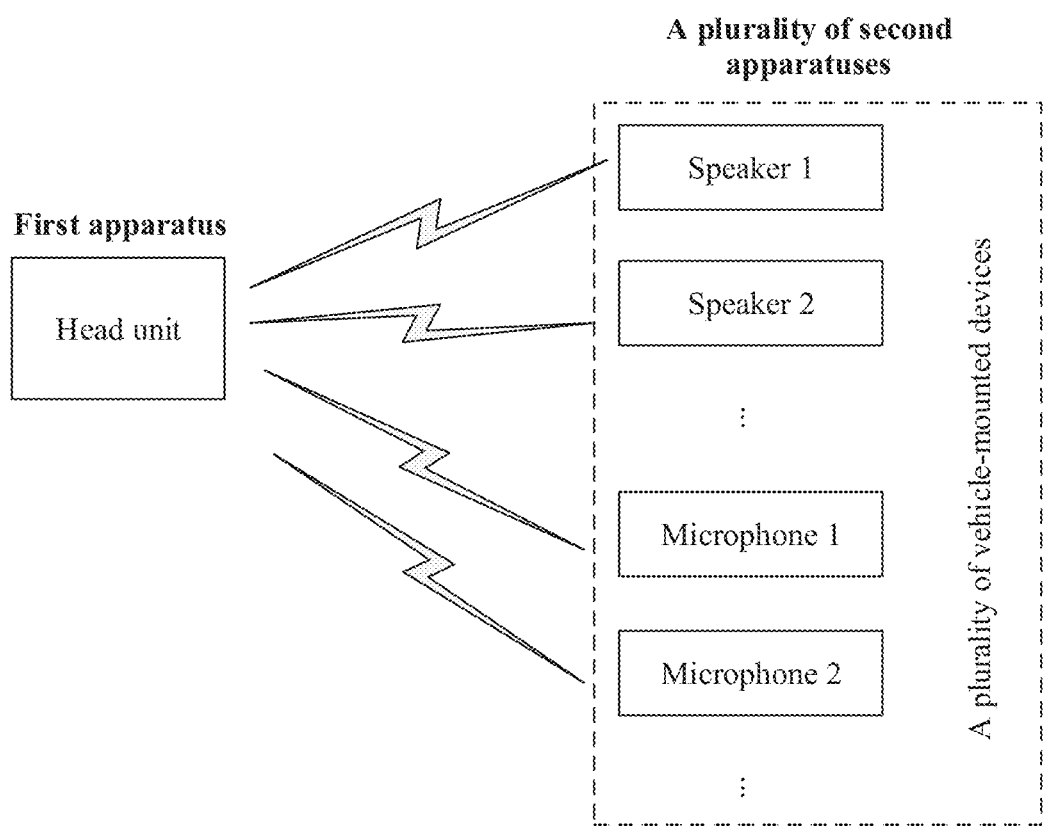
FIG. 3 is a diagram of a system architecture of an application according to an embodiment of this disclosure.

The following describes a system architecture applied to embodiments of this disclosure. Refer to FIG. 3. FIG. 3 is a block diagram of composition of a system according to an embodiment of this disclosure. The system includes a first apparatus and at least one second apparatus. The first apparatus communicates with the at least one second apparatus through a wireless connection. It should be noted that, the first apparatus has a function of managing and coordinating a wireless spectrum resource, and the first apparatus may allocate, to the at least one second apparatus, a time-frequency resource used for communicating with the first apparatus. The first apparatus may be a CDC in a vehicle or another device that can manage and coordinate a wireless resource, or an element in the CDC or the device, for example, a chip or an integrated circuit. The second apparatus may be a vehicle-mounted device (for example, a speaker, a microphone, a camera, or a display), a non-vehicle-mounted device such as a mobile phone, or a headset, another device that can perform wireless communication with the first apparatus, or an element in the foregoing device, for example, a chip or an integrated circuit. The CDC may also be referred to as a head unit. The following describes the solution only by using an example in which the CDC is replaced with the head unit. However, the first apparatus is not limited to only the CDC in this disclosure. The system architecture to which embodiments of this disclosure is applied is described below by using an example in which the first apparatus is the head unit, and the corresponding at least one second apparatus is at least one vehicle-mounted device. Examples described in the following embodiments of this disclosure are merely used to describe solutions, and are not intended to limit specific types of the first apparatus and the second apparatus.

The head unit is usually installed in a center console in a vehicle. With continuous development of electronic and digital technologies, an original entertainment function is extended and becomes one of main functions of the head unit. In embodiments of this disclosure, the head unit is responsible for managing and coordinating a wireless resource in the vehicle, and allocates an appropriate wireless spectrum resource to the vehicle-mounted device, so that different vehicle-mounted devices receive or send data on respective corresponding fixed time-frequency resources. Certainly, the head unit may send audio data and time-frequency data to the vehicle-mounted device (for example, a speaker), and the head unit may also receive data (for example, voice information and a voice control command) sent by the vehicle-mounted device (for example, a microphone).

The vehicle-mounted device may be classified into a device used for uplink transmission and a device used for downlink transmission based on different data transmission directions. The device used for uplink transmission is a device that transmits data to the head unit, for example, the device may be a microphone, a camera, or a vehicle-mounted keyboard. The device used for downlink transmission is a device that receives data sent by the head unit, for example, the device may be a speaker/a loudspeaker/an amplifier, or a display. It can be learned that the vehicle-mounted device may send data to the head unit, and may also receive data sent by the head unit.

In embodiments of this disclosure, at least one of time domain offset and frequency domain offset is performed on a current time-frequency resource or an initial time-frequency resource used by the vehicle-mounted device, to adjust the current time-frequency resource or the initial time-frequency resource to a new time-frequency resource. In addition, when the current time-frequency resource is interfered with, the current time-frequency resource used by the vehicle-mounted device is adjusted in time domain and/or frequency domain, thereby effectively reducing or even eliminating interference, and improving in-vehicle data transmission performance and quality.

Figure 4:
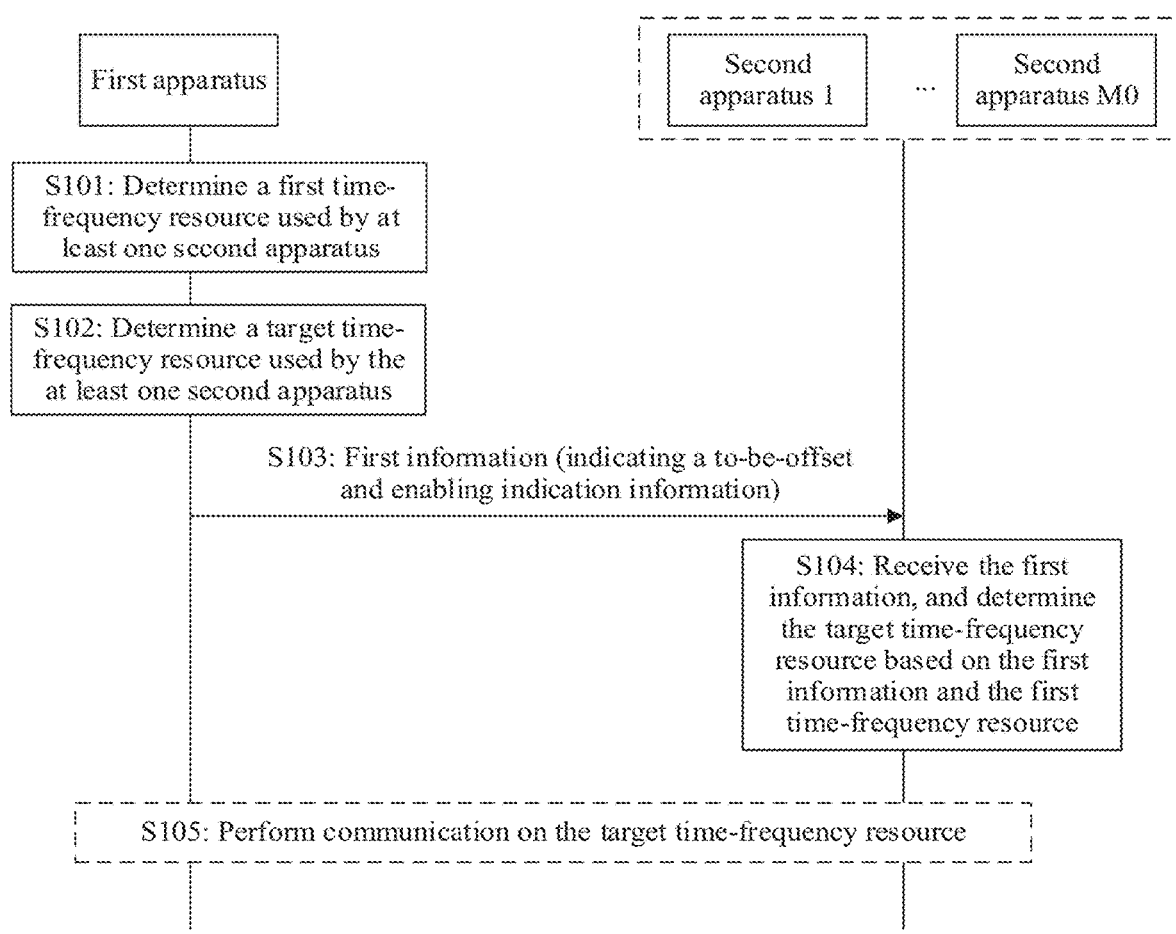
FIG. 4 is a flowchart of a resource configuration method according to an embodiment of this disclosure.

Refer to FIG. 4. Based on the system architecture described above, the following describes a resource configuration method provided in an embodiment of this disclosure. The method includes but is not limited to the following steps.

S101: A first apparatus determines a first time-frequency resource used by at least one second apparatus.

In this embodiment of this disclosure, the first apparatus is connected to the at least one second apparatus in a wireless manner. The first apparatus has a function of managing and coordinating a wireless spectrum resource. The first apparatus may allocate a time-frequency resource to the at least one second apparatus. The time-frequency resource occupies a frequency domain range and a time domain range on a wireless channel. The first apparatus may set, based on usage of the second apparatus, the frequency domain range and the time domain range occupied by the time-frequency resource used by the second apparatus. In this embodiment of this disclosure, a to-be-adjusted time-frequency resource in the time-frequency resource used by the at least one second apparatus is referred to as the first time-frequency resource.

It should be noted that the first time-frequency resource is a current time-frequency resource or an initial time-frequency resource used by the at least one second apparatus, and the at least one second apparatus may communicate with the first apparatus on the first time-frequency resource, for example, receive or send data.

It should be noted that, the first apparatus may be a CDC in a vehicle or another device that can manage and coordinate a wireless resource, or an element in the CDC or the device, for example, a chip or an integrated circuit. The second apparatus may be a vehicle-mounted device (for example, a speaker, a microphone, a camera, or a display), a non-vehicle-mounted device such as a mobile phone, or a headset, another device that can perform communication with the first apparatus, or an element in the foregoing device, for example, a chip or an integrated circuit. This is not further limited in this embodiment of this disclosure. The CDC may also be referred to as a head unit. The following describes the solution only by using an example in which the CDC is replaced with the head unit. However, the first apparatus is not limited to only the CDC in this disclosure.

S102: The first apparatus determines a target time-frequency resource used by the at least one second apparatus.

In this embodiment of this disclosure, the first apparatus determines, on the wireless channel, the target time-frequency resource used by the at least one second apparatus. The target time-frequency resource corresponds to the first time-frequency resource. A width of a frequency domain range occupied by the target time-frequency resource is the same as a width of a frequency domain range occupied by the first time-frequency resource, and duration of a time domain range occupied by the target time-frequency resource is the same as duration of a time domain range occupied by the first time-frequency resource.

For example, the frequency domain range occupied by the target time-frequency resource is from 5910 MHz to 5915 MHz, the time domain range is from T1 to T2, the frequency domain range occupied by the first time-frequency resource is from 5905 MHz to 5910 MHz, and the time domain range is from T3 to T4. Correspondingly, a bandwidth (or the width) of the frequency domain range occupied by the target time-frequency resource is equal to a bandwidth (or the width) of the frequency domain range occupied by the first time-frequency resource, and both are 5 MHZ, and the duration (an absolute value of a difference between T1 and T2) of the time domain range occupied by the target time-frequency resource is equal to the duration (an absolute value of a difference between T3 and T4) of the time domain range occupied by the first time-frequency resource.

In some possible embodiments, the first time-frequency resource includes an interference signal. In some possible embodiments, before the first apparatus performs S102, the first apparatus may further detect that the interference signal exists on the first time-frequency resource, and determine that the first time-frequency resource is interfered with. In some other possible embodiments, before S102 is performed, the first apparatus receives interference indication information reported by the at least one second apparatus, where the interference information indicates that the first time-frequency resource is interfered with. It should be noted that a trigger condition for which the first apparatus determines the target time-frequency resource may be triggered when the first apparatus detects that the interference signal exists on the first time-frequency resource or the first apparatus receives the interference indication information, or may be triggered when energy of the detected interference signal is greater than or equal to a preset energy threshold, or may be triggered when a ratio of an overlapping part between the detected interference signal and the first time-frequency resource on the first time-frequency resource is greater than a preset ratio. This is not limited in this embodiment of this disclosure.

S103: The first apparatus sends first information to the at least one second apparatus.

In this embodiment of this disclosure, the first apparatus sends the first information to the at least one second apparatus, where the first information is used to indicate at least one of a first time domain resource offset or a first frequency domain resource offset. The first time domain resource offset is an offset from the first time-frequency resource to the target time-frequency resource in time domain, and the first frequency domain resource offset is an offset from the first time-frequency resource to the target time-frequency resource in frequency domain.

Further, in a specific implementation, the first information includes a to-be-offset of the first time-frequency resource (namely, the first time domain resource offset and/or the first frequency domain resource offset), and the to-be-offset may be a frequency domain offset, or may be a time domain offset, or may be a frequency domain offset and a time domain offset. For example, the time domain offset and the frequency domain offset each are indicated by 1 byte. If the time domain offset corresponds to 0 in 1 byte, and the frequency domain offset does not correspond to 0 in 1 byte, the to-be-offset is the frequency domain offset, and an offset in frequency domain corresponds to a value indicated by 1 byte in frequency domain. If only the frequency domain offset corresponds to 0 in 1 byte, the to-be-offset is the time domain offset, and an offset in time domain corresponds to a value indicated by 1 byte in time domain. If neither the time domain offset nor the frequency domain offset corresponds to 0 in 1 byte, the to-be-offset is the time domain offset and the frequency domain offset. In another specific implementation, the first information includes an indication bit indicating the to-be-offset. The indication bit may be a special character. For example, "F" identifies the frequency domain offset, "T" indicates the time domain offset, and "D" indicates the time domain offset and the frequency domain offset. The indication bit may alternatively be a number, two bits are as an example, "00" indicates the frequency domain offset, "01" indicates the time domain offset, and "10" indicates the frequency domain offset and the time domain offset.

It should be noted that the first time domain resource offset and/or the first frequency domain offset are/is determined by the first apparatus based on the first time-frequency resource and the target time-frequency resource. After the first apparatus determines that the first time-frequency resource used by the at least one second apparatus needs to be reconfigured, the first apparatus finds, on the wireless channel based on the frequency domain range and the time domain range that correspond to the to-be-adjusted first time-frequency resource, the target time-frequency resource that matches the to-be-adjusted first time-frequency resource, to obtain the frequency domain range and the time domain range that correspond to the target time-frequency resource, and finally determines the offset from the first time-frequency resource to the target time-frequency resource in frequency domain and/or the offset from the first time-frequency resource to the target time-frequency resource in time domain.

It should be noted that the first frequency domain resource offset and/or the first time domain resource offset may be set by using a minimum time-frequency resource unit as a minimum granularity. To be specific, the first frequency domain offset is an integer multiple of a frequency domain range of the minimum time-frequency resource unit in frequency domain, and the first time domain offset is an integer multiple of a time domain range of the minimum time-frequency resource unit in time domain.

In specific implementation, the first information is further used to indicate at least one of a time domain offset direction or a frequency domain direction. The first information may explicitly indicate the time domain offset direction and/or the frequency domain offset direction. For example, "0" and "1" in 1 bit are used to indicate different time domain offset directions or different frequency domain offset directions. For example, "1" indicates upward (namely, a frequency increase direction) in frequency domain, and "1" indicates backward (namely, a time delay direction) in time domain. "0" indicates downward (namely, a frequency decrease direction) in frequency domain, and "0" indicates forward (namely, a time advance direction) in time domain. Certainly, in some possible embodiments, "0" and "1" may further represent other directions, and this is not limited in this disclosure. Alternatively, the first information may implicitly indicate the time domain offset direction and/or the frequency domain offset direction. That is, positive and negative values are used to indicate different time domain offset directions or different frequency domain offset directions.

It should be noted that the first information may be carried in broadcast information, and the broadcast information is sent on a broadcast channel. In other words, the first information may be sent to the at least one second apparatus in a broadcast manner on the broadcast channel. The broadcast information that carries the first information is sent once when the first information is broadcast once. Because the broadcast information carries one piece of first information, sending the broadcast information once means sending the first information once.

The first information further includes enabling indication information, and the enabling indication information is used to indicate an enabled moment of the target time-frequency resource. In other words, the enabling indication information indicates a moment at which configuration information is updated and the target time-frequency resource starts to be used. After the target time-frequency resource is enabled, the first apparatus may communicate with the at least one second apparatus on the target time-frequency resource. Further, the first apparatus may receive data from the at least one second apparatus, and/or send data to the at least one second apparatus on the target time-frequency resource. Correspondingly, the second apparatus may send data to the first apparatus, or receive data from the first apparatus on the target time-frequency resource. It should be noted that the enabled moment of the target time-frequency resource is different from a start moment of communication transmission, and there is a possible scenario in which the target time-frequency resource starts to be enabled before communication is performed on the target time-frequency resource. Therefore, the enabled moment of the target time-frequency resource is earlier than or equal to the moment of communication on the target time-frequency resource.

It should be noted herein that there is a delay in sending and receiving the first information that carries the enabling indication information. For the first apparatus, the enabled moment of the target time-frequency resource is calculated based on a sending moment of the first information. For the second apparatus, the enabled moment of the target time-frequency resource is calculated based on a receiving moment of the first information. In this embodiment of this disclosure, the delay between sending and receiving of the first information may be ignored, that is, the first apparatus and the at least one second apparatus may synchronously enable the target time-frequency resource based on the enabling indication information.

It should be noted that the enabling indication information may be included in the first information for sending. The enabling indication information may alternatively be independent of the first information, that is, the enabling indication information is carried in other sub-information that is in the broadcast information and that is different from the first information, and is sent to the at least one second apparatus together with the first information indicating the to-be-offset.

In a specific implementation, the enabling indication information may be indicated by duration information, and the duration information indicates a time interval. For example, the duration information may be 100 ms, 200 ms, 500 ms, 1 s, 1.2 s, 1.3 s, 1.7 s, or another value. For example, the duration information is 1 s. To be specific, timing starts after the first information is sent, and the target time-frequency resource is enabled after 1 s.

In a specific implementation, the enabling indication information may also be count information. The count information is a quantity of remaining transmitted times of the broadcast information used to carry the first information. In other words, the count information represents a quantity of remaining to-be transmitted times of the broadcast information that carries the first information. Because each time the broadcast information carries one piece of first information, it may be understood that the quantity of remaining transmitted times of the broadcast information is the quantity of remaining transmitted times of the first information. Because the broadcast information is sent in a specific period, the enabled moment of the target time-frequency resource may be calculated based on the sending period and the quantity of remaining transmitted times of the broadcast information. In some possible embodiments, the broadcast information including the first information is sent for a plurality of times, and each time the broadcast information carries one piece of first information. The count information in the first information decreases progressively with each time the broadcast information (or the first information) is sent. The target time-frequency resource is enabled when the count information decreases progressively to 0.

In an embodiment of this disclosure, the first information further includes at least one group identifier. In this case, the at least one second apparatus is grouped in advance, each second apparatus has an identifier corresponding to a group, and the group identifier included in the first information is an identifier of a group in which a second apparatus corresponding to the first time-frequency resource and the target time-frequency resource is located. It should be noted that the second apparatus may be grouped by the first apparatus, or may be grouped based on a factory setting of the second apparatus or a standard definition. This is not limited in this disclosure. In this embodiment of this disclosure, a quantity of second apparatuses corresponding to each group identifier may be the same or may be different. This is not limited in this embodiment of this disclosure.

It should be noted that, a quantity of group identifiers included in the first information is N1, where N1 is an integer greater than or equal to 1. A quantity of to-be-offsets included in the first information is N2, where N2 is an integer greater than or equal to 1, and N1 is greater than or equal to N2. A type of each to-be-offset may be a time domain offset, a frequency domain offset, or a time-frequency and a frequency-domain offset. When the quantity of group identifiers is equal to the quantity of to-be-offsets (that is, N1 is equal to N2), each group identifier corresponds to one to-be-offset, and different group identifiers correspond to different to-be-offsets. When the quantity of group identifiers is greater than a quantity of to-be-offsets (that is, N1 is greater than N2), a plurality of group identifiers may correspond to one to-be-offset.

In an embodiment of this disclosure, the first information further includes transmission direction indication information. The transmission direction indication information indicates at least one of an uplink direction and a downlink direction. If the transmission direction indication information indicates the uplink direction (for example, the second apparatus sends data to the first apparatus), the first time-frequency resource and the target time-frequency resource are uplink time-frequency resources, that is, the first time-frequency resource and the target time-frequency resource carry data from the at least one second apparatus. If the transmission direction indication information indicates the downlink direction (for example, the first apparatus sends data to the second apparatus), the first time-frequency resource and the target time-frequency resource are downlink time-frequency resources, that is, the first time-frequency resource and the target time-frequency resource carry data to be sent to the at least one second apparatus. If the transmission direction indication information indicates the uplink direction and the downlink direction, the first time-frequency resource and the target time-frequency resource have both the uplink time-frequency resource and the downlink time-frequency resource.

In an embodiment of this disclosure, the first information further includes transmission direction indication information and at least one group identifier. For related descriptions of the transmission direction indication information and the group identifier, refer to the foregoing descriptions of the transmission direction indication information and the group identifier. For brevity of the specification, details are not described herein again.

S104: The at least one second apparatus receives the first information, and determines the target time-frequency resource based on the first time-frequency resource and the first information.

In this embodiment of this disclosure, the at least one second apparatus receives the first information from the first apparatus, and the second apparatus may determine the target time-frequency resource based on the currently used first time-frequency resource and the received first information. Further, because the first information indicates the offset in frequency domain and the offset direction, and/or the offset in time domain and the offset direction, the second apparatus may perform corresponding adjustment based on the first information and the frequency domain range and the time domain range of the first time-frequency resource, to obtain the frequency domain range and the time domain range corresponding to the target time-frequency resource.

In a specific implementation, the first information further includes enabling indication information, and the enabling indication information is indicated by duration. The at least one second apparatus starts timing after receiving the first information from the first apparatus, and the at least one second apparatus enables the target time-frequency resource after the duration represented by the enabling indication information.

In a specific implementation, the first information further includes enabling indication information, and the enabling indication information is indicated by count information, where the count information indicates a quantity of remaining transmitted times of the broadcast information that carries the first information. In this case, it indicates that the broadcast information that carries the first information is sent for a plurality of times. The broadcast information is sent at a specific period, each time the broadcast information carries one piece of first information, and the count information (namely, the quantity of remaining transmitted times) decreases progressively as the broadcast information (or the first information) is sent (or broadcast) each time. The at least one second apparatus enables the target time-frequency resource when the count information progressively decreases to 0. In a possible embodiment, the first apparatus sends the broadcast information for a plurality of times, but the second apparatus does not receive the broadcast information each time, and may receive the broadcast information only once or several times. The enabled moment of the target time-frequency resource may be obtained based on the period of the broadcast information and the count information in the latest received broadcast information among the several times or the once received broadcast information.

Optionally, after determining the target time-frequency resource and before enabling the target resource, the at least one second apparatus may perform channel estimation on a channel on which the target time-frequency resource is located. If there is a correlation between the channel on which the target time-frequency resource is located and a channel on which the first time-frequency resource is located, the at least one second apparatus may continue to use an initial channel configuration parameter. If there is no correlation between the channel on which the target time-frequency resource is located and the channel on which the first time-frequency resource is located, the at least one second apparatus may correct, by using a parameter obtained after channel estimation, signal orthogonality damage caused by a frequency offset or the like.

In an embodiment of this disclosure, the first information received by the second apparatus further includes the at least one group identifier. For specific implementation of a corresponding step in which the second apparatus determines, based on the first time-frequency resource and the first information, to enable the target time-frequency resource, refer to an embodiment in FIG. 10. Details are not described herein again.

In an embodiment of this disclosure, the first information received by the second apparatus further includes the transmission direction indication information. For specific implementation of a corresponding step in which the second apparatus determines, based on the first time-frequency resource and the first information, to enable the target time-frequency resource, refer to an embodiment in FIG. 12. Details are not described herein again.

In an embodiment of this disclosure, the first information received by the second apparatus further includes the transmission direction indication information and the at least one group identifier. For specific implementation of a corresponding step in which the second apparatus determines, based on the first time-frequency resource and the first information, to enable the target time-frequency resource, refer to an embodiment in FIG. 14. Details are not described herein again.

S105: Optionally, the first apparatus communicates with the at least one second apparatus on the target time-frequency resource.

In this embodiment of this disclosure, after the target time-frequency resource is enabled, the first apparatus can communicate with the at least one second apparatus on the target time-frequency resource. Further, the first apparatus sends and/or receives data on the target time-frequency resource, and the at least one second apparatus receives or sends the data on the target time-frequency resource.

It should be noted that, because different second apparatuses correspond to different data transmission directions, further, the first apparatus sends the data to the at least one second apparatus on the target time-frequency resource, and correspondingly, the at least one second apparatus may receive the data from the first apparatus on the target time-frequency resource, and the at least one second apparatus may send the data to the first apparatus on the target time-frequency resource, and correspondingly, the first apparatus receives the data from the at least one second apparatus on the target time-frequency resource.

It may be learned that, in this embodiment of this disclosure, the offset is performed on the current time-frequency resource in at least one dimension of time domain and frequency domain to obtain the new time-frequency resource, thereby implementing fast configuration of the time-frequency resource. When the current time-frequency resource is interfered with, an adjustment operation is performed on the current time-frequency resource in frequency domain and/or time domain, thereby effectively reducing or even eliminating interference and obtaining better transmission quality. In addition, the at least one of the group identifier and the transmission direction indication information is introduced to assist in time-frequency resource configuration, thereby improving resource configuration flexibility, improving resource configuration efficiency, and improving data transmission performance and quality.

Figure 5A:
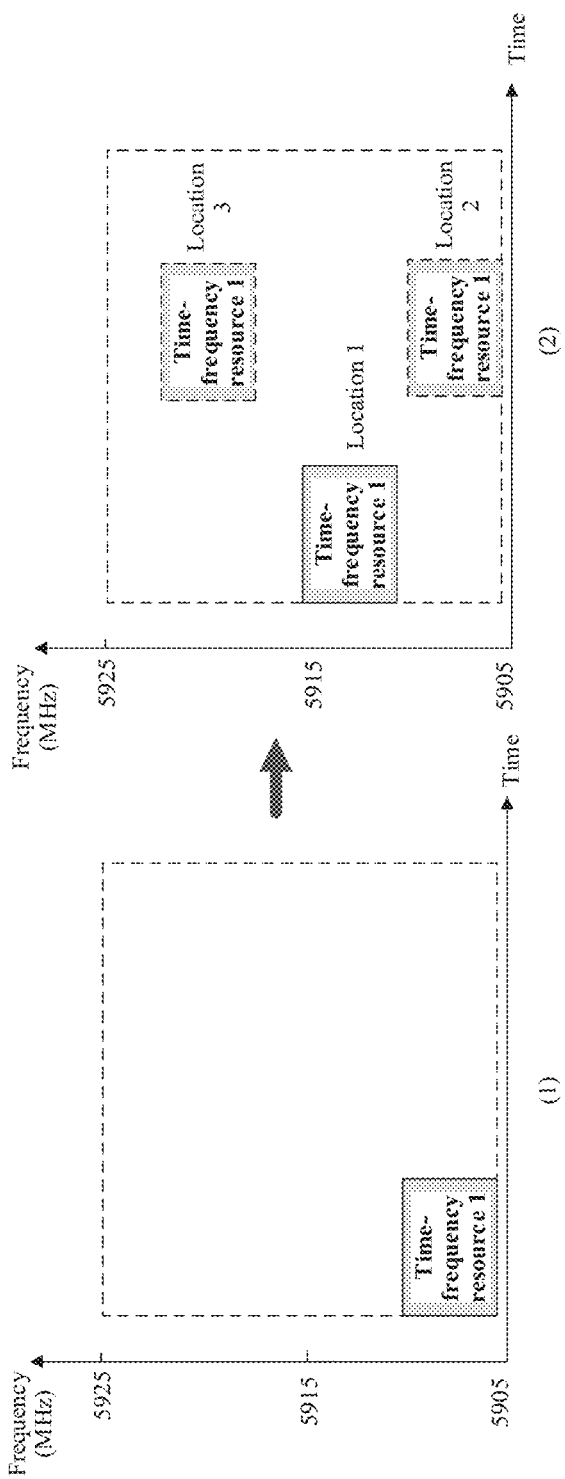
FIG. 5A is a schematic diagram of an offset of a time-frequency resource according to an embodiment of this disclosure.
Figure 5B:
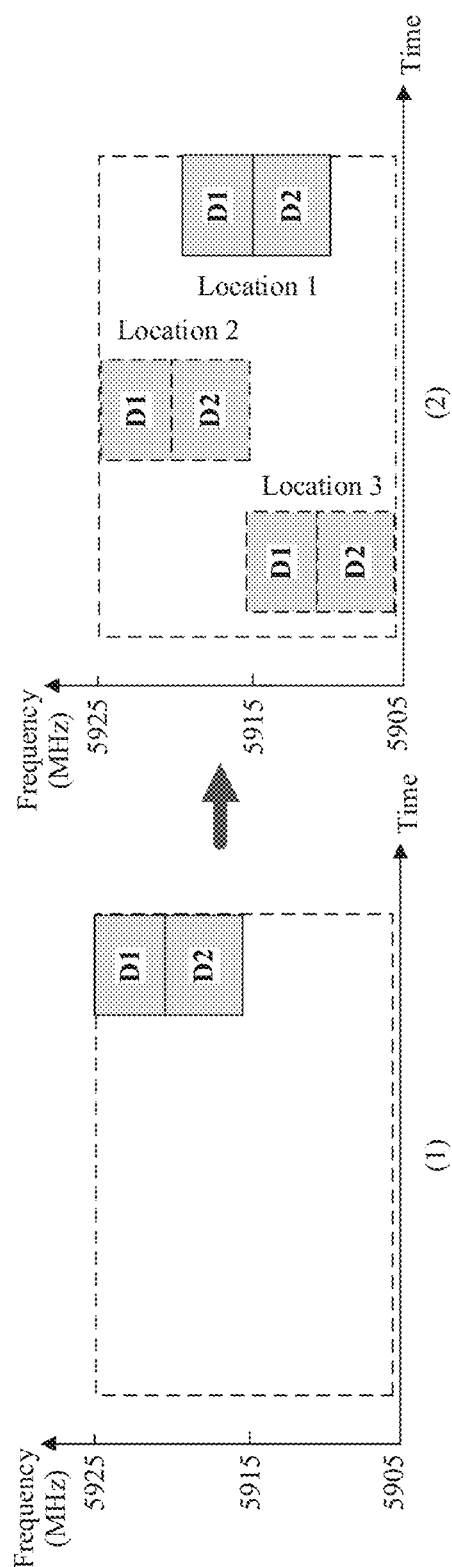
FIG. 5B is a schematic diagram of an offset of a time-frequency resource according to an embodiment of this disclosure.

Refer to FIG. 5A and FIG. 5B. The following describes the method in the embodiment in FIG. 4 by using some specific application scenarios.

It should be noted that, in FIG. 5A and FIG. 5B, a light-color block is a first time-frequency resource allocated by a first apparatus to at least one second apparatus, and the light-color block represents that a system bandwidth (a frequency domain range and a time domain range) occupied by the time-frequency resource 1 may be set to 20 MHz, for example, from 5905 MHz to 5925 MHz. Configuration performed by the first apparatus on the first time-frequency resource used by the second apparatus indicates configuration performed on the first time-frequency resource in the system bandwidth. A dashed-line rectangular box is used to more obviously display a change of a time-frequency location of the time-frequency resource 1 in FIG. 5A and FIG. 5B.

Refer to (1) in FIG. 5A. A time-frequency resource 1 is the first time-frequency resource used by one second apparatus, and the time-frequency resource 1 may also be referred to as a current time-frequency resource or an initial time-frequency resource. The first apparatus re-allocates the time-frequency resource 1 used by the second apparatus. Refer to (2) in FIG. 5A. The three time-frequency resources 1 corresponding to a location 1 to a location 3 are configuration results of three operation manners, and the time-frequency resource 1 in each of the three configuration results is the target time-frequency resource corresponding to the first time-frequency resource (namely, the time-frequency resource 1 in (1) in FIG. 5A in the method embodiment in FIG. 4. Further, the three operation manners are as follows. The time-frequency resource 1 in (1) in FIG. 5A may be offset in frequency domain in a frequency increase direction, to obtain the result (the time-frequency resource 1 at the location 1), the time-frequency resource 1 in (1) in FIG. 5A may be offset in time domain in a time delay direction, to obtain the result (the time-frequency resource 1 at the location 2), and the time-frequency resource 1 in (1) in FIG. 5A may be offset in both time domain and frequency domain, to obtain the result (the time-frequency resource 1 at the location 3).

Refer to (1) in FIG. 5B. Time-frequency resources D1 and D2 are first time-frequency resources used by two second apparatuses, and the time-frequency resources D1 and D2 may also be referred to as current time-frequency resources or initial time-frequency resources. The first apparatus re-allocates the time-frequency resources D1 and D2 used by the second apparatuses. Refer to (2) in FIG. 5B. The three groups of time-frequency resources D1 and D2 corresponding to a location 1 to a location 3 are configuration results of three operation manners, and the time-frequency resources D1 and D2 in each of the three configuration results are the target time-frequency resources corresponding to the first time-frequency resources (namely, the time-frequency resources D1 and D2 in (1) in FIG. 5B in the method embodiment in FIG. 4. Further, the three operation manners are as follows. The time-frequency resources D1 and D2 in (1) in FIG. 5B may be offset in frequency domain in a frequency decrease direction, to obtain the result (the time-frequency resources D1 and D2 at the location 1), the time-frequency resources D1 and D2 in (1) in FIG. 5B may be offset in time domain in a time advance direction, to obtain the result (the time-frequency resources D1 and D2 at the location 2), and the time-frequency resources D1 and D2 in (1) in FIG. 5B may be offset in both time domain and frequency domain, to obtain the result (the time-frequency resources D1 and D2 at the location 3).

Figure 6:
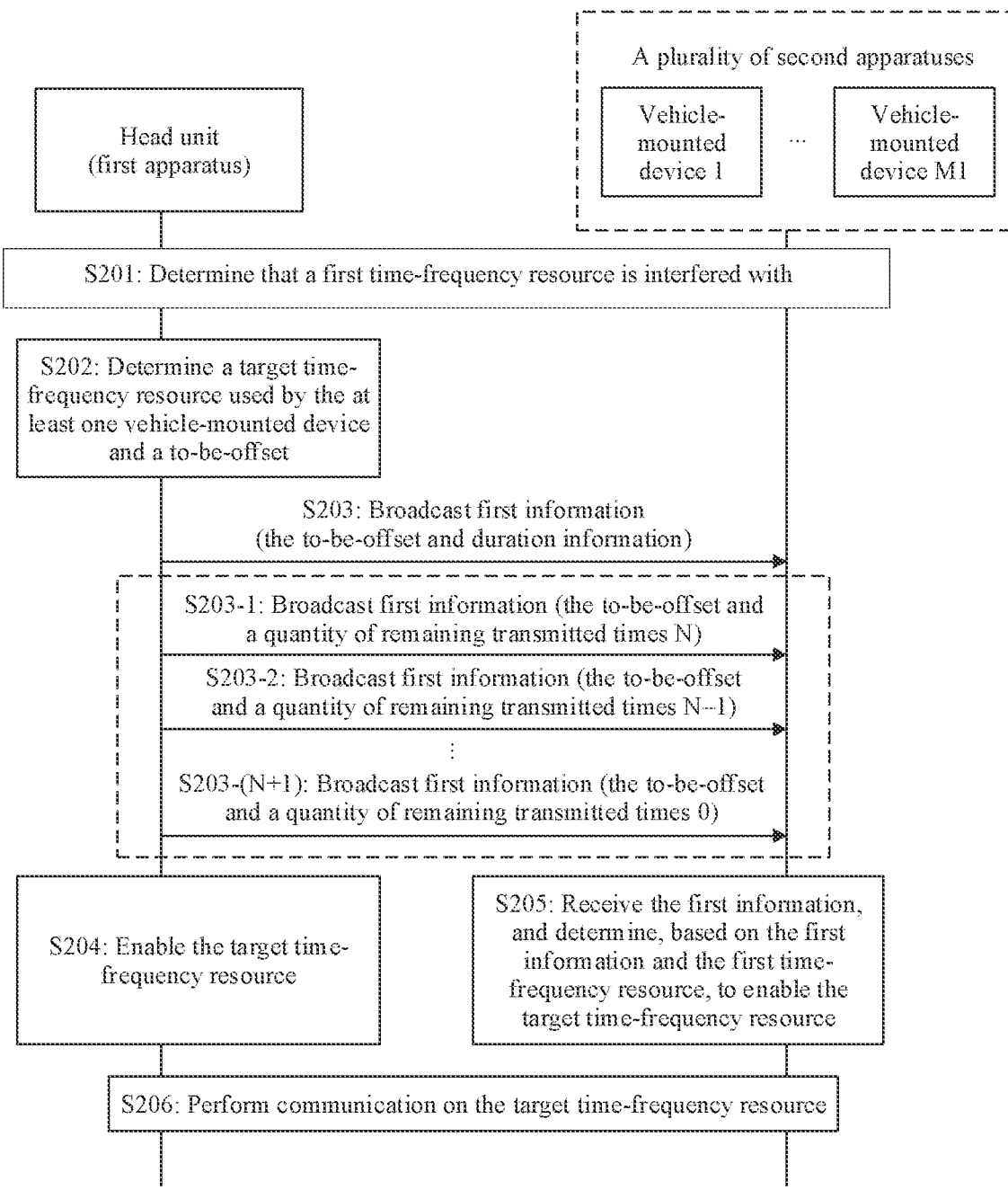
FIG. 6 is a flowchart of a resource configuration method according to an embodiment of this disclosure.

Refer to FIG. 6. Based on the system structure described above, the following describes another resource configuration method provided in an embodiment of this disclosure. Relative to the embodiment in FIG. 4, a head unit is the first apparatus in the embodiment in FIG. 4, and a cascaded device is the second apparatus in the embodiment in FIG. 4. In addition, a first time-frequency resource is interfered with. The embodiment in FIG. 6 may be independent of the embodiment in FIG. 4, or may be a supplement to the embodiment in FIG. 4. The method includes but is not limited to the following steps.

S201: Determine that the first time-frequency resource is interfered with.

In this embodiment of this disclosure, an interference signal is mapped to a second time-frequency resource on a wireless channel. If it is detected that a part or all of the second time-frequency resource overlaps the first time-frequency resource allocated by the head unit to at least one vehicle-mounted device, or interference is detected on the first time-frequency resource, it may be determined that the first time-frequency resource is interfered with.

In an embodiment of this disclosure, the head unit detects that an interference signal exists on the first time-frequency resource. Further, the head unit monitors whether the interference signal exists on the first time-frequency resource. If the interference signal exists, it indicates that the first time-frequency resource is interfered with, which is represented in a manner in which a time-frequency location (namely, corresponding frequency domain range and time domain range) of the interference signal overlaps a time-frequency location (namely, corresponding frequency domain range and time domain range) of the first time-frequency resource.

In another embodiment of this disclosure, the head unit receives interference indication information from the at least one vehicle-mounted device, and determines that the first time-frequency resource is interfered with. The vehicle-mounted device detects whether the interference signal exists on the first time-frequency resource corresponding to the vehicle-mounted device. If the interference signal exists, it indicates that the first time-frequency resource corresponding to the vehicle-mounted device is interfered with, and the vehicle-mounted device sends the interference indication information to the head unit. The interference indication information indicates that the first time-frequency resource is interfered with, and the interference indication information may further carry the time-frequency location information of the detected interference signal. In some possible embodiments, the vehicle-mounted device may further detect a time-frequency resource other than the current time-frequency resource, to determine an idle time-frequency resource or a time-frequency resource with little interference, and report the time-frequency resource to the head unit, to assist the head unit in determining the target time-frequency resource. Therefore, the interference indication information sent by the vehicle-mounted device to the head unit may further carry information about the detected idle time-frequency resource or time-frequency resource with little interference.

In another embodiment of this disclosure, the head unit may further determine, with reference to a result of detection performed by the head unit on the first time-frequency resource and the interference indication information reported by the at least one vehicle-mounted device, whether the interference signal exists on the first time-frequency resource, and when the interference signal exists, determine that the first time-frequency resource is interfered with.

It should be noted that the interference signal in this embodiment of this disclosure is caused because a time-frequency resource allocated by a head unit in another short-distance vehicle to a vehicle-mounted device overlaps, in both frequency domain and time domain, the time-frequency resource allocated by the head unit in this vehicle to the vehicle-mounted device for use. In other words, interference is generated when the two time-frequency resources are used at the same time within a same frequency domain range. Such interference may result in a data transmission failure between the head units in vehicles and the vehicle-mounted devices, a packet loss, distortion of audio played by a loudspeaker, invalid noise cancellation, and the like.

It should be noted that, if a head unit in a surrounding vehicle also manages a wireless spectrum resource in the vehicle in a SPS manner, when a time-frequency resource transmitted in the surrounding vehicle is an interference signal for the time-frequency resource used in the vehicle, it is easy to understand that due to the SPS, the interference signal is periodic, that is, the interference signal occurs periodically in time when the vehicle is in a dense area.

S202: The head unit determines a target time-frequency resource used by the at least one vehicle-mounted device and a to-be-offset.

In this embodiment of this disclosure, after determining that the first time-frequency resource is interfered with, the head unit may determine, based on an interference status, the target time-frequency resource used by the at least one vehicle-mounted device. The target time-frequency resource corresponds to the first time-frequency resource. That is, a bandwidth of a frequency domain range in which the target time-frequency resource is located is equal to a bandwidth of a frequency domain range in which the first time-frequency resource is located, and duration of a time domain range in which the target time-frequency resource is located is equal to duration of a time domain range in which the first time-frequency resource is located. Finally, the head unit determines the to-be-offset based on the target time-frequency resource and the first time-frequency resource.

It should be noted that, in addition to indicating that the first time-frequency resource is interfered with, the interference indication information sent by the vehicle-mounted device may further carry the information about the idle time-frequency resource or time-frequency resource with little interference detected by the vehicle-mounted device. The head unit may determine the target time-frequency resource with reference to the interference indication information sent by the at least one vehicle-mounted device, so that the determined target time-frequency resource does not overlap a time-frequency resource corresponding to the interference signal, or an overlapping part is reduced compared with an overlapping part between the first time-frequency resource and the time-frequency resource corresponding to the interference signal, thereby improving data transmission quality.

It should be noted that, in principle, the target time-frequency resource and the second time-frequency resource corresponding to the interference signal no longer overlap each other in frequency domain and time domain as much as possible, which means that interference disappears. In some possible embodiments, because the idle time-frequency resources on the current wireless channel are limited, the target time-frequency resource determined by the head unit and the second time-frequency resource corresponding to the interference signal still overlap in time domain and frequency domain, but an overlapping part between the target time-frequency resource and the second time-frequency resource is significantly reduced compared with an overlapping part between the first time-frequency resource and the second time-frequency resource, which means that interference is reduced.

It may be understood that the to-be-offset may be at least one of a frequency domain offset and a time domain offset. The time domain offset is a difference between the target time-frequency resource and the first time-frequency resource in time domain, and the frequency domain offset is a difference between the target time-frequency resource and the first time-frequency resource in frequency domain. It should be noted that the time domain offset is the first time domain resource offset in the embodiment in FIG. 4, and the frequency domain offset is the first frequency domain resource offset in the embodiment in FIG. 4.

In an embodiment of this disclosure, when the to-be-offset is the frequency domain offset, the to-be-offset may further indicate a frequency offset direction, namely, an offset direction in frequency domain. For example, the frequency offset direction may be indicated explicitly. In specific implementation, 1 byte may be used to indicate the frequency domain offset, and the most significant bit 1 bit in the 1 byte is used to indicate the frequency offset direction. For example, 1 indicates an upward offset (namely, adjustment in a frequency increase direction), and 0 indicates a downward offset (namely, offset in a frequency decrease direction). Remaining 7 bits in the 1 byte indicate a frequency offset degree Nf, where Nf is a positive integer. If Nf is 0, it indicates that no adjustment is performed in a frequency dimension, or if Nf is not 0, it indicates that a frequency offset in the frequency offset direction is Nf times a frequency domain range of a minimum time-frequency resource unit. In some possible embodiments, the frequency offset direction may also be indicated implicitly. For example, if the frequency domain offset is a positive value, it indicates an upward offset (namely, adjustment in a frequency increase direction), or if the frequency domain offset is a negative value, it indicates a downward offset (namely, adjustment in a frequency decrease direction).

Figure 7A:
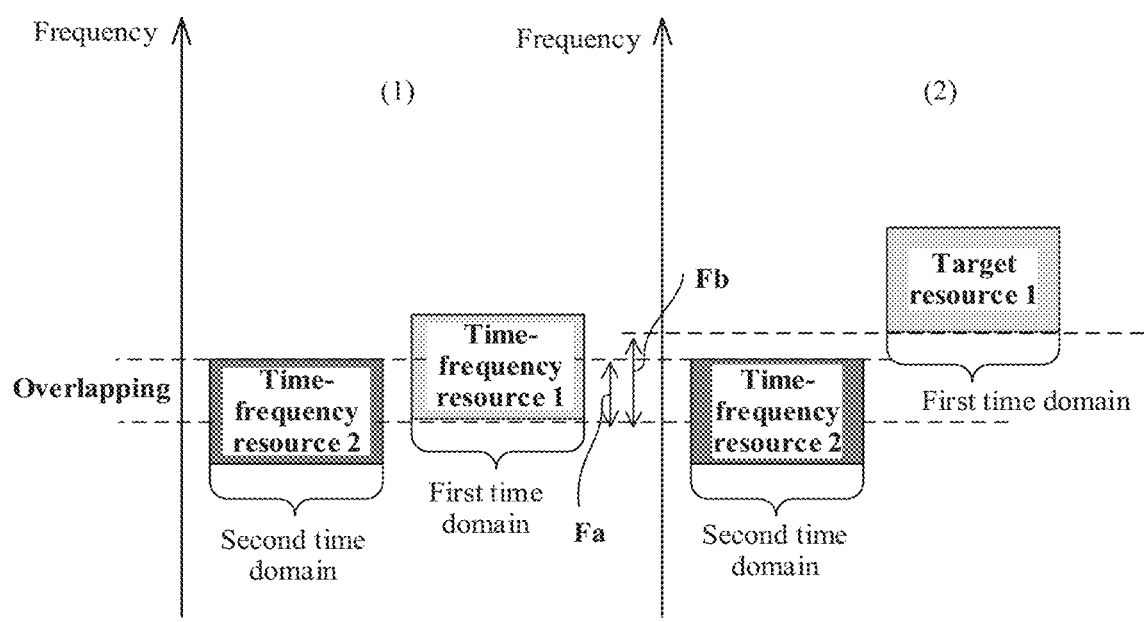
FIG. 7A is a schematic diagram of an offset of a time-frequency resource in frequency domain according to an embodiment of this disclosure.

Refer to FIG. 7A. A time-frequency resource 1 is a first time-frequency resource used by a vehicle-mounted device, a time-frequency resource 2 is a second time-frequency resource to which an interference signal is mapped on a wireless channel, and first time domain partially or totally overlaps second time domain. It is easily seen that the time-frequency resource 1 is interfered with. A target resource 1 is a target time-frequency resource used by the vehicle-mounted device, and corresponds to the time-frequency resource 1. In (1) in FIG. 7A, a frequency bandwidth in which the time-frequency resource 1 overlaps the time-frequency resource 2 in frequency domain is Fa. Compare (1) in FIG. 7A with (2) in FIG. 7A, it can be seen that an offset from the time-frequency resource 1 to the target resource 1 in frequency domain is Fb, and Fb>Fa. This is because overlapped Fa is not an integer multiple of a frequency domain range of a minimum time-frequency resource unit, the offset Fb in frequency domain is an integer multiple of the frequency domain range of the minimum time-frequency resource unit. Therefore, Fb>Fa.

In an embodiment of this disclosure, when the to-be-offset is the time domain offset, the to-be-offset may further indicate a time offset direction, namely, an offset direction in time domain. For example, the time offset direction may be indicated explicitly. In specific implementation, 1 byte may be used to indicate the time domain offset, and the most significant bit 1 bit in the 1 byte is used to indicate the time offset direction. For example, 1 indicates a leftward offset (namely, adjustment in a time advance direction), and 0 indicates a rightward offset (namely, an offset in a time delay direction). Remaining 7 bits in the 1 byte indicate a time offset degree Nf, where Nf is a positive integer. If Nf is 0, it indicates that no adjustment is performed in a time dimension, or if Nf is not 0, it indicates that a time offset in the time offset direction is Nf times a time domain range of a minimum time-frequency resource unit. In some possible embodiments, the frequency offset direction may also be indicated implicitly. For example, if the time domain offset is a positive value, it indicates a leftward offset (namely, adjustment in a time advance direction), or if the time domain offset is a negative value, it indicates a rightward offset (namely, an offset in a time delay direction).

Figure 7B:
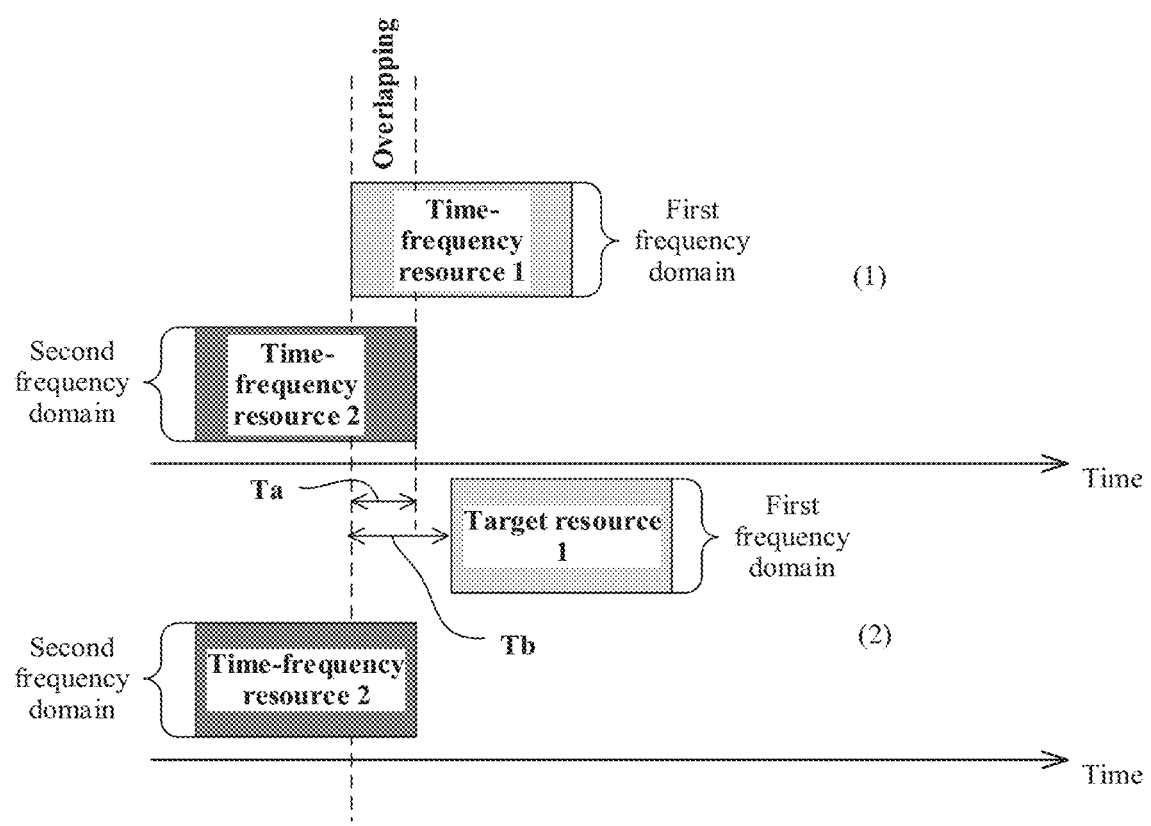
FIG. 7B is a schematic diagram of an offset of a time-frequency resource in time domain according to an embodiment of this disclosure.

Refer to FIG. 7B. A time-frequency resource 1 is a first time-frequency resource used by a vehicle-mounted device, a time-frequency resource 2 is a second time-frequency resource to which an interference signal is mapped on a wireless channel, and first frequency domain partially or totally overlaps second frequency domain. It is easily seen that the time-frequency resource 1 is interfered with. A target resource 1 is a target time-frequency resource used by the vehicle-mounted device, and corresponds to the time-frequency resource 1. In (1) in FIG. 7B, duration in which the time-frequency resource 1 overlaps the time-frequency resource 2 in time domain is Ta. Compare (1) in FIG. 7B with (2) in FIG. 7B, it can be seen that an offset from the time-frequency resource 1 to the target resource 1 in time domain is Tb, and Tb>Ta. This is because overlapped Ta is not an integer multiple of a time domain range of a minimum time-frequency resource unit, the offset Tb in time domain is an integer multiple of the time domain range of the minimum time-frequency resource unit. Therefore, Tb>Ta.

In an embodiment of this disclosure, when the to-be-offsets are the frequency domain offset and the time domain offset, the to-be-offsets may further indicate a frequency offset direction and a time offset direction. In specific implementation, 2 bytes may be used to indicate the to-be-offsets, 1 byte indicates the frequency domain offset and indicates that a difference between the target time-frequency resource and the first time-frequency resource in frequency domain is an integer multiple of a frequency domain range of a minimum time-frequency resource unit that is offset in a specified frequency offset direction, and the other 1 byte indicates the time domain offset and indicates that a difference between the target time-frequency resource and the first time-frequency resource in time domain is an integer multiple of a time domain range of a minimum time-frequency resource unit that is offset in a specified time offset direction.

It should be noted that the minimum time-frequency resource unit is a specified minimum granularity for resource division. For example, the minimum time-frequency resource unit is 500 kilohertz (KHz)*1 microsecond (µs). To be specific, a frequency domain range of the minimum time-frequency resource unit is 500 KHz, a minimum unit of a frequency domain offset is 500 KHz, a time domain range of the minimum time-frequency resource unit is 1 µs, and a minimum unit of a time domain offset is 1 µs. Certainly, the minimum time-frequency resource unit may alternatively be set to another value, this is not limited in this embodiment of this disclosure.

It should be noted that regardless of determined values of the time domain offset and/or the frequency domain offset, the target time-frequency resource is still in operating frequency domain and operating time domain in the system bandwidth.

S203: Optionally, the head unit broadcasts, to the at least one vehicle-mounted device once, first information that carries the to-be-offset.

In this embodiment of this disclosure, after the head unit determines, based on the interference status, the to-be-offset of the first time-frequency resource, the head unit broadcasts, to the at least one vehicle-mounted device only once, the first information that carries the to-be-offset. In this case, the first information further carries duration information, and the duration information is a time interval. For example, the duration information may be 100 ms, 200 ms, 500 ms, 1 s, 1.2 s, 1.3 s, 1.7 s, or another value. The duration information is used to indicate an enabled moment of the target time-frequency resource. For example, the duration information is 1.2 s, that is, timing starts after the first information is broadcast, and the target time-frequency resource is enabled after 1.2 s expires.

It should be noted that broadcasting once means that the broadcast information that carries the first information is sent once on a broadcast channel. Because the broadcast information carries one piece of first information, broadcasting once also means that the first information is sent once.

Optionally, the head unit may also broadcast, to the at least one vehicle-mounted device for a plurality of times, the first information that carries the to-be-offset (refer to S203-1 to S203-(N+1)). The first information broadcast each time further includes a quantity of remaining transmitted times (or referred to as a quantity of remaining broadcast times) in addition to indicating the to-be-offset. The quantity of remaining transmitted times is a quantity of to-be-transmitted times of the broadcast information that carries the first information. Because each time the broadcast information carries one piece of first information, the quantity of remaining transmitted times may also represent a quantity of to-be-transmitted times of the first information, that is, a quantity of times that the first information is further broadcast. Each time the broadcast information (or the first information) is sent, the quantity of remaining transmitted times carried in the first information decreases progressively. When the quantity of remaining transmitted times is 0, the target time-frequency resource is enabled.

It should be noted that, when the head unit performs broadcasting for a plurality of times, broadcasting once means that the broadcast information that carries the first information is sent once on a broadcast channel. Because the broadcast information carries one piece of first information, broadcasting once also means that the first information is sent once.

For example, in S203-1, the head unit broadcasts, to the at least one vehicle-mounted device once, the first information that carries the to-be-offset and the quantity of remaining transmitted times, and the quantity of remaining transmitted times in the first information broadcast this time is N. If the quantity of remaining transmitted times is N, it indicates that the first information further needs to be broadcast N times after this broadcast. If the first information in S203-1 to S203-(N+1) is broadcast at an interval of time T, this broadcast indicates that the target time-frequency resource is enabled at duration N*T after this broadcast.

S204: The head unit enables the target time-frequency resource.

In an embodiment of this disclosure, when the head unit broadcasts, only once, the first information that carries the to-be-offset and the duration information, the head unit enables the target time-frequency resource when the duration information is met.

In another embodiment of this disclosure, if the head unit broadcasts, to the at least one vehicle-mounted device for a plurality of times, the first information that carries the to-be-offset and the quantity of remaining transmitted times, one piece of first information is broadcast each time, and the quantity of remaining transmitted times in the first information decreases progressively with each broadcast. When the head unit broadcasts the first information for the last time, that is, the quantity of remaining transmitted times in the first information in the last broadcast is 0, the head unit enables the target time-frequency resource.

It should be noted that both the duration information and the quantity of remaining transmitted times in S204 are the enabling indication information in the embodiment in FIG. 4, and are used to indicate the enabled moment of the target time-frequency resource. The enabled moment of the target time-frequency resource is different from a communication moment on the target time-frequency resource. There is a possible scenario in which the target time-frequency resource is enabled before communication is performed on the target time-frequency resource. Therefore, the enabled moment of the target time-frequency resource needs to be earlier than or equal to the communication moment on the target time-frequency resource.

S205: The at least one vehicle-mounted device receives the first information, and determines and enables the target time-frequency resource based on the first time-frequency resource and the to-be-offset.

In an embodiment of this disclosure, if the vehicle-mounted device receives the first information broadcast by the head unit only once and the first information carries the to-be-offset and the duration information, the head unit determines, based on the to-be-offset indicated in the first information and with reference to the currently used first time-frequency resource, the frequency domain range and the time domain range in which the target time-frequency resource is located, and the vehicle-mounted device enables the target time-frequency resource when the duration information in the first information is met.

For example, if the duration information is 2 s, timing starts from a moment at which the vehicle-mounted device receives the first information broadcast by the head unit, the vehicle-mounted device determines the target time-frequency resource based on the to-be-offset in the first information and the first time-frequency resource, and the vehicle-mounted device enables the target time-frequency resource after 2 s.

In another embodiment of this disclosure, if the vehicle-mounted device receives, for a plurality of times, the first information broadcast by the head unit, and the first information broadcast each time carries the to-be-offset and the quantity of remaining transmitted times, one piece of first information is broadcast each time, and the quantity of remaining transmitted times in the first information progressively decreases with each broadcast. When the quantity of remaining transmitted times in the first information received by the vehicle-mounted device is 0, the vehicle-mounted device enables the target time-frequency resource.

In another embodiment of this disclosure, if the head unit broadcasts, for a plurality of times, the first information that carries the to-be-offset and the quantity of remaining transmitted times, one piece of first information is broadcast each time, and the quantity of remaining transmitted times in the first information decreases progressively as the first information is broadcast each time, in some possible embodiments, the vehicle-mounted device cannot receive the first information broadcast each time due to interference, sleep, or the like. However, if the vehicle-mounted device receives the first information once in the plurality of times, the vehicle-mounted device may determine the target time-frequency resource based on the to-be-offset carried in the first information in this broadcast and the first time-frequency resource, and further determine the enabled moment of the target time-frequency resource based on the quantity of remaining transmitted times carried in the first information in this broadcast. For example, it is assumed that a broadcast period is T, and if the quantity of remaining transmitted times in the first information received by the vehicle-mounted device in this broadcast is M, the vehicle-mounted device starts timing when receiving the broadcast, and the vehicle-mounted device enables the target time-frequency resource after T*M.

Optionally, after determining the target time-frequency resource and before enabling the target resource, the vehicle-mounted device may perform channel estimation on a time-frequency location of the target time-frequency resource in a wireless channel. If there is a correlation between the channel on which the target time-frequency resource is located and a channel on which the first time-frequency resource is located, the vehicle-mounted device may continue to use an initial channel configuration parameter. If there is no correlation between the channel on which the target time-frequency resource is located and the channel on which the first time-frequency resource is located, the vehicle-mounted device may correct, by using a parameter obtained after channel estimation, signal orthogonality damage caused by a frequency offset or the like.

S206: The head unit communicates with the at least one vehicle-mounted device on the target time-frequency resource. For this step, refer to related descriptions of S105 in the embodiment in FIG. 4. Details are not described herein again.

It should be noted that the head unit is the first apparatus in the embodiment in FIG. 4, and the at least one vehicle-mounted device is the at least one second apparatus in the embodiment in FIG. 4.

It may be learned that, in this embodiment of this disclosure, when the current time-frequency resource used by the at least one vehicle-mounted device is interfered with, the head unit adjusts the current time-frequency resource in at least one dimension of time domain and frequency domain based on the interference status to obtain a new time-frequency resource, thereby effectively reducing or even eliminating interference, and improving performance and quality of data transmission between the head unit in a vehicle and the vehicle-mounted device.

Figure 8A:
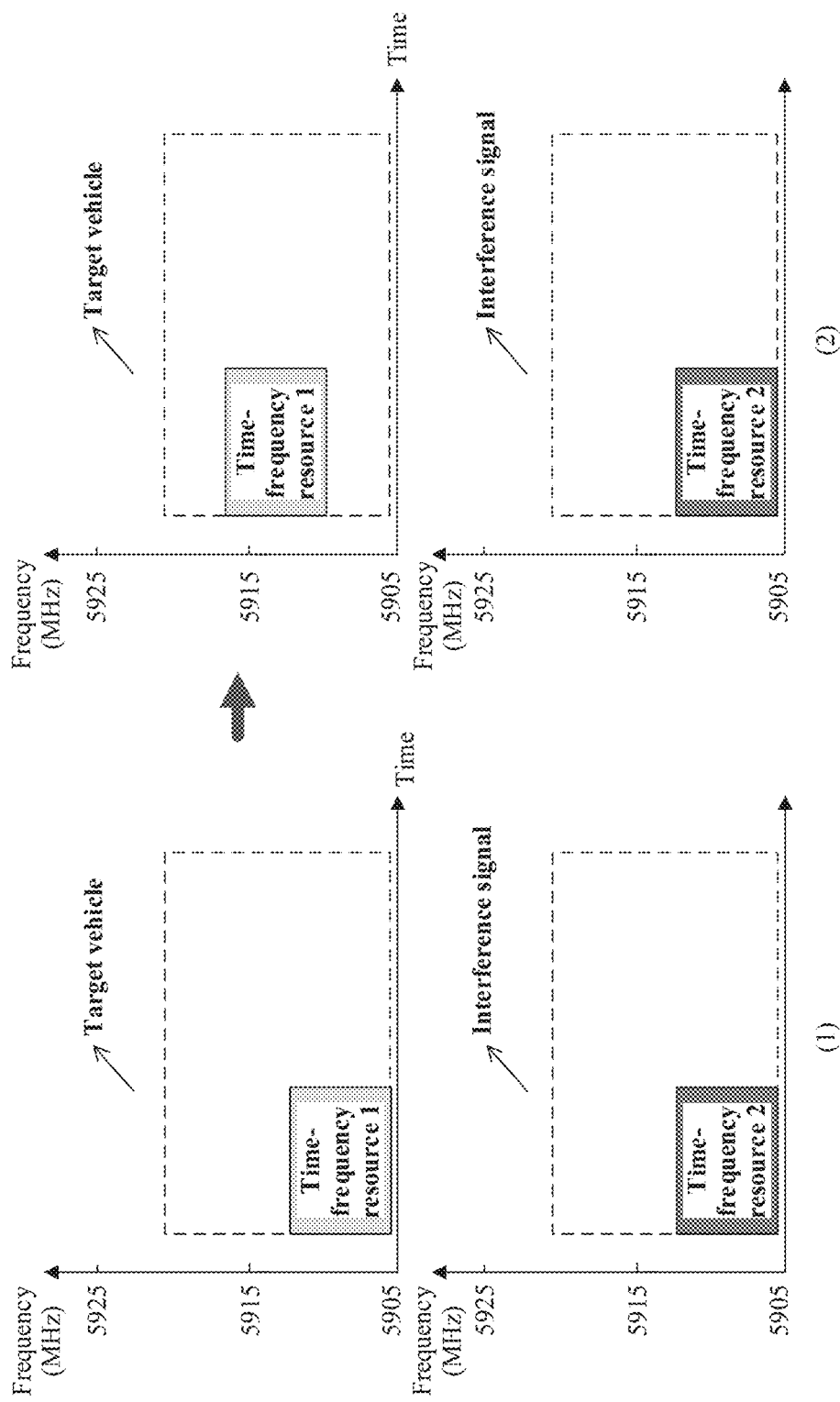
FIG. 8A is a schematic diagram of performing frequency domain offset on a time-frequency resource according to an embodiment of this disclosure.
Figure 8B:
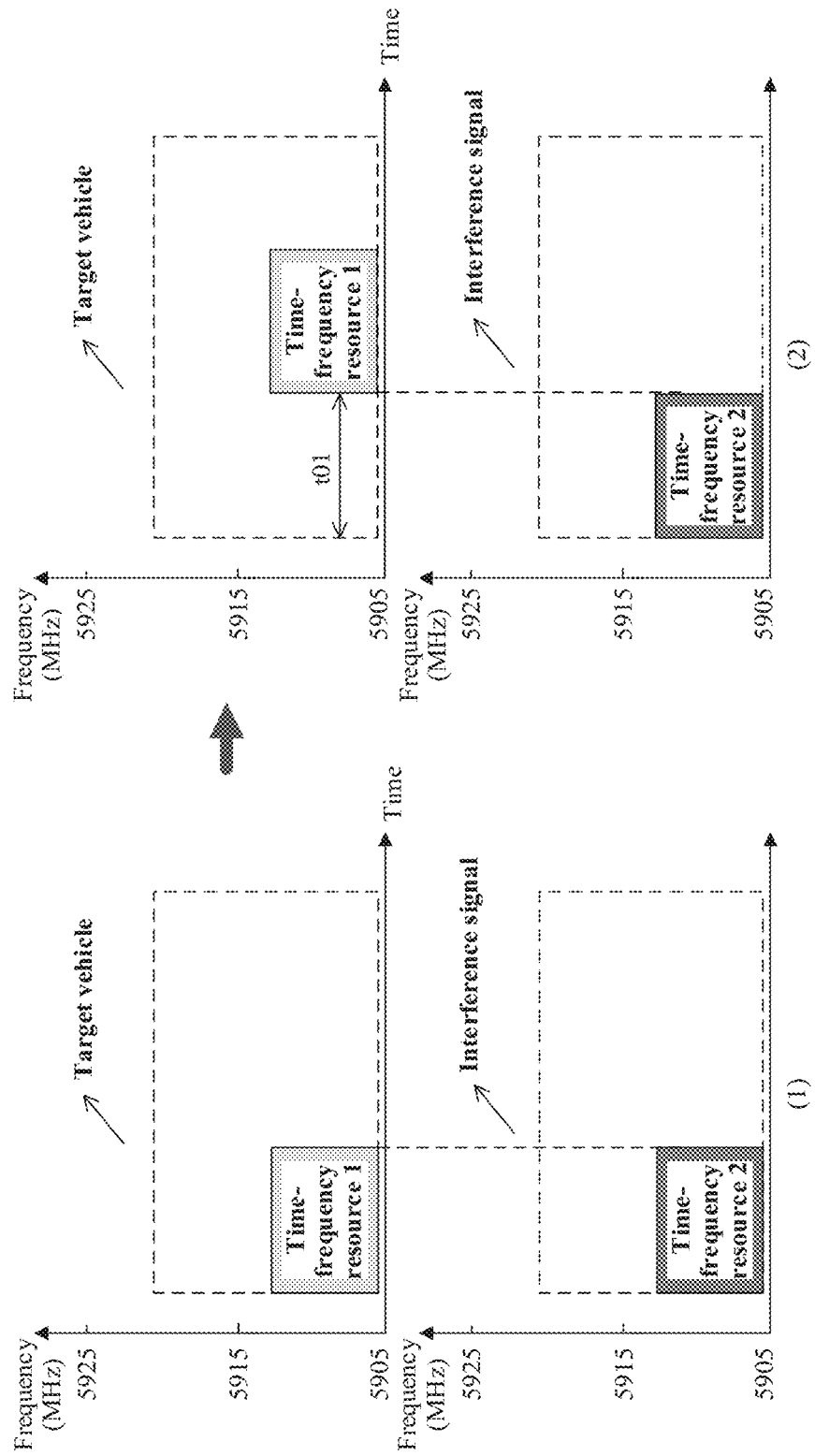
FIG. 8B is a schematic diagram of performing time domain offset on a time-frequency resource according to an embodiment of this disclosure.
Figure 8C:
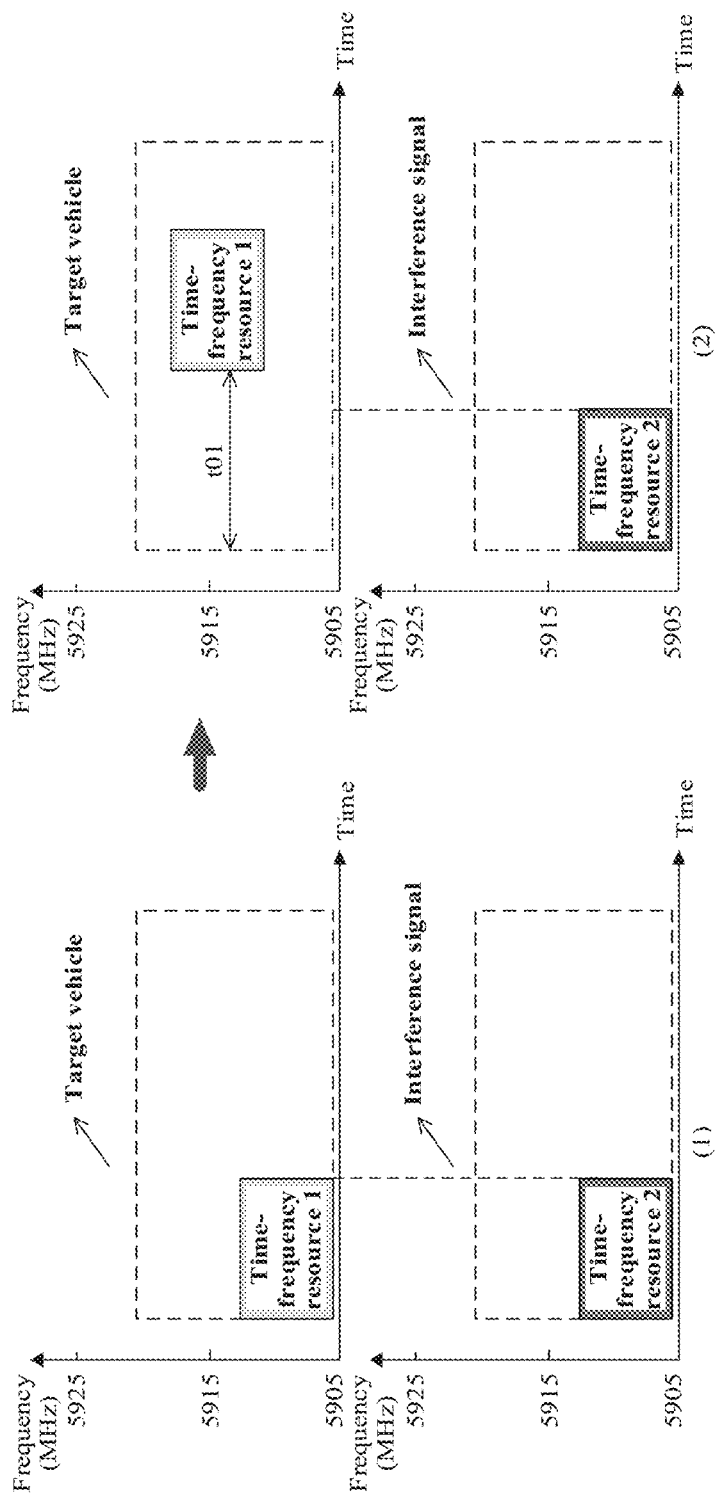
FIG. 8C is a schematic diagram of performing time-frequency offset on a time-frequency resource according to an embodiment of this disclosure.

Refer to FIG. 8A to FIG. 8C. The following further describes the method in the embodiment in FIG. 6 by using some specific application scenarios.

It should be noted that, in FIG. 8A to FIG. 8C, a time-frequency resource 2 is a second time-frequency resource to which an interference signal is mapped on a wireless channel. In (1) in FIG. 8A, (1) in FIG. 8B, and (1) in FIG. 8C, a time-frequency resource 1 is a first time-frequency resource used by a vehicle-mounted device. In (2) in FIG. 8A, (2) in FIG. 8B, and (2) in FIG. 8C, a time-frequency resource 1 is a target time-frequency resource and corresponds to the time-frequency resource 1 in (1) in FIG. 8A, (1) in FIG. 8B, and (1) in FIG. 8C. It is assumed that a system bandwidth is 15 MHz, for example, from 5905 MHz to 5920 MHz. Refer to (1) in FIG. 8A, (1) in FIG. 8B, and (1) in FIG. 8C. The time-frequency resource 1 and the time-frequency resource 2 totally overlap each other in both frequency domain and time domain, and frequency domain ranges of both the time-frequency resource 1 and the time-frequency resource 2 are 5905 MHz to 5910 MHz. It is easily seen that the time-frequency resource 1 is interfered with. A dashed-line rectangular box is used to more obviously display a change of a time-frequency location of the time-frequency resource 1 in FIG. 8A to FIG. 8C.

Refer to (1) in FIG. 8A. The time-frequency resource 1 is interfered with. Refer to (2) in FIG. 8A. The time-frequency resource 1 is offset in frequencies to avoid interference from the time-frequency resource 2, that is, the time-frequency resource 1 is offset in frequency domain in a frequency increase direction, so that the time-frequency resource 1 after offset occupies a frequency location of 5910 MHz to 5915 MHZ (that is, offset by 10 MHZ), thereby avoiding interference from the time-frequency resource 2.

Refer to (1) in FIG. 8B. The time-frequency resource 1 is interfered with. Refer to (2) in FIG. 8B. The time-frequency resource 1 is offset in time to avoid interference from the time-frequency resource 2, that is, the time-frequency resource 1 is offset in time domain in a time delay direction, so that the time-frequency resource 1 is offset by t01 in the time delay direction from a first time domain location in (1) in FIG. 8B to a second time domain location in (2) in FIG. 8B, thereby avoiding interference from the time-frequency resource 2.

Refer to (1) in FIG. 8C. The time-frequency resource 1 is interfered with. Refer to (2) in FIG. 8C. The time-frequency resource 1 is offset in both frequency domain and time domain to avoid interference from the time-frequency resource 2. The time-frequency resource 1 is offset in frequency domain in a frequency increase direction, so that a frequency location is offset from 5905 MHz to 5910 MHz in (1) in FIG. 8C to 5910 MHz to 5915 MHz in (2) in FIG. 8C, and the time-frequency resource 1 is offset in time domain in a time delay direction, that is, a first time domain location in (1) in FIG. 8C is offset by t01 in the time delay direction to a second time domain location in (2) in FIG. 8C, thereby avoiding interference from the time-frequency resource 2.

Refer to FIG. 9A to FIG. 9D. The following further describes the method in the embodiment in FIG. 4 by using some specific application scenarios.

It should be noted that, in FIG. 9A to FIG. 9D, dark-color blocks are second time-frequency resources to which an interference signal is mapped on a wireless channel. In (1) in FIG. 9A, (1) in FIG. 9B, (1) in FIG. 9C, and (1) in FIG. 9D, light-color blocks are first time-frequency resources used by a plurality of vehicle-mounted devices. In (2) in FIG. 9A, (2) in FIG. 9B, (2) in FIG. 9C, and (2) in FIG. 9D, light-color blocks are target time-frequency resources used by the plurality of vehicle-mounted devices. A system bandwidth is set to be 20 MHz, for example, from 5905 MHz to 5925 MHz. Refer to (1) in FIG. 9A, (1) in FIG. 9B, (1) in FIG. 9C, and (1) in FIG. 9D. The first time-frequency resources represented by the light-color blocks and second time-frequency resources represented by the dark-color blocks overlap in both frequency domain and time domain. It is easily seen that the first time-frequency resources represented by the light-color blocks are encountering interference. A dashed-line rectangular box is used to more obviously display a change of a time-frequency location of the first time-frequency resources in FIG. 9A to FIG. 9D.

Figure 9A:
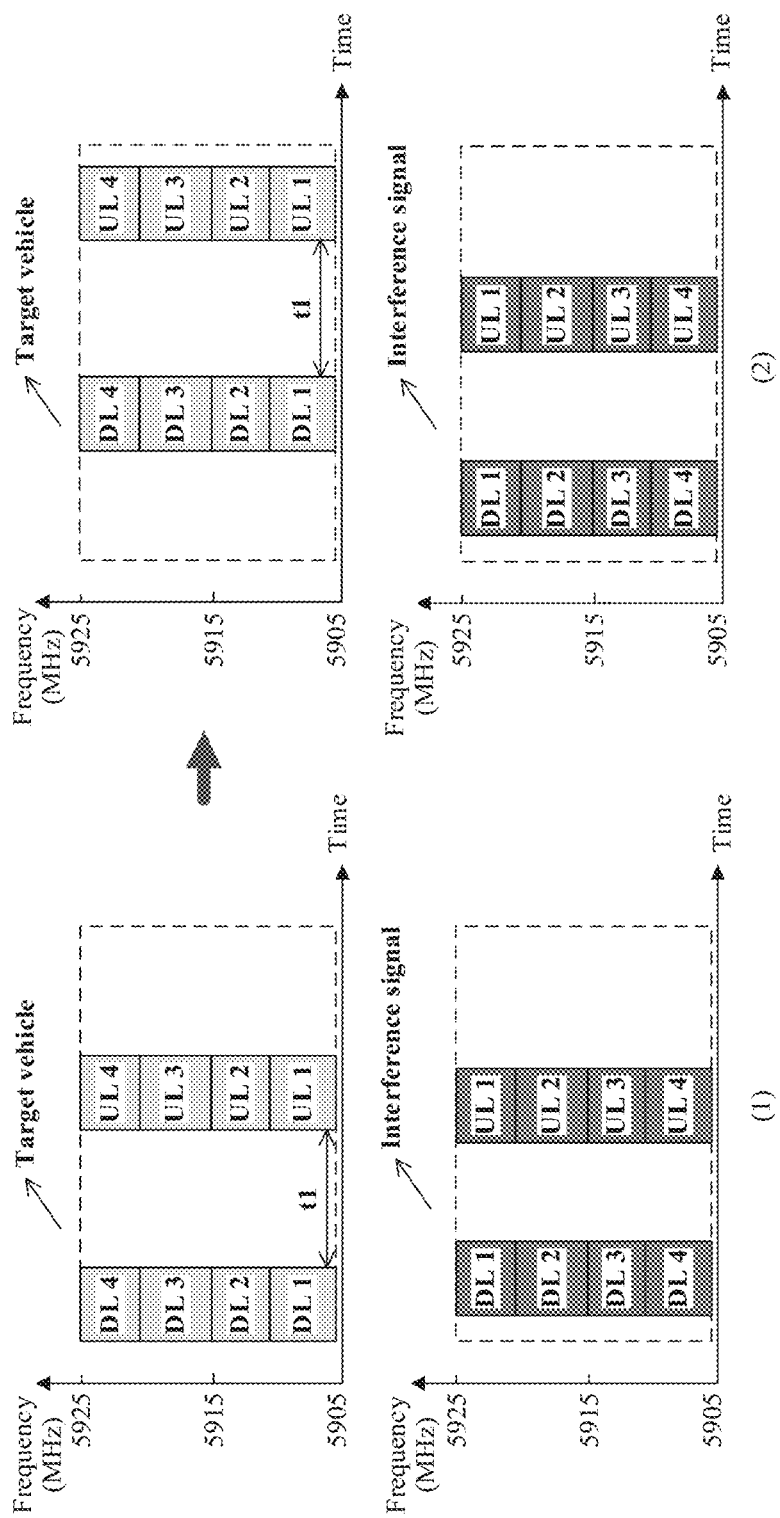
FIG. 9A is a schematic diagram of performing time domain offset on another time-frequency resource according to an embodiment of this disclosure.

Refer to (1) in FIG. 9A. The first time-frequency resources represented by the light-color blocks are encountering interference, and a frequency domain range of an overlapping part is from 5905 MHz to 5925 MHz. Refer to (2) in FIG. 9A. The first time-frequency resources are offset in time to avoid interference from the second time-frequency resources, that is, the first time-frequency resources in (1) in FIG. 9A are totally offset in time domain in a time delay direction to obtain the target time-frequency resources in (2) in FIG. 9A, so that the target time-frequency resources do not overlap the second time-frequency resources corresponding to the interference signal, thereby avoiding interference from the second time-frequency resources.

Figure 9B:
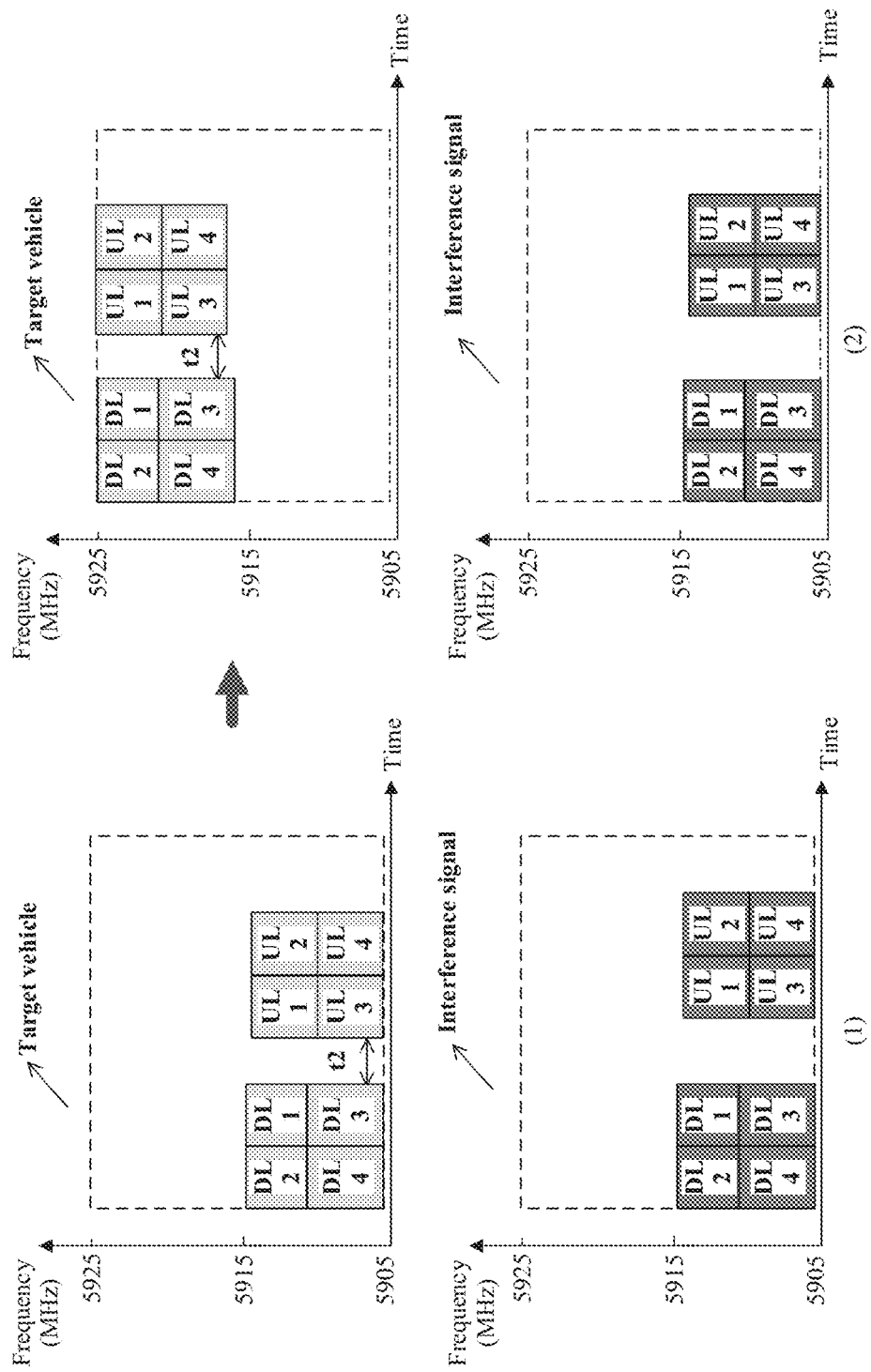
FIG. 9B is a schematic diagram of performing frequency domain offset on another time-frequency resource according to an embodiment of this disclosure.

Refer to (1) in FIG. 9B. The first time-frequency resources represented by the light-color blocks are encountering interference, and a frequency domain range of an overlapping part is from 5905 MHz to 5915 MHz. Refer to (2) in FIG. 9B. The first time-frequency resources are offset in frequencies to avoid interference from the second time-frequency resources, that is, the first time-frequency resources in (1) in FIG. 9B are offset by 10 MHz in frequency domain in a frequency increase direction to obtain the target time-frequency resources in (2) in FIG. 9B (whose frequency domain range is from 5915 MHz to 5925 MHz), so that the target time-frequency resources do not overlap the second time-frequency resources corresponding to the interference signal, thereby avoiding interference from the second time-frequency resources.

Figure 9C:
FIG. 9C is a schematic diagram of performing time-frequency offset on another time-frequency resource according to an embodiment of this disclosure.

Refer to (1) in FIG. 9C. The first time-frequency resources represented by the light-color blocks are encountering interference, and a frequency domain range of an overlapping part is from 5905 MHz to 5920 MHz. Refer to (2) in FIG. 9C. The first time-frequency resources are offset in frequencies and time to avoid interference from the second time-frequency resources. On one hand, the first time-frequency resources in (1) in FIG. 9C are totally offset by 5 MHz in frequency domain in a frequency increase direction to obtain the target time-frequency resources in (2) in FIG. 9C whose frequency domain range is from 5910 MHz to 5925 MHZ, on the other side, the first time-frequency resources in (1) in FIG. 9C are totally offset in time domain in a time delay direction to a time location in which the target time-frequency resources are located in (2) in FIG. 9C. It can be easily seen that the target time-frequency resources do not overlap the second time-frequency resources, thereby eliminating interference.

Figure 9D:
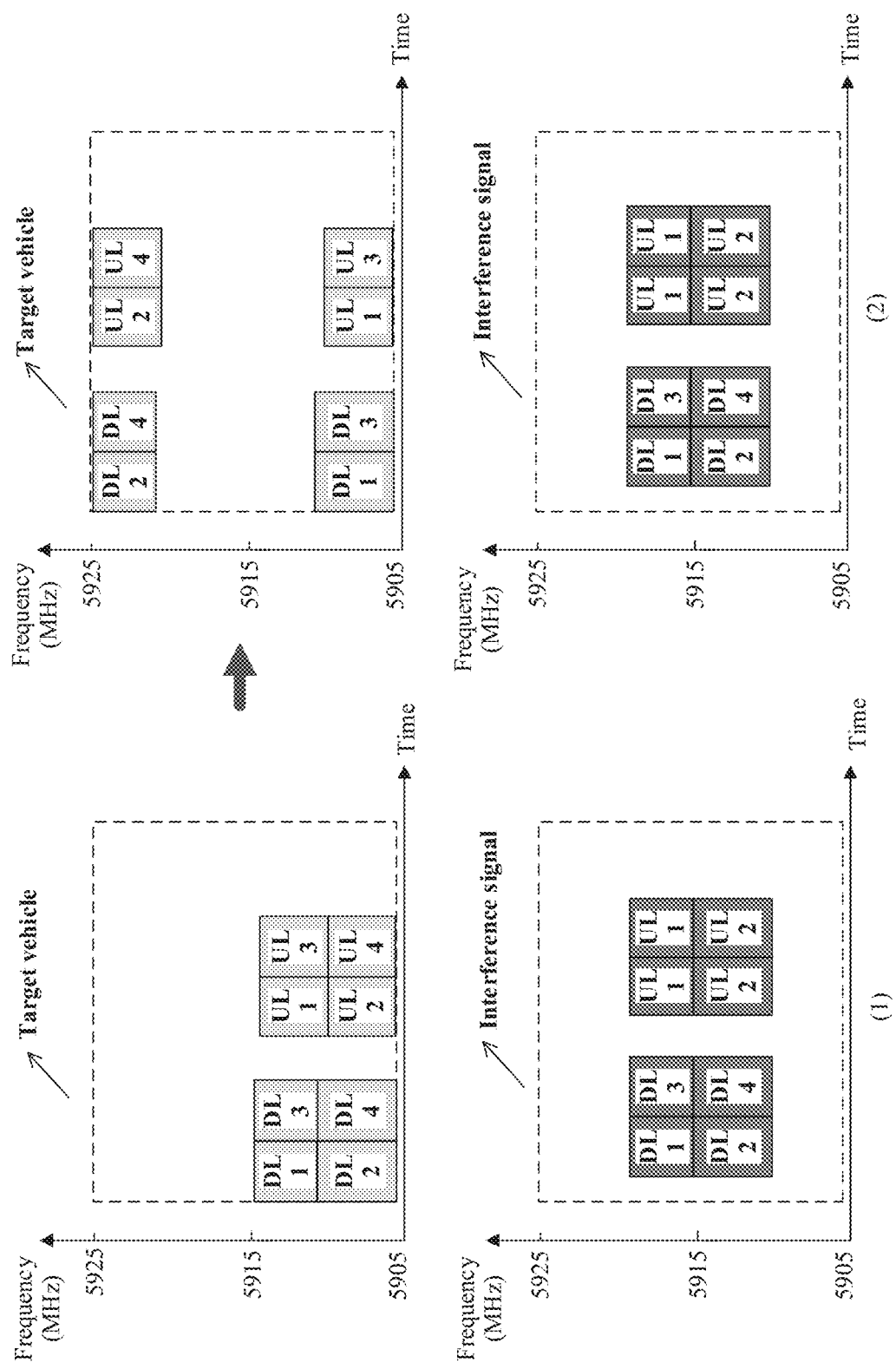
FIG. 9D is a schematic diagram of performing frequency domain offset on another time-frequency resource according to an embodiment of this disclosure.

Refer to (1) in FIG. 9D. A frequency domain range occupied by the first time-frequency resources represented by the light-color blocks is from 5905 MHz to 5915 MHz, and a frequency domain range occupied by the second time-frequency resources represented by the dark-color blocks is from 5910 MHz to 5920 MHz. With reference to time domain information, it can be easily learned that the first time-frequency resources are interfered with, and a frequency domain range of an overlapping part is from 5910 MHz to 5915 MHz. Refer to (2) in FIG. 9D. The first time-frequency resources are offset in frequencies to avoid interference on the first time-frequency resources, that is, the first time-frequency resources in (1) in FIG. 9D are totally offset by 5 MHz in frequency domain in a frequency decrease direction to obtain the target time-frequency resources in (2) in FIG. 9D corresponding to DL 1, DL 3, UL 1, and UL 3 whose frequency domain range is from 5905 MHz to 5910 MHZ, and the target time-frequency resources corresponding to DL 2, DL 4, UL 2, and UL 4 whose frequency domain range is from 5920 MHz to 5925 MHz. It is easily learned that the target time-frequency resources no longer overlap the second time-frequency resources corresponding to the interference signal, thereby eliminating interference.

It should be noted that, in FIG. 9D, the first time-frequency resources represented by the light-color blocks are totally offset in frequency domain in the frequency decrease direction. Before offset, because a lower-limit frequency 5905 MHz in the frequency domain range occupied by the first time-frequency resources is equal to a lower-limit frequency of the system bandwidth, if the second time-frequency resources are totally offset by 5 MHz in frequency domain in the frequency decrease direction, the first time-frequency resources corresponding to DL 2, DL 4, UL 2, and UL 4 rotate in the frequency domain range of the system bandwidth, and are offset to 5920 MHz to 5925 MHz. In some possible embodiments, if a frequency occupied by the first time-frequency resources reaches an upper-limit frequency of the system bandwidth, and a to-be-offset indicates offset in a frequency increase direction, the frequency domain range occupied by the first time-frequency resources also rotates in the frequency domain range of the system bandwidth, and an offset in frequency domain is calculated starting from the lower-limit frequency of the system bandwidth.

It should be noted that, in FIG. 9A to FIG. 9D, if the first time-frequency resources represented by the light-color blocks in (2) in FIG. 9A, (2) in FIG. 9B, (2) in FIG. 9C, and (2) in FIG. 9D do not overlap the second time-frequency resources represented by the dark-color blocks, interference is eliminated. In some possible embodiments, when idle time-frequency resources in the wireless channel are limited, it is also feasible when the target time-frequency resources determined in (2) in FIG. 9A, (2) in FIG. 9B, (2) in FIG. 9C, and (2) in FIG. 9D overlap the second time-frequency resources, but an overlapping part is less than an overlapping part between the first time-frequency resources and the second time-frequency resources in (1) in FIG. 9A, (1) in FIG. 9B, (1) in FIG. 9C, and (1) in FIG. 9D, and this effectively reduces interference.

Figure 10:
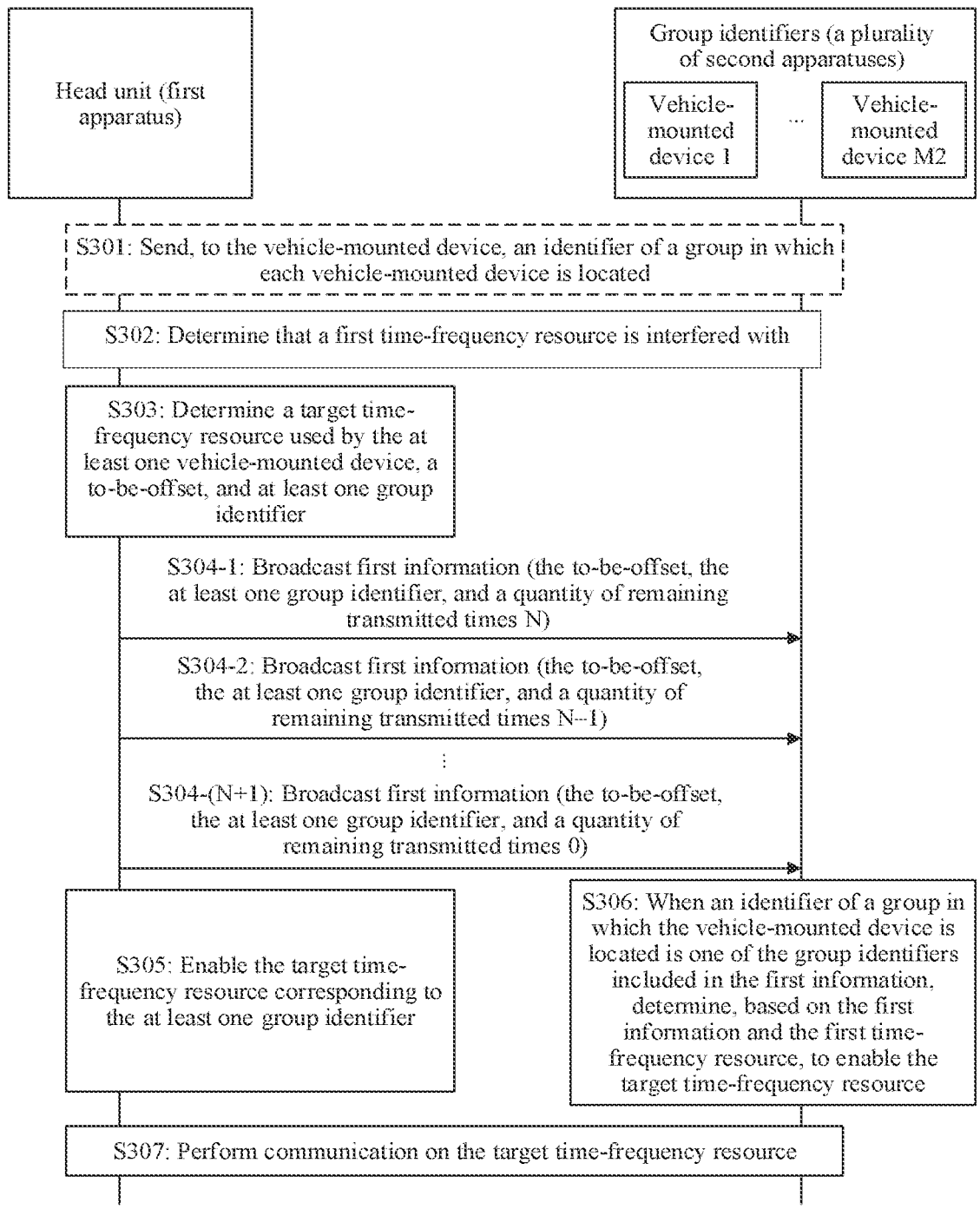
FIG. 10 is a flowchart of another resource configuration method according to an embodiment of this disclosure.

Refer to FIG. 10. FIG. 10 shows still another resource configuration method according to an embodiment of this disclosure. A main difference between the method and the method described in the embodiment in FIG. 6 lies in that, on one hand, an identifier of a group corresponding to each vehicle-mounted device is notified, and on the other hand, first information sent by a head unit to a vehicle-mounted device further includes a group identifier, where the group identifier is an identifier of a group in which a vehicle-mounted device corresponding to a first time-frequency resource and a target time-frequency resource is located. Therefore, a vehicle-mounted device that adjusts the first time-frequency resource based on the first information is the vehicle-mounted device corresponding to the group identifier specified in the first information. The method in the embodiment in FIG. 10 may be independent of embodiments in FIG. 4 and FIG. 6, or may be a supplement to embodiments in FIG. 4 and FIG. 6. The method includes but is not limited the following steps.

S301: Optionally, the head unit sends, to the vehicle-mounted device, the identifier of the group in which each vehicle-mounted device is located.

In this embodiment of this disclosure, the head unit sends, to each vehicle-mounted device in a broadcast or unicast manner, the identifier of the group corresponding to each vehicle-mounted device, to notify each vehicle-mounted device of the identifier of the group in which each vehicle-mounted is located. In some possible embodiments, after obtaining the identifier of the group corresponding to the vehicle-mounted device, the head unit may further send, to the vehicle-mounted device corresponding to the group in a multicast manner in groups, the identifier of the group in which each vehicle-mounted device is located. It should be noted that grouping of the vehicle-mounted devices is merely used as an example herein. In some possible embodiments, all cascaded devices (including vehicle-mounted devices and non-vehicle-mounted devices) corresponding to the head unit may be grouped.

It should be noted that, optionally, the grouping on the vehicle-mounted devices may be grouping performed by the head unit, or may be grouping performed by the vehicle-mounted device based on a factory setting or a standard definition. This is not further limited in this embodiment of this disclosure. In some possible embodiments, the vehicle-mounted device may be grouped based on at least one of factors such as a function, a usage, a location, and a transmission direction of the vehicular device. The transmission direction herein may be classified into uplink transmission and downlink transmission. The uplink transmission indicates that the vehicle-mounted device sends data to the head unit, and the downlink transmission indicates that the vehicle-mounted device receives data sent by the head unit.

To further describe grouping of the vehicle-mounted devices, refer to Table 1. It is assumed that there are eight vehicle-mounted devices in a vehicle, which are four speakers and four microphones. The speaker is used to receive data sent by a head unit, and may be represented by DL. The microphone and the like are used to send data to the head unit, and may be represented by UL. Table 1 lists a plurality of possible grouping manners. For example, the vehicle-mounted devices may be grouped based on data transmission directions. For example, all the vehicle-mounted devices may be grouped into a plurality of groups based on the data transmission directions (uplink transmission and downlink transmission). In this case, a vehicle-mounted device corresponding to each group can only be a device used for uplink transmission or a device used for downlink transmission. Refer to manner 1 to manner 3 in Table 1. In some possible embodiments, grouping may be performed based on a use status of the vehicle-mounted device, that is, a device used for uplink transmission and a device used for downlink transmission are used together. In this case, vehicle-mounted devices corresponding to a group identifier may include the device used for uplink transmission and the device used for downlink transmission. Refer to manner 4 and manner 5 in Table 1.

TABLE 1

| | DL 1 | DL 2 | DL 3 | DL 4 | UL 1 | UL 2 | UL 3 | UL 4 |
|---|---|---|---|---|---|---|---|---|
| Manner 1 | Group number 1 | | Group number 2 | | Group number 3 | | Group number 4 | |
| Manner 2 | Group number 1 | | | | Group number 2 | | | |
| Manner 3 | Group number 1 | | Group number 2 | | Group number 3 | | Group number 4 | |

| | DL 1 | UL 1 | DL 2 | UL 2 | DL 3 | UL 3 | DL 4 | UL 4 |
|---|---|---|---|---|---|---|---|---|
| Manner 4 | Group number 1 | | | | Group number 2 | | | |
| Manner 5 | Group number 1 | | Group number 2 | | Group number 3 | | Group number 4 | |

It should be noted that for grouping of the vehicle-mounted devices, each group corresponds to a different group identifier, for example, a group number, and each group identifier corresponds to at least one vehicle-mounted device. Quantities of vehicle-mounted devices included in different group identifiers may be the same or may be different. All the vehicle-mounted devices corresponding to each group may be devices used for uplink transmission or devices used for downlink transmission, or may be a device used for uplink transmission and a device used for downlink transmission. This is not limited in this disclosure.

S302: Determine that a first time-frequency resource is encountering interference. For this step, refer to related descriptions of S201 in the embodiment in FIG. 6. Details are not described herein again.

S303: The head unit determines a target time-frequency resource used by the at least one vehicle-mounted device, a to-be-offset, and at least one group identifier.

In this embodiment of this disclosure, after determining that the first time-frequency resource used by the at least one vehicle-mounted device is interfered with, on one hand, the head unit determines an identifier of a group in which the vehicle-mounted device corresponding to the first time-frequency resource is located, and on the other hand, the head unit determines, based on an interference overlapping status between the first time-frequency resource and a second time-frequency resource corresponding to an interference signal, some time-frequency resources on a current wireless channel as the target time-frequency resource used by the at least one vehicle-mounted device, and finally determines the to-be-offset based on the target time-frequency resource and the first time-frequency resource. For descriptions of the to-be-offset, refer to related descriptions of S202 in the embodiment in FIG. 6. Details are not described herein again.

It should be noted that a to-be-adjusted time-frequency resource that is interfered with in a time-frequency resource used by the at least one vehicle-mounted device is referred to as the first time-frequency resource, and the first time-frequency resource corresponds to the at least one vehicle-mounted device. When identifiers of groups in which the vehicle-mounted devices are located are determined, if the identifiers of the groups in which the vehicle-mounted devices are located are the same, there is one finally determined group identifier, or if the identifiers of the groups in which the vehicle-mounted devices are located are different, there are a plurality of finally determined group identifiers.

It should be noted that the target time-frequency resource determined by the head unit does not overlap the second time-frequency resource corresponding to the interference signal, or an overlapping part between the target time-frequency resource and the second time-frequency resource is reduced compared with an overlapping part between the first time-frequency resource and the second time-frequency resource, thereby eliminating or reducing interference.

In this embodiment of this disclosure, after the head unit determines the to-be-offset and the at least one group identifier, the head unit broadcasts, to the at least one vehicle-mounted device for a plurality of times (refer to S304-1 to S304-(N+1)), first information that carries the to-be-offset and the at least one group identifier. There is one piece of first information in each broadcast, and the first information in each broadcast includes a quantity of remaining transmitted times in addition to the to-be-offset and the at least one group identifier. The quantity of remaining transmitted times decreases progressively with each broadcast (or each sending of the first information). When the quantity of remaining transmitted times is 0, the target time-frequency resource is enabled.

For example, in S304-1, the head unit broadcasts, to the at least one vehicle-mounted device once, the first information that carries the to-be-offset, the quantity of remaining transmitted times, and the at least one group identifier. There is one piece of first information, and the quantity of remaining transmitted times in the first information broadcast this time is N. If the quantity of remaining transmitted times is N, it indicates that the first information further needs to be broadcast N times after this broadcast. If the first information in S304-1 to S304-(N+1) is broadcast at an interval of time T, this broadcast indicates that the target time-frequency resource is enabled at duration N*T after this broadcast.

In an embodiment of this disclosure, the head unit broadcasts, to the at least one vehicle-mounted device once, first information that carries the to-be-offset, duration information, and the at least one group identifier. The broadcast indicates that timing starts after the head unit broadcasts the first information, and the target time-frequency resource is enabled after a time interval indicated by the duration information.

It should be noted that, when there are a plurality of group identifiers determined by the head unit, there may be one to-be-offset in the first information, that is, the first time-frequency resources corresponding to the plurality of group identifiers are all adjusted based on the same to-be-offset. Certainly, there may be a plurality of to-be-offsets in the first information, and the quantity of the to-be-offsets is less than or equal to a quantity of group identifiers included in the first information. Further, when the quantity of to-be-offsets is equal to the quantity of group identifiers, each group identifier corresponds to one to-be-offset, and different group identifiers correspond to different to-be-offsets. When the quantity of to-be-offsets is less than the quantity of group identifiers, each group identifier is no longer in a one-to-one correspondence with each offset, and one to-be-offset may correspond to a plurality of group identifiers. Therefore, the first time-frequency resources corresponding to different groups in the plurality of group identifiers are adjusted based on the to-be-offsets corresponding to the groups. For example, the first information indicates three to-be-offsets and six group identifiers indicated by group numbers 1 to 6). In the first information, a correspondence may be formed based on information elements of [to-be-offset x, group identifier vector ( )], for example, [to-be-offset 1, group identifier (6)], [to-be-offset 2, group identifiers (1, 2)], and [to-be-offset 3, group identifiers (3, 4, 5)].

It should be noted that the duration information (or the quantity of remaining transmitted times) and the at least one group identifier may be carried in the first information and broadcast, or may be separately carried in other different or same sub-messages in the broadcast information and broadcast at the same time as the first information that carries the to-be-offset.

It should be noted that the to-be-offset, the quantity of remaining transmitted times (or the duration information), and the at least one group identifier may be sent in a broadcast manner, or may be sent, in a multicast manner, to only the vehicle-mounted device corresponding to the at least one group identifier. This is not further limited in this disclosure.

S305: The head unit enables the target time-frequency resource corresponding to the at least one group identifier.

In this embodiment of this disclosure, the head unit enables the target time-frequency resource corresponding to the at least one group identifier. For an enabling manner, refer to related descriptions in S204 in the embodiment in FIG. 6. Details are not described herein again.

It should be noted that the at least one vehicle-mounted device corresponding to the target time-frequency resource enabled by the head unit in S204 in the embodiment in FIG. 6 is a device that is not grouped, and in S305, an identifier of a group in which the vehicle-mounted device corresponding to the enabled target time-frequency resource is located belongs to the group identifier included in the first information.

S306: When the identifier of the group in which the vehicle-mounted device is located is one of the group identifiers included in the first information, determine, based on the first information and the first time-frequency resource, to enable the target time-frequency resource.

In this embodiment of this disclosure, after the vehicle-mounted device receives, at least once, the first information that is broadcast or multicast by the head unit and that carries the to-be-offset, the quantity of remaining transmitted times (or the duration information), and the at least one group identifier, the vehicle-mounted device first determines whether the identifier of the group in which the vehicle-mounted device is located is the same as one of the group identifiers included in the first information. If the identifiers are different, the vehicle-mounted device ignores this broadcast. If the identifiers are the same, the vehicle-mounted device determines the target time-frequency resource based on the first information and the first time-frequency resource, and enables the target time-frequency resource when the quantity of remaining transmitted times is 0 or the duration information is met. For a specific operation, refer to related descriptions in S205 in the embodiment in FIG. 6. Details are not described herein again.

It should be noted that the vehicle-mounted device corresponding to the enabled target time-frequency resource in S205 in the embodiment of FIG. 6 is a vehicle-mounted device that is not grouped by the head unit. In S306, the identifier of the group in which the vehicle-mounted device corresponding to the target time-frequency resource is located belongs to the group identifier included in the first information.

It should be noted that S305 and S306 are performed synchronously.

S307: The head unit communicates with the vehicle-mounted device corresponding to the at least one group identifier on the target time-frequency resource.

In this embodiment of this disclosure, the head unit communicates with the vehicle-mounted device corresponding to the at least one group identifier on the target time-frequency resource. For a specific communication manner, refer to related descriptions of S105 in the embodiment in FIG. 4. Details are not described herein again.

It should be noted that the head unit is the first apparatus in the embodiment in FIG. 4, and the vehicle-mounted device corresponding to the at least one group identifier is the at least one second apparatus in the embodiment in FIG. 4.

It should be noted that, a difference between S307 and S105 in the embodiment in FIG. 4 lies in that the vehicle-mounted device that communicates with the head unit on the target time-frequency resource in S307 is conditionally limited, that is, the identifier of the group in which the vehicle-mounted device is located belongs to the group identifier included in the first information, but the vehicle-mounted device that communicates with the head unit in S105 is not conditionally limited.

It should be noted that the vehicle-mounted device corresponding to the at least one group identifier specified in the first information communicates with the head unit on the target time-frequency resource, and a vehicle-mounted device corresponding to another unspecified group identifier still communicates with the head unit on an initial time-frequency resource.

It may be learned that, in this embodiment of this disclosure, when the current time-frequency resource used by the at least one vehicle-mounted device is interfered with, the head unit adjusts the current time-frequency resource in at least one dimension of time domain and frequency domain based on the interference status to obtain a new time-frequency resource, thereby effectively reducing or even eliminating interference, and improving performance and quality of data transmission between the head unit in a vehicle and the vehicle-mounted device. In addition, the vehicle-mounted devices are grouped to assist in time-frequency resource configuration, thereby improving resource configuration flexibility, and improving resource configuration efficiency.

The following further describes the method in the embodiment in FIG. 10 by using some specific application scenarios.

In FIG. 11A to FIG. 11D, dark-color blocks represent second time-frequency resources corresponding to an interference signal, and light-color blocks represent time-frequency resources used by a plurality of vehicle-mounted devices. In (1) in FIG. 11A, (1) in FIG. 11B, (1) in FIG. 11C, and (1) in FIG. 11D, light-color blocks marked by dashed-line ellipses represent first time-frequency resources. In (2) in FIG. 11A, (2) in FIG. 11B, (2) in FIG. 11C, and (2) in FIG. 11D, light-color blocks marked by dashed-line ellipses represent target time-frequency resources and correspond to the first time-frequency resources. In FIG. 11A to FIG. 11D, it is easy to learn that the first time-frequency resources overlap the second time-frequency resources in both frequency domain and time domain, and the first time-frequency resources are interfered with. DL represents a vehicle-mounted device used for downlink transmission, and may be referred to as a downlink device. UL represents a device used for uplink transmission, and may be referred to as an uplink device. Different numbers following DL or UL indicate different vehicle-mounted devices. A system bandwidth is set to be 20 M, for example, from 5905 MHz to 5925 MHz. A dashed-line rectangular box is used to more obviously display a change of a time-frequency location of the first time-frequency resource in FIG. 11A to FIG. 11D.

Figure 11A:
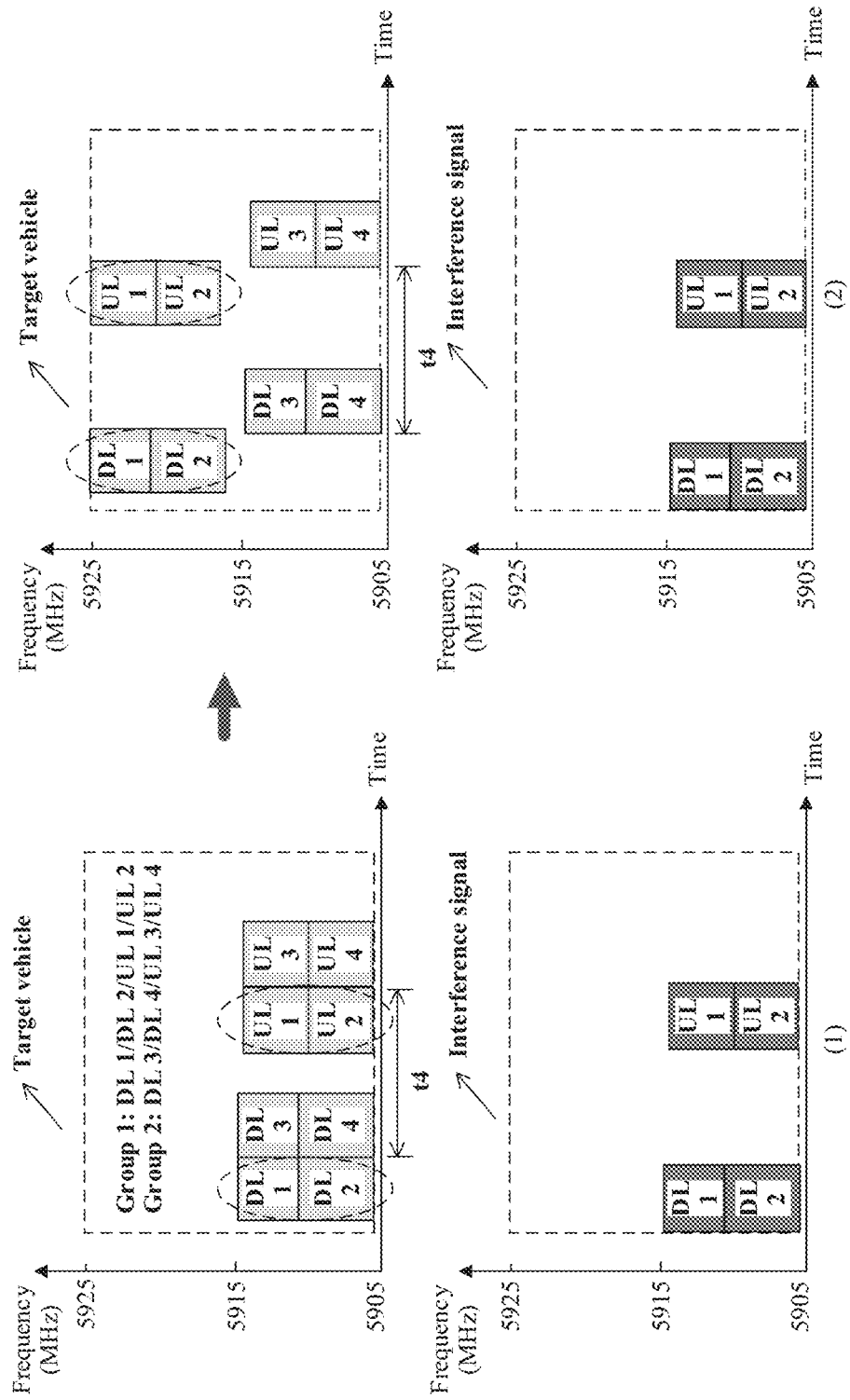
FIG. 11A is a schematic diagram of performing frequency domain offset on a time-frequency resource according to an embodiment of this disclosure.
Figure 11B:
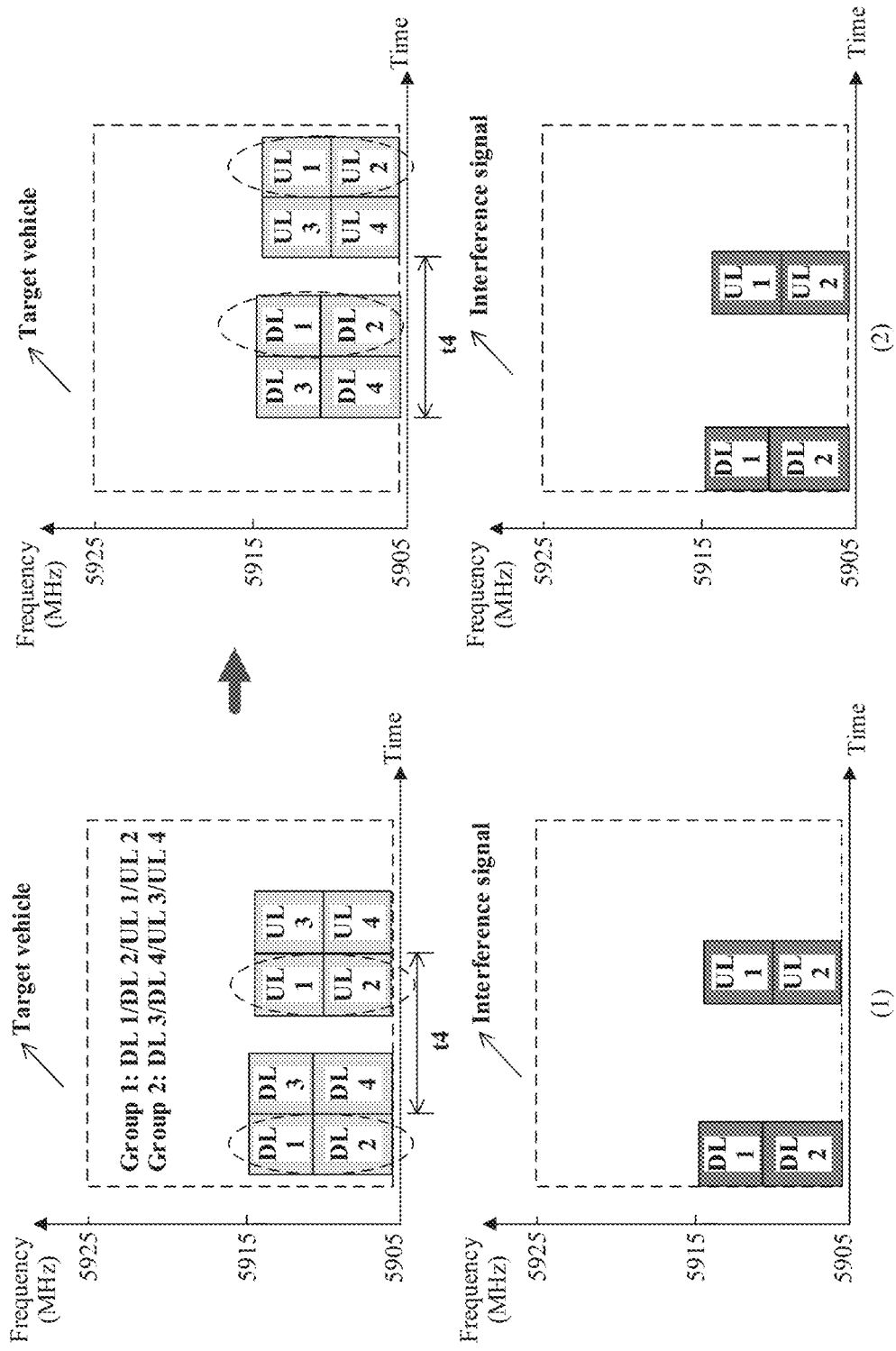
FIG. 11B is a schematic diagram of performing time domain offset on a time-frequency resource according to an embodiment of this disclosure.
Figure 11C:
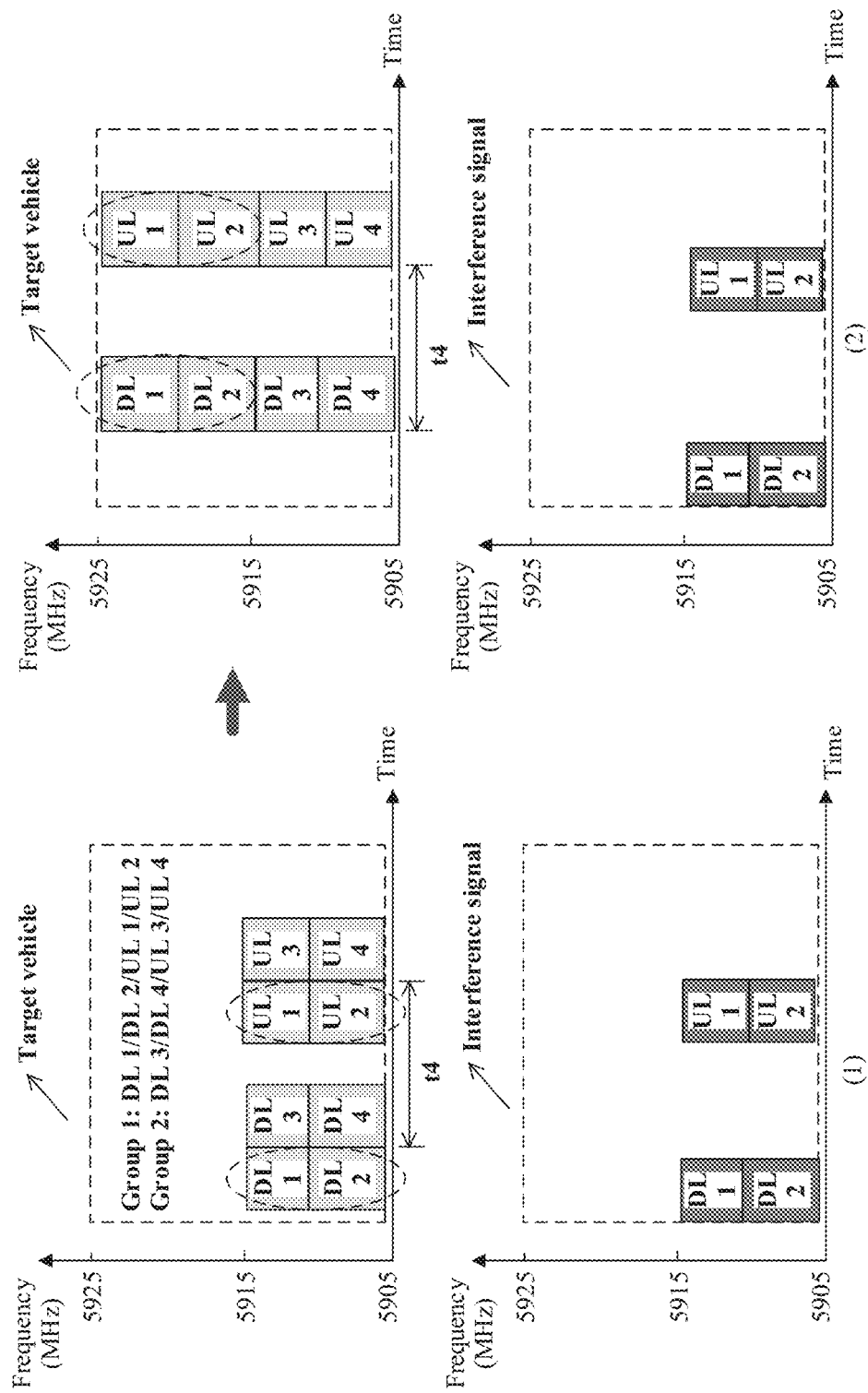
FIG. 11C is a schematic diagram of performing time-frequency offset on a time-frequency resource according to an embodiment of this disclosure.
Figure 11D:
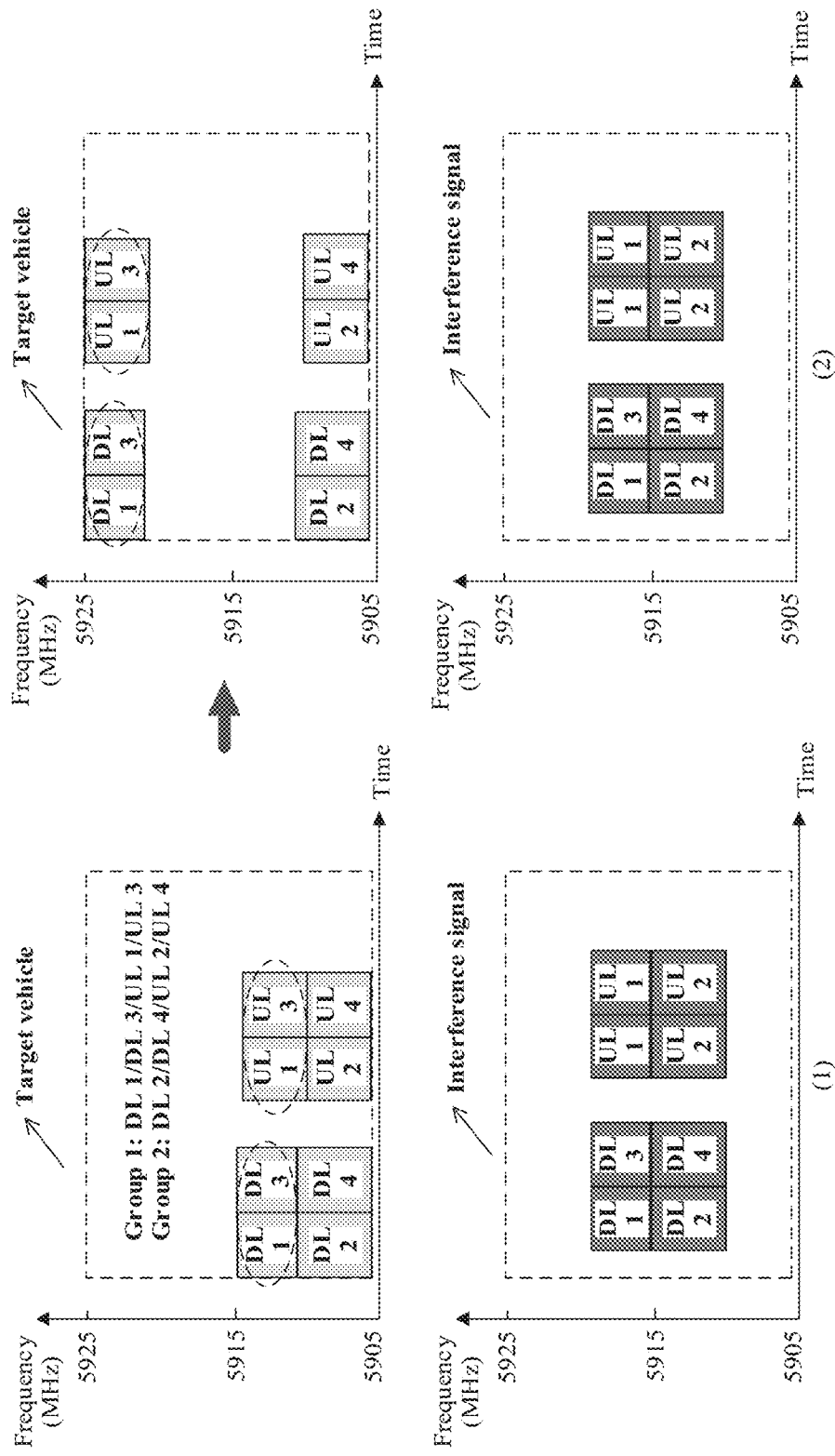
FIG. 11D is a schematic diagram of performing frequency domain offset on a time-frequency resource according to an embodiment of this disclosure.

It should be noted that, in FIG. 11A to FIG. 11D, there are eight vehicle-mounted devices in a target vehicle that are wirelessly connected to a head unit. Four downlink devices are respectively DL 1, DL 2, DL 3, and DL 4, and four uplink devices are respectively UL 1, UL 2, UL 3, and UL 4. In FIG. 11A to FIG. 11C, the eight vehicle-mounted devices are classified into two groups. Devices corresponding to a group number 1 are the DL 1, the DL 2, the UL 1, and the UL 2, and devices corresponding to a group number 2 are the DL 3, the DL 4, the UL 3, and the UL 4. In FIG. 11D, the eight vehicle-mounted devices are classified into two groups. Devices corresponding to a group number 1 are the DL 1, the DL 3, the UL 1, and the UL 3, and devices corresponding to a group number 2 are the DL 2, the DL 4, the UL 2, and the UL 4.

Refer to (1) in FIG. 11A. The first time-frequency resources are interfered with, and a frequency domain range of an overlapping part is from 5905 MHz to 5915 MHz. Refer to (2) in FIG. 11A. The first time-frequency resources are offset in frequencies to avoid interference on the first time-frequency resources, that is, the first time-frequency resources corresponding to the vehicle-mounted devices (DL 1, DL 2, UL 1, and UL 2) with the group number 1 in (1) in FIG. 11A are offset in frequency domain in a frequency increase direction to obtain the target time-frequency resources corresponding to the vehicle-mounted devices (DL 1, DL 2, UL 1, and UL 2) with the group number 1 in (2) in FIG. 11A, so that the target time-frequency resources do not overlap the second time-frequency resources, thereby eliminating interference.

Refer to (1) in FIG. 11B. The first time-frequency resources are interfered with, and a frequency domain range of an overlapping part is from 5905 MHz to 5915 MHz. Refer to (2) in FIG. 11B. The first time-frequency resources are offset in time to avoid interference on the first time-frequency resources, that is, the first time-frequency resources corresponding to the vehicle-mounted devices (DL 1, DL 2, UL 1, and UL 2) with the group number 1 in (1) in FIG. 11B are offset in time domain in a time delay (right) direction to obtain the target time-frequency resources corresponding to the vehicle-mounted devices (DL 1, DL 2, UL 1, and UL 2) with the group number 1 in (2) in FIG. 11B, so that the target time-frequency resources do not overlap the second time-frequency resources, thereby eliminating interference.

Refer to (1) in FIG. 11C. The first time-frequency resources are interfered with, and a frequency domain range of an overlapping part is from 5905 MHz to 5915 MHz. Refer to (2) in FIG. 11C. The first time-frequency resources are offset in frequencies and time to avoid interference on the first time-frequency resources, that is, the first time-frequency resources corresponding to the vehicle-mounted devices (DL 1, DL 2, UL 1, and UL 2) with the group number 1 in (1) in FIG. 11C are adjusted in both frequency domain and time domain to obtain the target time-frequency resources corresponding to the vehicle-mounted devices (DL 1, DL 2, UL 1, and UL 2) with the group number 1 in (2) in FIG. 11C, so that the target time-frequency resources whose frequency domain range is from 5915 MHz to 5925 MHz do not overlap the second time-frequency resources, thereby eliminating interference.

Refer to (1) in FIG. 11D. A frequency domain range occupied by the time-frequency resources represented by the light-color blocks is from 5905 MHz to 5915 MHz, and a frequency domain range occupied by the second time-frequency resources represented by the dark-color blocks is from 5910 MHz to 5920 MHz. With reference to time domain information, it can be easily learned that the first time-frequency resources corresponding to the vehicle-mounted devices (DL 1, DL 3, UL 1, and UL 3) with the group number 1 represented by the light-color blocks are interfered with, and an overlapping frequency domain range is from 5910 MHz to 5915 MHz. Refer to (2) in FIG. 11D. The first time-frequency resources are offset in frequencies to avoid interference on the first time-frequency resources, that is, the first time-frequency resources corresponding to the vehicle-mounted devices (DL 1, DL 3, UL 1, and UL 3) with the group number 1 in (1) in FIG. 11D are offset by 10 MHz in frequency domain in a frequency increase direction to obtain the target time-frequency resources corresponding to the vehicle-mounted devices (DL 1, DL 3, UL 1, and UL 3) with the group number 1 in (1) in FIG. 11D, so that the target time-frequency resources whose frequency domain range is from 5920 MHz to 5925 MHz do not overlap the second time-frequency resources, thereby eliminating interference.

It should be noted that, in FIG. 11A to FIG. 11D, when idle time-frequency resources are insufficient, it is also feasible when the target time-frequency resources determined in (2) in FIG. 11A, (2) in FIG. 11B, (2) in FIG. 11C, and (2) in FIG. 11D overlap the second time-frequency resources, but an overlapping part is less than an overlapping part between the first time-frequency resources and the second time-frequency resources in (1) in FIG. 11A, (1) in FIG. 11B, (1) in FIG. 11C, and (1) in FIG. 11D, and this effectively reduces interference.

It should be noted that, in FIG. 11A to FIG. 11D, only the eight vehicle-mounted devices are classified into two groups, and group numbers of the vehicle-mounted devices corresponding to the to-be-offset first time-frequency resources are the same. Therefore, in this case, there is one specified group number, and only the first time-frequency resources corresponding to the group are adjusted based on a same to-be-offset. In some possible embodiments, when a quantity of groups into which the eight vehicle-mounted devices are grouped is greater than 2 according to an actual situation, and group numbers of vehicle-mounted devices corresponding to t0-be-offset first time-frequency resources are not equal, there are a plurality of specified group numbers. Vehicle-mounted devices corresponding to the plurality of group numbers may adjust the first time-frequency resources based on a same to-be-offset, or vehicle-mounted devices corresponding to the plurality of group numbers may adjust the first time-frequency resources based on different to-be-offsets.

It should be noted that in FIG. 11A to FIG. 11D, in time-frequency resources represented by light-color blocks in (1) in FIG. 11A, (1) in FIG. 11B, (1) in FIG. 11C, and (1) in FIG. 11D, only the first time-frequency resources corresponding to a specified group number are adjusted to the corresponding target time-frequency resources in (2) in FIG. 11A, (2) in FIG. 11B, (2) in FIG. 11C, and (2) in FIG. 11D. After the target time-frequency resources are enabled, the vehicle-mounted device corresponding to the specified group number in (2) in FIG. 11A, (2) in FIG. 11B, (2) in FIG. 11C, and (2) in FIG. 11D may communicate with a head unit on the target time-frequency resources. However, time-frequency resources that are represented by the light-color blocks and that correspond to vehicle-mounted devices that do not belong to the specified group number in (2) in FIG. 11A, (2) in FIG. 11B, (2) in FIG. 11C, and (2) in FIG. 11D are not adjusted, and the vehicle-mounted devices that do not belong to the specified group number in (2) in FIG. 11A, (2) in FIG. 11B, (2) in FIG. 11C, and (2) in FIG. 11D still communicate with the head unit on the time-frequency resources that is not adjusted in (1) in FIG. 11A, (1) in FIG. 11B, (1) in FIG. 11C, and (1) in FIG. 11D.

Figure 12:
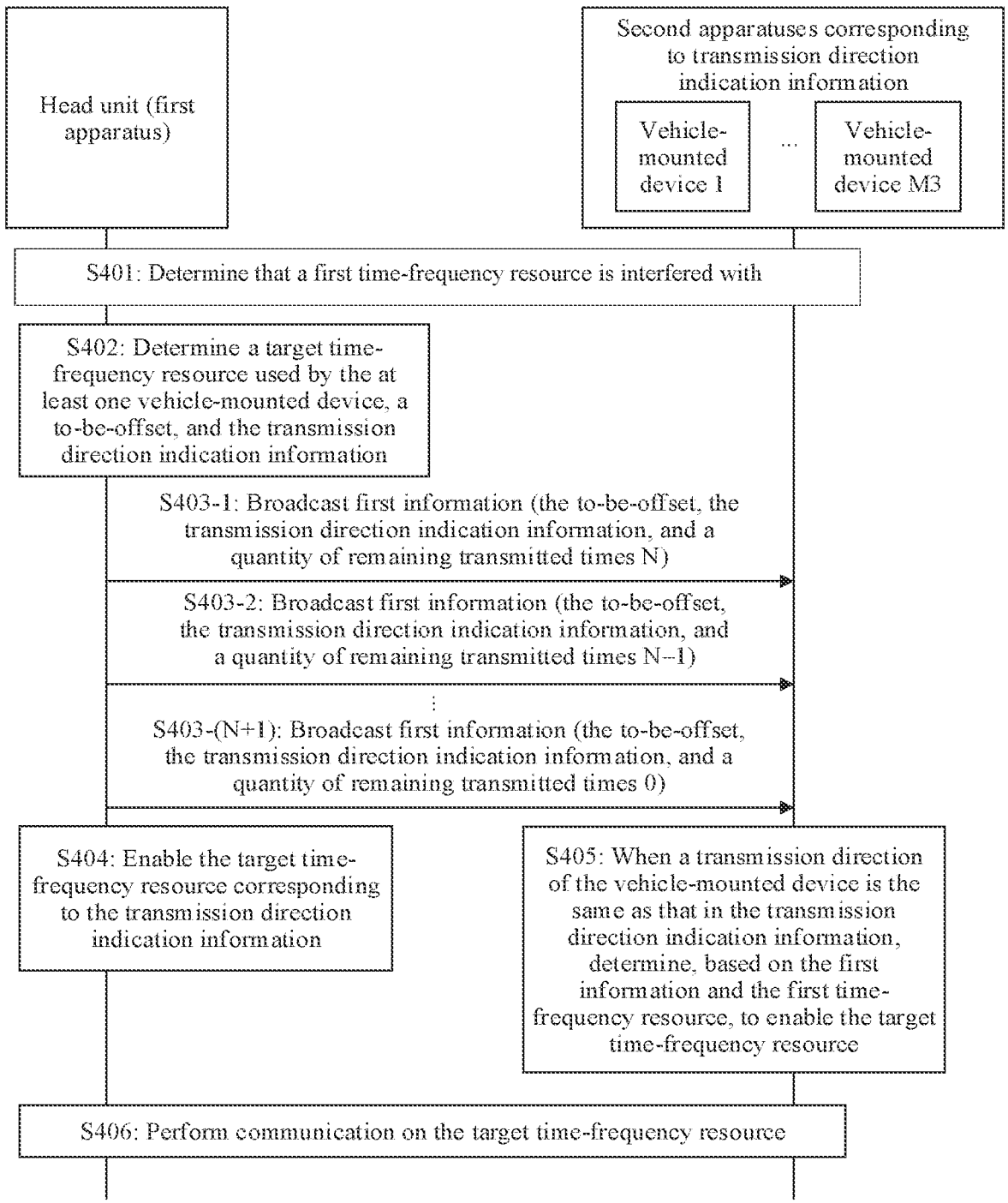
FIG. 12 is a flowchart of still another resource configuration method according to an embodiment of this disclosure.

Refer to FIG. 12. FIG. 12 shows a resource configuration method according to an embodiment of this disclosure. A main difference between the method and the method described in the embodiment in FIG. 6 lies in that first information further includes transmission direction indication information, where the transmission direction indication information indicates that a first time-frequency resource and a target time-frequency resource are at least one of an uplink time-frequency resource and a downlink time-frequency resource. Therefore, it is determined that, based on the first information and the first time-frequency resource, that a vehicle-mounted device corresponding to the target time-frequency resource is a vehicle-mounted device corresponding to the transmission direction indication information. The embodiment in FIG. 12 may be independent of embodiments in FIG. 4, FIG. 6, and FIG. 10, or may be a supplement to embodiments in FIG. 4, FIG. 6, and FIG. 10. The method includes but is not limited to the following steps.

S401: Determine that the first time-frequency resource is interfered with. For this step, refer to related descriptions of S201 in the embodiment in FIG. 6. Details are not described herein again.

S402: A head unit determines the target time-frequency resource used by the at least one vehicle-mounted device, a to-be-offset, and the transmission direction indication information.

In this embodiment of this disclosure, after determining that the first time-frequency resource used by the at least one second apparatus is interfered with, on one hand, the head unit determines the transmission direction indication information based on a transmission direction of the vehicle-mounted device corresponding to the first time-frequency resource, and on the other hand, the head unit may determine, based on an interference overlapping status between the first time-frequency resource and a second time-frequency resource corresponding to an interference signal, some time-frequency resources on a current wireless channel as the target time-frequency resource used by the at least one vehicle-mounted device, and then determine the to-be-offset based on the target time-frequency resource and the first time-frequency resource. For descriptions of the to-be-offset, refer to related descriptions of S202 in the embodiment in FIG. 6. Details are not described herein again.

It should be noted that the transmission directions of the vehicle-mounted device include an uplink direction (or uplink transmission) and a downlink direction (or downlink transmission). The uplink direction indicates that data (for example, a voice signal collected by a microphone or an image captured by a camera) sent by the vehicle-mounted device to the head unit is carried on an uplink time-frequency resource. The downlink direction indicates that data (for example, an audio signal or a video signal) received by the vehicle-mounted device from the head unit is carried on a downlink time-frequency resource. Therefore, if the first time-frequency resource and the target time-frequency resource are uplink time-frequency resources, the transmission direction indication information determined by the head unit indicates the uplink direction. If the first time-frequency resource and the target time-frequency resource are downlink time-frequency resources, the transmission direction indication information determined by the head unit indicates the downlink direction. If the first time-frequency resource and the target time-frequency resource are an uplink time-frequency resource and a downlink time-frequency resource, the transmission direction indication information determined by the head unit indicates the uplink direction and the downlink direction.

It should be noted that, for related descriptions of the target time-frequency resource, refer to related descriptions of S303 in the embodiment in FIG. 10. Details are not described herein again.

In this embodiment of this disclosure, after the head unit determines the to-be-offset and the transmission direction indication information, the head unit broadcasts, to the at least one vehicle-mounted device for a plurality of times (refer to S403-1 to S403-(N+1)), first information that carries the to-be-offset and the transmission direction indication information. Each time one piece of first information is broadcast, and the first information in each broadcast includes a quantity of remaining transmitted times in addition to the to-be-offset and the transmission direction indication information. The quantity of remaining transmitted times decreases progressively with each broadcast (or each sending of the first information). When the quantity of remaining transmitted times is 0, the target time-frequency resource is enabled.

It should be noted that, when the head unit performs broadcasting for a plurality of times, broadcasting once means that the broadcast information that carries the first information is sent once on a broadcast channel. Because the broadcast information carries one piece of first information, broadcasting once also means that the first information is sent once.

For example, in S403-1, the head unit broadcasts, to the at least one vehicle-mounted device once, the first information that carries the to-be-offset, the quantity of remaining transmitted times, and the transmission direction indication information. There is one piece of first information, and the quantity of remaining transmitted times in the first information broadcast this time is N. If the quantity of remaining transmitted times is N, it indicates that the first information further needs to be broadcast N times after this broadcast. If the first information in S403-1 to S403-(N+1) is broadcast at an interval of time T, this broadcast indicates that the target time-frequency resource is enabled at duration N*T after this broadcast.

In an embodiment of this disclosure, after the head unit determines the to-be-offset and the transmission direction indication information, the head unit broadcasts, to the at least one vehicle-mounted device once, first information that carries the to-be-offset, duration information, and the transmission direction indication information. The broadcast indicates that timing starts after the head unit broadcasts the first information, and the target time-frequency resource is enabled after a time interval indicated by the duration information.

It should be noted that the transmission direction indication information and the duration information (or the quantity of remaining transmitted times) may be carried in the first information and broadcast, or may be separately carried in other different or same sub-messages in the broadcast information and broadcast at the same time as the first information that carries the to-be-offset.

It should be noted that the to-be-offset, the transmission direction indication information, and the quantity of remaining transmitted times (or the duration information) may be sent in a broadcast manner, or may be sent, in a unicast manner, to only a vehicle-mounted device corresponding to resource adjustment information. This is not further limited in this disclosure.

S404: The head unit enables the target time-frequency resource corresponding to the transmission direction indication information.

In this embodiment of this disclosure, for a specific operation in which the head unit enables the target time-frequency resource corresponding to the transmission direction indication information, refer to related descriptions in S204 in the embodiment in FIG. 6. Details are not described herein again.

It should be noted that a type of the target time-frequency resource (namely, an uplink time-frequency resource and a downlink time-frequency resource) is not limited in S204 in the embodiment of FIG. 6. However, in S404, a type of the target time-frequency resource is consistent with a type of the time-frequency resource corresponding to the transmission direction indication information.

S405: When a transmission direction of the vehicle-mounted device is the same as that in the transmission direction indication information, determine, based on the first information and the first time-frequency resource, to enable the target time-frequency resource.

In this embodiment of this disclosure, after the vehicle-mounted device receives, at least once, the first information that is broadcast by the head unit and that carries the to-be-offset, the transmission direction indication information, and the quantity of remaining transmitted times (or the duration information), the vehicle-mounted device first determines whether the transmission direction of the vehicle-mounted device is the same as that in the transmission direction indication information (indicate the uplink direction/or the downlink direction). If the directions are different, the vehicle-mounted device ignores this broadcast. If the directions are the same, the vehicle-mounted device determines the target time-frequency resource based on the first information and the first time-frequency resource, and enables the target time-frequency resource when the quantity of remaining transmitted times is 0 or the duration information is met. For a specific operation, refer to related descriptions in S205 in the embodiment in FIG. 6. Details are not described herein again.

It should be noted that the type of the target time-frequency resource (namely, an uplink time-frequency resource and a downlink time-frequency resource) is not limited in S205 in the embodiment of FIG. 6. However, in S405, the type of the target time-frequency resource is consistent with the type of the time-frequency resource corresponding to the transmission direction indication information.

It should be noted that S404 and S405 are performed synchronously.

S406: The head unit communicates with the vehicle-mounted device corresponding to the transmission direction indication information on the target time-frequency resource.

In this embodiment of this disclosure, the head unit communicates with the vehicle-mounted device corresponding to the transmission direction indication information on the target time-frequency resource.

For example, when the transmission direction indication information indicates the uplink direction, that the head unit communicates with the vehicle-mounted device corresponding to the transmission direction indication information indicates that the at least one vehicle-mounted device sends data to the head unit on the target time-frequency resource, and correspondingly the head unit receives data from the at least one vehicle-mounted device on the target time-frequency resource.

For example, when the transmission direction indication information indicates the downlink direction, that the head unit communicates with the vehicle-mounted device corresponding to the transmission direction indication information indicates that the head unit sends data to the at least one vehicle-mounted device on the target time-frequency resource, and correspondingly the at least one vehicle-mounted device receives data from the head unit on the target time-frequency resource.

For example, when the transmission direction indication information indicates the uplink direction and the downlink direction, that the head unit communicates with the vehicle-mounted device corresponding to the transmission direction indication information indicates that the at least one vehicle-mounted device sends data to the head unit and receives data from the head unit on the target time-frequency resource, and the head unit receives data from the at least one vehicle-mounted device and sends data to the at least one vehicle-mounted device on the target time-frequency resource.

It may be learned that, in this embodiment of this disclosure, when the current time-frequency resource used by the at least one vehicle-mounted device is interfered with, the head unit adjusts the current time-frequency resource in at least one dimension of time domain and frequency domain based on the interference status to obtain a new time-frequency resource, thereby effectively reducing or even eliminating interference, and improving performance and quality of data transmission between the head unit in a vehicle and the vehicle-mounted device. In addition, the transmission direction of the vehicle-mounted device is limited to assist in time-frequency resource configuration, thereby improving resource configuration flexibility, and improving resource configuration efficiency.

The following further describes the method in the embodiment in FIG. 12 by using some specific application scenarios.

Figure 13A:
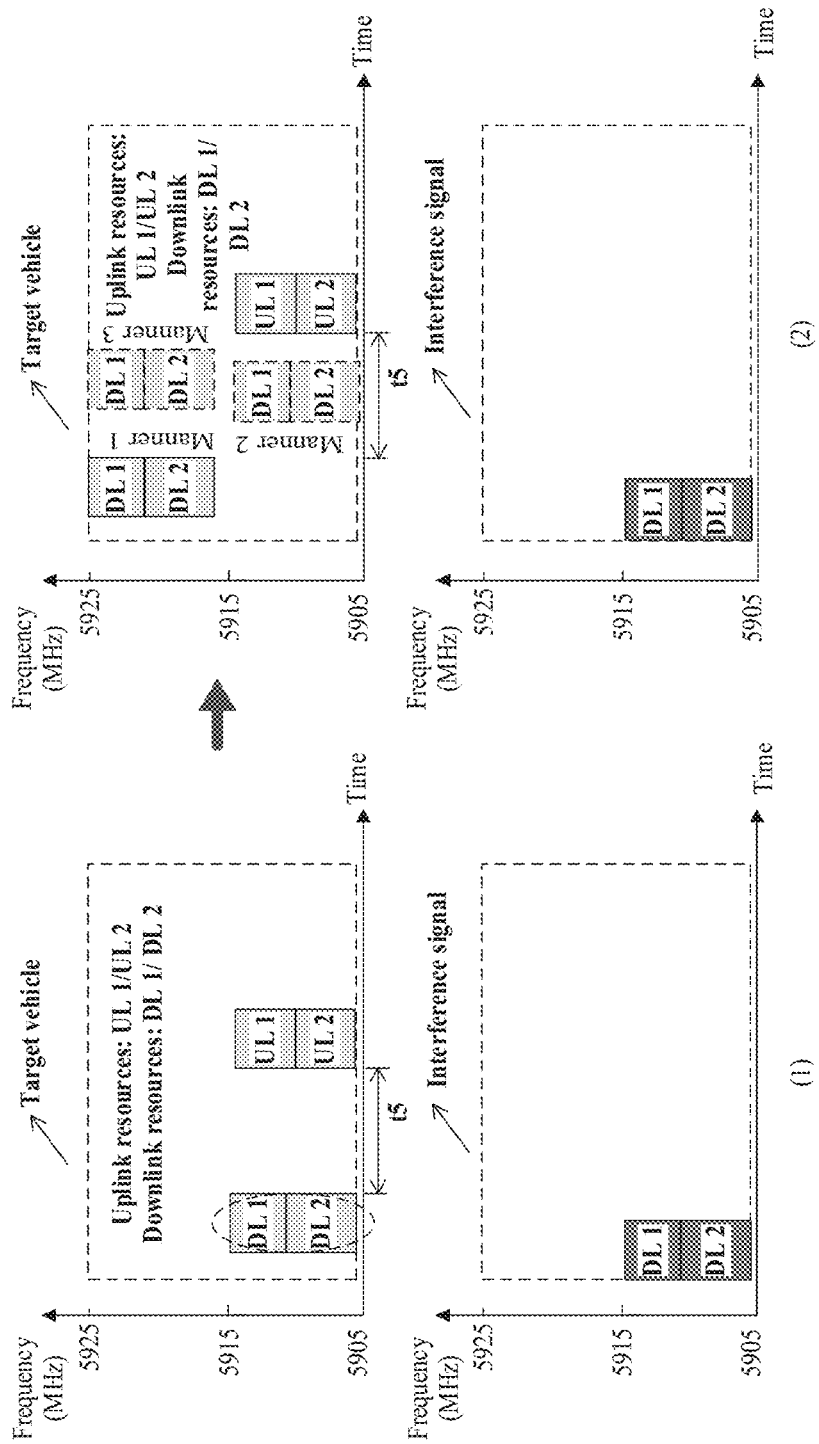
FIG. 13A is a schematic diagram of offsets of a downlink resource in frequency domain and time domain according to an embodiment of this disclosure.
Figure 13B:
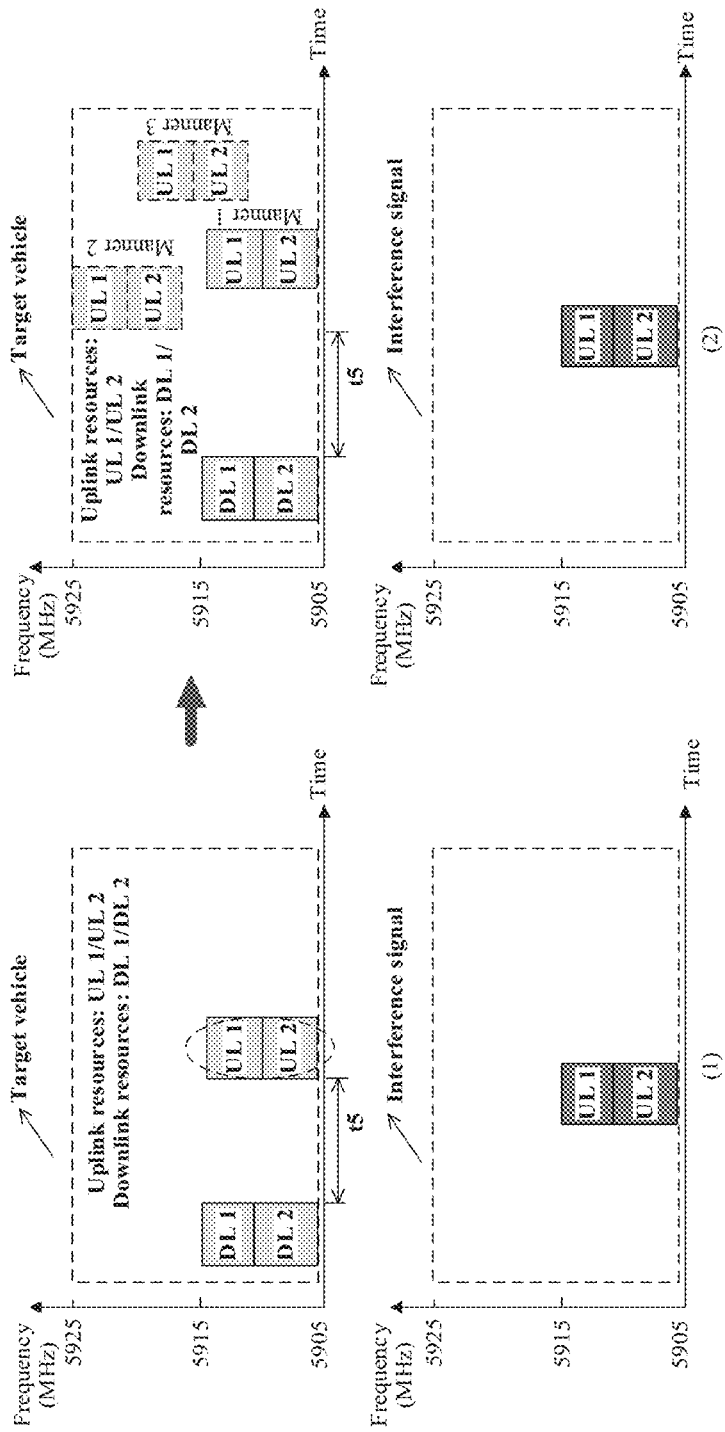
FIG. 13B is a schematic diagram of offsets of an uplink resource in frequency domain and time domain according to an embodiment of this disclosure.

In FIG. 13A and FIG. 13B, dark-color blocks represent second time-frequency resources corresponding to an interference signal, and light-color blocks represent time-frequency resources used by a plurality of vehicle-mounted devices. In (1) in FIG. 13A and (1) in FIG. 13B, time-frequency resources marked by a dashed-line ellipse is first time-frequency resources. In (2) in FIG. 13A and (2) in FIG. 13B, the time-frequency resources marked by the dashed-line ellipse is target time-frequency resources, and correspond to the first time-frequency resources. In FIG. 13A and FIG. 13B, the first time-frequency resources overlap the second time-frequency resources in both frequency domain and time domain, and the first time-frequency resources are interfered with. DL indicates a device used for downlink transmission, and corresponds to a downlink time-frequency resource (referred to as a downlink resource below). UL indicates a device used for uplink transmission, and corresponds to an uplink time-frequency resource (referred to as an uplink resource below). Different numbers following DL or UL indicate different vehicle-mounted devices. Uplink resources are UL 1 and UL 2, and downlink resources are DL 1 and DL 2. A system bandwidth is set to be 20 M, for example, from 5905 MHz to 5925 MHz. A dashed-line rectangular box is used to more obviously display a change of a time-frequency location of the first time-frequency resource in FIG. 13A and FIG. 13B.

Refer to (1) in FIG. 13A. The first time-frequency resources are interfered with, an overlapping frequency domain range is from 5905 MHz to 5915 MHZ, and the first time-frequency resources are downlink resources. Refer to (2) in FIG. 13A. In Manner 1, the first time-frequency resources may be offset in frequencies to avoid interference from the second time-frequency resources, that is, the downlink resources (namely, the DL 1 and the DL 2) in (1) in FIG. 13A are offset by 10 MHz in frequency domain in a frequency increase direction to obtain the target time-frequency resources in (2) in FIG. 13A whose frequency domain range is from 5915 MHz to 5925 MHz, so that the target time-frequency resources do not overlap the second time-frequency resources, thereby eliminating interference. In Manner 2, the first time-frequency resources may be offset in time to avoid interference on the first time-frequency resource, that is, the downlink resources (namely, the DL 1 and the DL 2) in (1) in FIG. 13A are offset in time domain in a time delay direction to a time location in which the target time-frequency resources in (2) in FIG. 13A are located, so that the target time-frequency resources do not overlap the second time-frequency resources. In Manner 3, the downlink resources (namely, the DL 1 and the DL 2) in (1) in FIG. 13A may alternatively be offset in both frequency domain and time domain to obtain the target time-frequency resources in (2) in FIG. 13A, thereby eliminating interference.

Refer to (1) in FIG. 13B. The first time-frequency resources are interfered with, and an overlapping frequency domain range is from 5905 MHz to 5915 MHz. (2) in FIG. 13B is a schematic diagram after UL 1 and UL 2 in (1) in FIG. 13B are offset. In (1) in FIG. 13B, interference is generated because the first time-frequency resources and the second time-frequency resources occupy a same frequency at the same time. Refer to (2) in FIG. 13B. The uplink resources (namely, the UL 1 and the UL 2) in (1) in FIG. 13B are offset only in time domain to a location in Manner 1 in (2) in FIG. 13B, that is, the uplink resources are offset in time to avoid interference on the first time-frequency resources. The uplink resources (namely, the UL 1 and the UL 2) in (1) in FIG. 13B may be offset only in frequency domain to a location in Manner 2 in (2) in FIG. 13B, that is, the uplink resources are offset in frequencies to avoid interference on the first time-frequency resource. Alternatively, the uplink resources (namely, the UL 1 and the UL 2) in (1) in FIG. 13B are offset in both frequency domain and time domain to a location in Manner 3 in (2) in FIG. 13B, that is, the uplink resources are offset in frequencies and time to avoid interference on the first time-frequency resource.

It should be noted that if the interfered with first time-frequency resources are an uplink resource and a downlink resource (not shown in the figure), the adjusted corresponding target time-frequency resources are also the uplink resource and the downlink resource.

It should be noted that, in FIG. 13A and FIG. 13B, when idle time-frequency resources are insufficient, it is also feasible when the target time-frequency resources determined in (2) in FIG. 13A and (2) in FIG. 13B overlap the second time-frequency resources, but an overlapping part is less than an overlapping part between the first time-frequency resources and the second time-frequency resources in (1) in FIG. 13A and (1) in FIG. 13B, and this effectively reduces interference.

Figure 14:
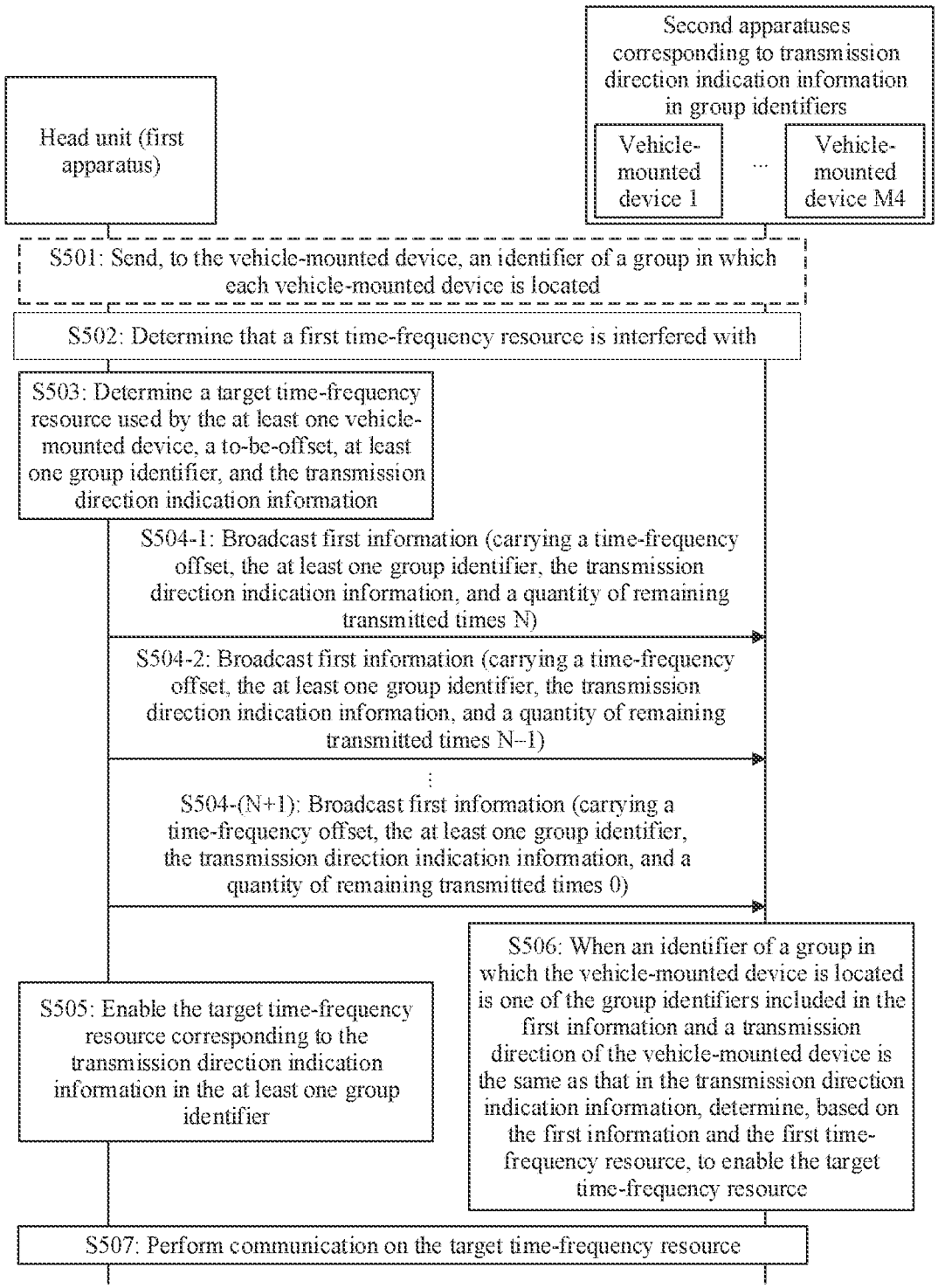
FIG. 14 is a flowchart of yet another resource configuration method according to an embodiment of this disclosure.

Refer to FIG. 14. FIG. 14 shows a resource configuration method according to an embodiment of this disclosure. A main difference between the method and the method described in the embodiment in FIG. 6 lies in that, on one hand, an identifier of a group in which each vehicle-mounted device is notified, and on the other hand, first information further includes transmission direction indication information and at least one group identifier. The embodiment in FIG. 14 may be independent of embodiments in FIG. 4, FIG. 6, FIG. 10, and FIG. 12, or may be a supplement to embodiments in FIG. 4, FIG. 6, FIG. 10, and FIG. 12. The method includes but is not limited to the following steps.

S501: Optionally, a head unit sends, to a vehicle-mounted device, the identifier of the group in which each vehicle-mounted device is located. For this step, refer to related descriptions of S301 in the embodiment in FIG. 10. Details are not described herein again.

S502: Determine that a first time-frequency resource is interfered with. For this step, refer to related descriptions of S201 in the embodiment in FIG. 6. Details are not described herein again.

S503: The head unit determines a target time-frequency resource used by the at least one vehicle-mounted device, a to-be-offset, the transmission direction indication information, and the at least one group identifier.

In this embodiment of this disclosure, after determining that the first time-frequency resource used by the at least one vehicle-mounted device is interfered with, on one hand, the head unit determines the group identifier based on an identifier of a group in which the vehicle-mounted device corresponding to the first time-frequency resource is located. For descriptions of the group identifier, refer to related descriptions in the embodiment of FIG. 10. Details are not described herein again. The head unit determines the transmission direction indication information based on a resource type corresponding to the first time-frequency resource used by the at least one vehicle-mounted device, for determining of the transmission direction indication information, refer to related descriptions of S402 in the embodiment in FIG. 12. Details are not described herein again. On the other hand, the head unit determines some time-frequency resources on a current wireless channel as the target time-frequency resource used by the at least one vehicle-mounted device, and then determines the to-be-offset based on the target time-frequency resource and the first time-frequency resource. For descriptions of the to-be-offset, refer to related descriptions of S202 in the embodiment in FIG. 6. Details are not described herein again.

In this embodiment of this disclosure, after the head unit determines the to-be-offset, the transmission direction indication information, and the at least one group identifier, the head unit broadcasts, to the at least one vehicle-mounted device for a plurality of times (refer to S504-1 to S504-(N+1)), first information that carries the to-be-offset, the transmission direction indication information, and the at least one group identifier. Each time one piece of first information is broadcast, and the first information in each broadcast includes a quantity of remaining transmitted times in addition to the to-be-offset, the transmission direction indication information, and the at least one group identifier. The quantity of remaining transmitted times decreases progressively with each broadcast (or each sending of the first information). When the quantity of remaining transmitted times is 0, the target time-frequency resource is enabled.

It should be noted that, when the head unit performs broadcasting for a plurality of times, broadcasting once means that the broadcast information that carries the first information is sent once on a broadcast channel. Because the broadcast information carries one piece of first information, broadcasting once also means that the first information is sent once.

For example, in S504-1, the head unit broadcasts, to the at least one vehicle-mounted device once, the first information that carries the to-be-offset, the at least one group identifier, the transmission direction indication information, and the quantity of remaining transmitted times. There is one piece of first information, and the quantity of remaining transmitted times in the first information broadcast this time is N. If the first information in S504-1 to S504-(N+1) is broadcast at an interval of time T, this broadcast indicates that the target time-frequency resource is enabled at duration N*T after the broadcast.

In an embodiment of this disclosure, after the head unit determines the to-be-offset, the transmission direction indication information, and the at least one group identifier, the head unit broadcasts, to the at least one vehicle-mounted device once, first information that carries the to-be-offset, duration information, the transmission direction indication information, and the at least one group identifier. The broadcast indicates that timing starts after the head unit broadcasts the first information, and the target time-frequency resource is enabled after a time interval indicated by the duration information.

It should be noted that the transmission direction indication information, the duration information (or the quantity of remaining transmitted times), and the at least one group identifier may be carried in the first information and broadcast, or may be separately carried in other different or same sub-messages in the broadcast information and broadcast at the same time as the first information that carries the to-be-offset.

It should be noted that the to-be-offset, the at least one group identifier, the transmission direction indication information, and the quantity of remaining transmitted times (or the duration information) may be sent in a broadcast manner, or may be sent, in a multicast manner, to a vehicle-mounted device corresponding to the transmission direction indication information in the group identifier specified by the head unit. This is not further limited in this disclosure.

S505: The head unit enables the target time-frequency resource corresponding to the transmission direction indication information in the at least one group identifier.

In this embodiment of this disclosure, for a specific operation in which the head unit enables the target time-frequency resource corresponding to the transmission direction indication information in the at least one group identifier, refer to related descriptions in S204 in the embodiment in FIG. 6. Details are not described herein again.

It should be noted that, a difference from S204 in the embodiment in FIG. 6 lies in that the identifier of the group in which the vehicle-mounted device corresponding to the enabled target time-frequency resource is located belongs to the group identifier included in the first information, and a transmission direction of the vehicle-mounted device corresponding to the enabled target time-frequency resource is consistent with that in the transmission direction indication information in the first information. In other words, a type of the target time-frequency resource is the same as a resource type corresponding to the transmission direction indication information.

S506: When the identifier of the group in which the vehicle-mounted device is located is one of the group identifiers included in the first information and the transmission direction of the vehicle-mounted device is the same as that in the transmission direction indication information, determine, based on the first information and the first time-frequency resource, to enable the target time-frequency resource.

In this embodiment of this disclosure, after the vehicle-mounted device receives, at least once, the first information that is broadcast by the head unit and that carries the to-be-offset, the at least one group identifier, the transmission direction indication information, and the quantity of remaining transmitted times (or the synchronization indication information), the vehicle-mounted device first determines whether the identifier of the group in which the vehicle-mounted device is located belongs to the group identifier included in the first information. If the identifier does not belong to the group identifier, the vehicle-mounted device ignores this broadcast. If the identifier belongs to the group identifier, the vehicle-mounted device determines whether the transmission direction corresponding to the vehicle-mounted device is the same as that in the transmission direction indication information. If the directions are different, the vehicle-mounted device ignores this broadcast. If the directions are the same, the vehicle-mounted device determines the target time-frequency resource based on the first information and the first time-frequency resource, and enables the target time-frequency resource when the quantity of remaining transmitted times is 0 or when a condition of the synchronization indication information is met. For a specific operation manner, refer to related descriptions in S205 in the embodiment in FIG. 6. Details are not described herein again.

It should be noted that, a difference between S506 and S205 in the embodiment in FIG. 6 lies in that the identifier of the group in which the vehicle-mounted device corresponding to the target time-frequency resource is located belongs to the group identifier included in the first information, and the transmission direction of the vehicle-mounted device corresponding to the target time-frequency resource is consistent with that in the transmission direction indication information in the first information.

It should be noted that S505 and S506 are performed synchronously.

S507: The head unit communicates with the vehicle-mounted device corresponding to the transmission direction indication information in the at least one group identifier on the target time-frequency resource.

In this embodiment of this disclosure, the vehicle-mounted device corresponding to the transmission direction indication information in the at least one group identifier performs communication on the target time-frequency resource. For a specific communication manner, refer to related descriptions of S406 in the embodiment in FIG. 12. Details are not described herein again.

It should be noted that, in S406 in the embodiment in FIG. 12, the vehicle-mounted device that communicates with the head unit is the vehicle-mounted device corresponding to the transmission direction indication information. However, a difference between S507 and S406 lies in that the vehicle-mounted device that communicates with the head unit is the vehicle-mounted device corresponding to the transmission direction indication information in the at least one group identifier.

It may be learned that, in this embodiment of this disclosure, when the current time-frequency resource used by the at least one vehicle-mounted device is interfered with, the head unit adjusts the current time-frequency resource in at least one dimension of time domain and frequency domain based on the interference status to obtain a new time-frequency resource, thereby effectively reducing or even eliminating interference, and improving performance and quality of data transmission between the head unit in a vehicle and the vehicle-mounted device. In addition, the vehicle-mounted devices are grouped and the transmission direction of the vehicle-mounted device is limited to assist in time-frequency resource configuration, thereby improving resource configuration flexibility, and improving resource configuration efficiency.

The following further describes the method in the embodiment in FIG. 14 by using some specific application scenarios.

Figure 15A:
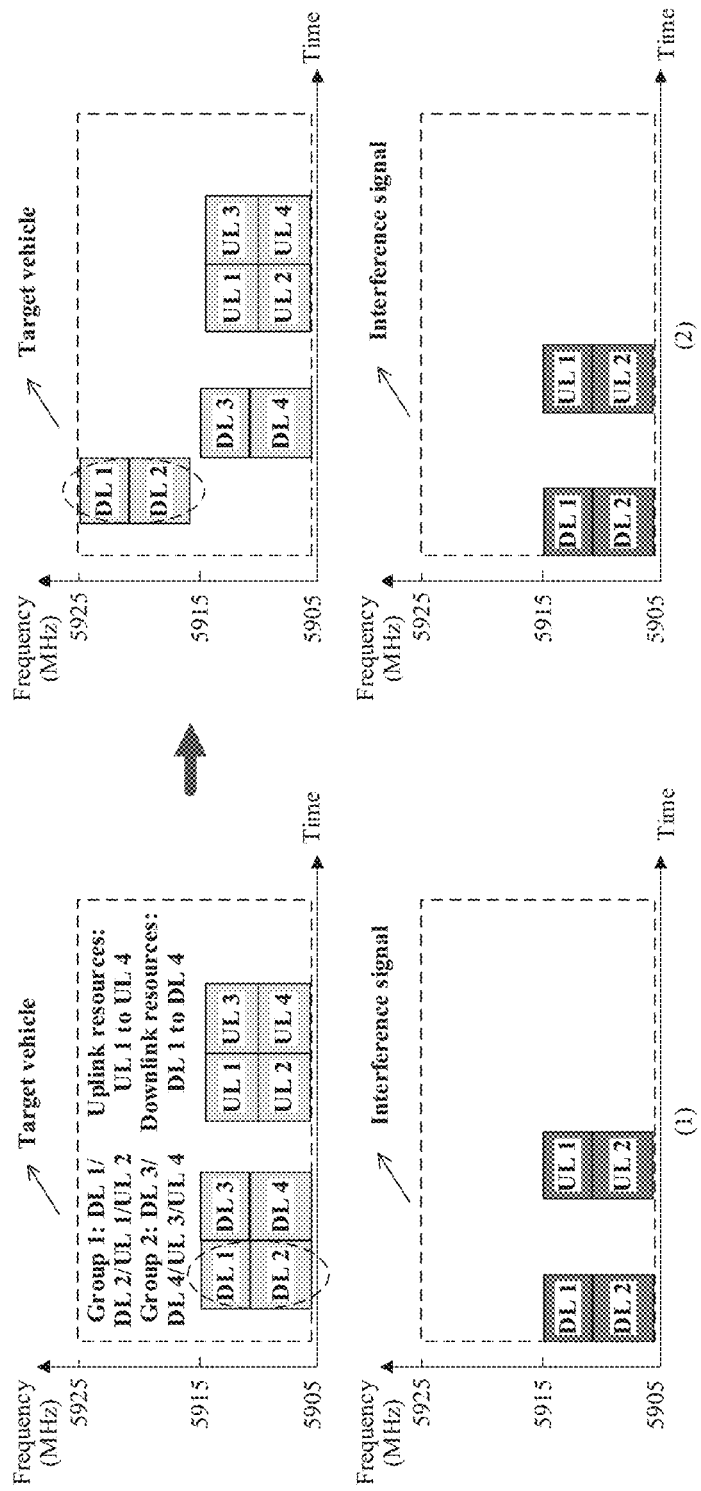
FIG. 15A is a schematic diagram of performing frequency domain offset on a time-frequency resource according to an embodiment of this disclosure.
Figure 15B:
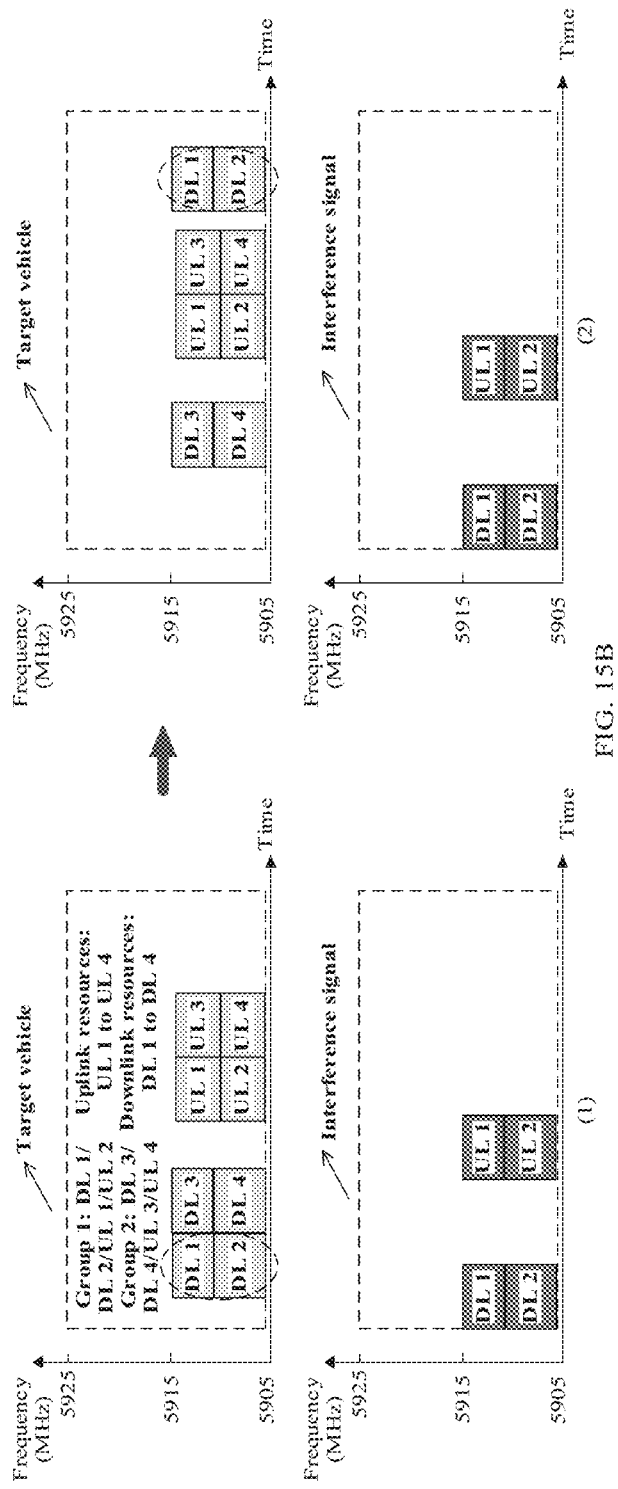
FIG. 15B is a schematic diagram of performing time domain offset on a time-frequency resource according to an embodiment of this disclosure.
Figure 15C:
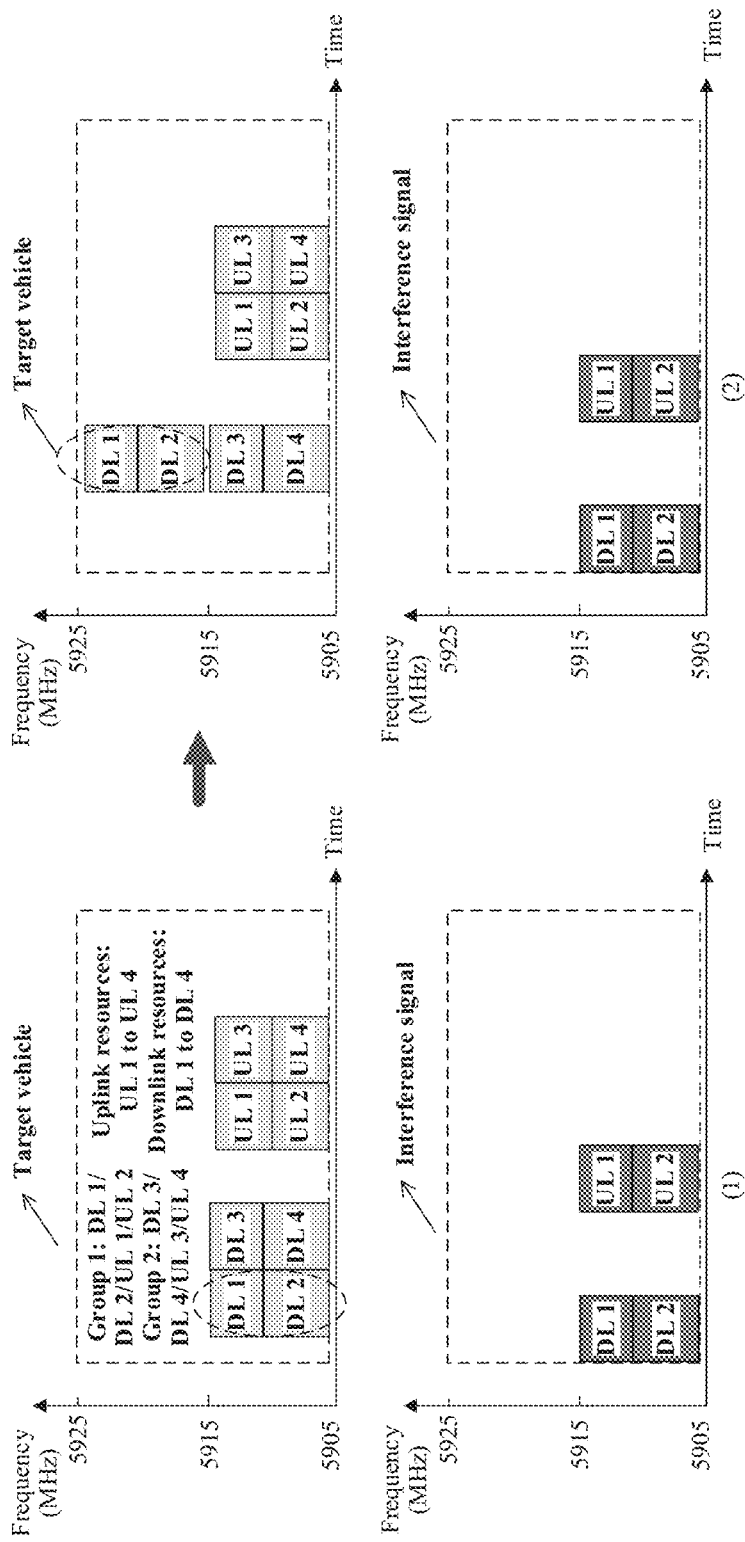
FIG. 15C is a schematic diagram of performing time-frequency offset on a time-frequency resource according to an embodiment of this disclosure.

In FIG. 15A to FIG. 15C, dark-color blocks represent second time-frequency resources corresponding to an interference signal, and light-color blocks represent time-frequency resources used by a plurality of vehicle-mounted devices. In (1) in FIG. 15A, (1) in FIG. 15B, and (1) in FIG. 15C, time-frequency resources marked by a dashed-line ellipse is first time-frequency resources. In (2) in FIG. 15A, (2) in FIG. 15B, and (2) in FIG. 15C, time-frequency resources marked by a dashed-line ellipse are target time-frequency resources, and correspond to the first time-frequency resources. It can be seen from FIG. 15A to FIG. 15C that the first time-frequency resources overlap the second time-frequency resources, and the first time-frequency resources are interfered with. UL indicates a vehicle-mounted device (referred to as an uplink device) used for uplink transmission, and corresponds to an uplink time-frequency resource (referred to as an uplink resource below). DL indicates a vehicle-mounted device (referred to as a downlink device) used for downlink transmission, and corresponds to a downlink time-frequency resource (referred to as a downlink resource below). Different numbers following DL or UL indicate different vehicle-mounted devices. Uplink resources are UL 1, UL 2, UL 3, and UL 4, and downlink resources are DL 1, DL 2, DL 3, and DL 4. A system bandwidth is set to be 20 M, for example, from 5905 MHz to 5925 MHz. A dashed-line rectangular box is used to more obviously display a change of a time-frequency location of the first time-frequency resource in FIG. 15A to FIG. 15C.

In FIG. 15A to FIG. 15C, it is easily known, based on a quantity of light-color blocks, that there are eight vehicle-mounted devices wirelessly connected to a head unit. The eight cascaded devices are classified into two groups, and each group has four vehicle-mounted devices. Vehicle-mounted devices corresponding to a group number 1 are DL 1, DL 2, UL 1, and UL 2, and vehicle-mounted devices corresponding to a group number 2 are DL 3, DL 4, UL 3, and UL 4. It can be seen that each group has two uplink devices and two downlink devices. It should be noted that a time-frequency resource corresponding to an uplink device is an uplink resource, and a time-frequency resource corresponding to a downlink device is a downlink resource.

Refer to (1) in FIG. 15A. The first time-frequency resources are interfered with, and an overlapping frequency domain range is from 5905 MHz to 5915 MHz. Group numbers corresponding to two vehicle-mounted devices corresponding to the first time-frequency resources are the group number 1, and the first time-frequency resources are downlink resources. Refer to (2) in FIG. 15A. The first time-frequency resources may be offset in frequencies to avoid interference from the second time-frequency resources, that is, the downlink resources (namely, the DL 1 and the DL 2) with the group number 1 in (1) in FIG. 15A are offset by 10 MHz in frequency domain in a frequency increase direction to obtain the target time-frequency resources (namely, the DL 1 and the DL 2) in (2) in FIG. 15A, so that the target time-frequency resources whose frequency domain range is from 5915 MHz to 5925 MHz do not overlap the second time-frequency resources, thereby eliminating interference.

In (1) in FIG. 15B, the first time-frequency resources are interfered with. For related descriptions of the first time-frequency resources, refer to related descriptions in (1) in FIG. 15A. Details are not described herein again. Refer to (2) in FIG. 15B. The first time-frequency resources may be offset in time to avoid interference from the second time-frequency resources, that is, the downlink resources (namely, the DL 1 and the DL 2) in the group number 1 in (1) in FIG. 15B are offset in time domain in a time delay direction to obtain the target time-frequency resources (namely, the DL 1 and the DL 2) in (2) in FIG. 15B, so that the target time-frequency resources do not overlap the second time-frequency resources, thereby eliminating interference.

In (1) in FIG. 15C, the first time-frequency resources are interfered with. For related descriptions of the first time-frequency resources, refer to related descriptions in (1) in FIG. 15A. Details are not described herein again. Refer to (2) in FIG. 15C. The first time-frequency resources may be offset in both frequencies and time to avoid interference from the second time-frequency resources, that is, the downlink resources (namely, the DL 1 and the DL 2) in the group number 1 in (1) in FIG. 15C are offset in both time domain and frequency domain to obtain the target time-frequency resources (namely, the DL 1 and the DL 2) in (2) in FIG. 15C, so that the target time-frequency resources do not overlap the second time-frequency resources, thereby eliminating interference.

It should be noted that, in FIG. 15A to FIG. 15C, when idle time-frequency resources are insufficient, it is also feasible when the target time-frequency resources determined in (2) in FIG. 15A, (2) in FIG. 15B, and (2) in FIG. 15C overlap the second time-frequency resources, but an overlapping part is less than an overlapping part between the first time-frequency resources and the second time-frequency resources in (1) in FIG. 15A, (1) in FIG. 15B, and (1) in FIG. 15C, and this effectively reduces interference.

Figure 16:
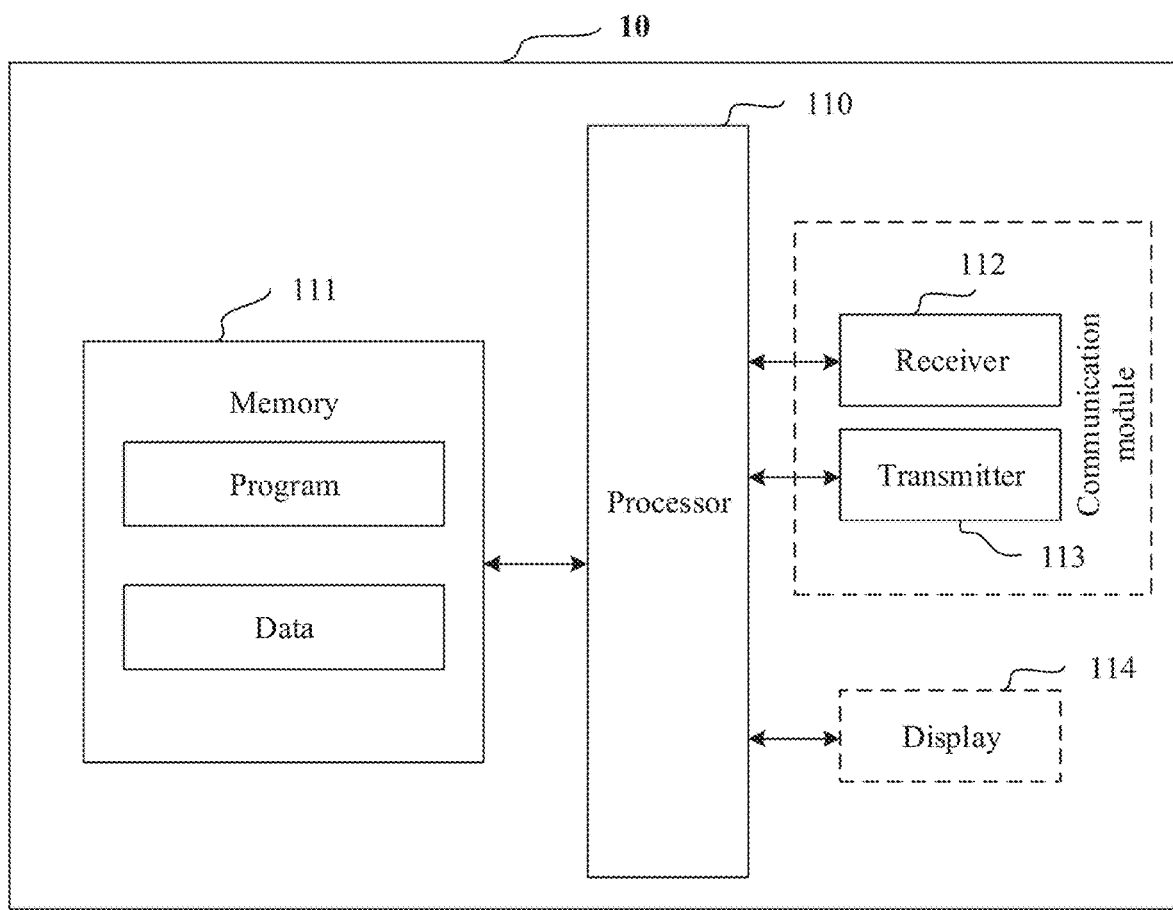
FIG. 16 is a schematic diagram of a structure of an apparatus according to an embodiment of this disclosure.

Refer to FIG. 16. FIG. 16 is a schematic diagram of a structure of an apparatus according to an embodiment of this disclosure. The apparatus 10 includes at least a processor 110, a memory 111, a receiver 112, and a transmitter 113. The receiver 112 and the transmitter 113 may also be replaced with a communications interface configured to provide information input and/or output for the processor 110. Optionally, the memory 111, the receiver 112, the transmitter 113, and the processor 110 are connected or coupled through a bus. Optionally, in some possible embodiments, the apparatus 10 further includes a display 114, and the display 114 is connected to the processor 110 through a bus. The apparatus 10 may be the first apparatus in the embodiment in FIG. 4. The apparatus 10 may be a CDC in a vehicle or another device that can manage and coordinate a wireless resource, or an element in the CDC or the device, for example, a chip or an integrated circuit. The CDC may also be referred to as a head unit. Hardware of the apparatus 10 is described herein by using the head unit as an example.

The receiver 112 is configured to receive data from at least one vehicle-mounted device, for example, a voice signal or an image signal. The receiver 112 is further configured to receive interference indication information sent by the at least one vehicle-mounted device, where the interference indication information indicates that a current time-frequency resource is interfered with.

The transmitter 113 is configured to send first information to the at least one vehicle-mounted device, and send data, for example, an audio signal or a time-frequency signal, to the at least one vehicle-mounted device on a new time-frequency resource. The receiver 112 and the transmitter 113 may include an antenna and a chip set that are configured to communicate with a vehicle-mounted device (or a vehicle-mounted audio and video device), a sensor, or another entity device in the vehicle directly or through an air interface. The transmitter 113 and the transceiver 112 form a communication module. The communication module may be configured to receive and send information based on one or more other types of wireless communication (for example, protocols), and the wireless communication is, for example, BLUETOOTH, the Institute of Electrical and Electronics Engineers (IEEE) 802.11 communications protocols, a cellular technology, worldwide interoperability for microwave access (WIMAX) or Long-Term Evolution (LTE), a ZIGBEE protocol, dedicated short-range communications (DSRC), and radio frequency identification (RFID) communications.

The display 114 is configured to receive user input and display information entered by a user and information provided by the head unit for the user. The display 114 may be a liquid-crystal display (LCD), an inorganic or organic light-emitting diode (LED) (OLED), an active-matrix OLED (AMOLED), or the like.

For specific implementations of operations performed by the processor 110, refer to the specific operations of determining the to-be-offset, the transmission direction indication information, and the at least one group identifier in the foregoing method embodiments. The processor 110 may include one or more general-purpose processors, for example, a central processing unit (CPU), or a combination of a CPU and a hardware chip. The hardware chip may be an application-specific integrated circuit (ASIC), a programmable logic device (PLD), or a combination thereof. The PLD may be a complex PLD (CPLD), a field-programmable gate array (FPGA), generic array logic (GAL), or any combination thereof.

The memory 111 may include a volatile memory, for example, a random-access memory (RAM). The memory 111 may also include a non-volatile memory, for example, a read-only memory (ROM), a flash memory, a hard disk drive (HDD), or a solid-state drive (SSD). The memory 111 may further include a combination of the foregoing types of memories. The memory 111 may store a program and data. The stored program includes a time-frequency resource reconfiguration program, an interference monitoring program, and the like. The stored data includes a broadcast period, a quantity of remaining transmitted times, a quantity of to-be-offsets, group identifier information corresponding to a vehicle-mounted device (or a cascaded device), transmission direction indication information, a time-frequency location of an interference signal, and the like. The memory 111 may exist independently, or may be integrated into the processor 110.

In this embodiment of this disclosure, the controller 110 is further configured to invoke the program code and the data in the memory 111, to perform the method on the first apparatus side (or the head unit side) described in embodiments in FIG. 4, FIG. 6, FIG. 10, FIG. 12, and FIG. 14.

Figure 17:
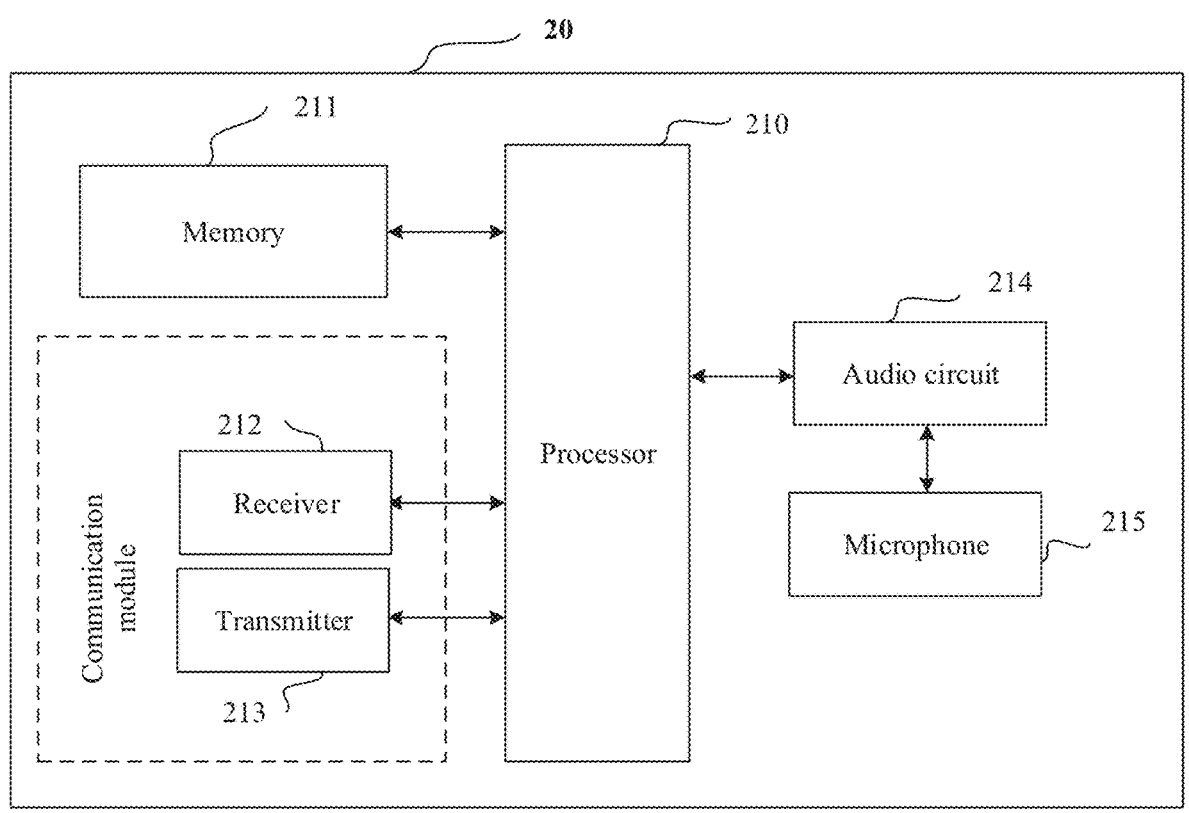
FIG. 17 is a schematic diagram of a structure of an apparatus according to an embodiment of this disclosure.

Refer to FIG. 17. FIG. 17 is a schematic diagram of a structure of an apparatus according to an embodiment of this disclosure. The apparatus 20 includes at least a processor 210, a memory 211, a receiver 212, a transmitter 213, an audio circuit 214, and a microphone 215. The receiver 212 and the transmitter 213 may also be replaced with a communications interface configured to provide information input and/or output for the processor 20. Optionally, the memory 211, the receiver 212, the transmitter 213, the audio circuit 214, the microphone 215, and the processor 210 are connected or coupled through a bus. The apparatus 20 is the second apparatus in the embodiment in FIG. 4. The apparatus 20 may be a vehicle-mounted device (for example, a speaker, a microphone, a camera, or a display), a non-vehicle-mounted device such as a mobile phone, or a headset, another device that can perform communication with the first apparatus, or an element in the foregoing device, for example, a chip or an integrated circuit Hardware of the apparatus 20 is described herein by using a vehicle-mounted device configured to send data to the head unit as an example.

The receiver 212 is configured to receive first information sent by the head unit and receive data sent by the head unit on a new time-frequency resource, for example, an audio signal or a voice signal. The transmitter 213 is configured to send interference indication information to the head unit, where the interference indication information indicates that a current time-frequency resource is interfered with. The receiver 212 and the transmitter 213 may include an antenna and a chip set that are configured to communicate with the head unit or another entity device in a vehicle directly or through an air interface. The receiver 212 and the transmitter 213 form a communication module. The communication module may be configured to receive and send information based on one or more other types of wireless communication (for example, protocols), and the wireless communication is, for example, BLUETOOTH, IEEE 802.11 communications protocols, a cellular technology, WIMAX or LTE, a ZIGBEE protocol, DSRC, and RFID communications.

The microphone 215 converts collected audio data (for example, a voice signal) into an electrical signal corresponding to the audio data, and outputs the electrical signal to the audio circuit 214.

The audio circuit 214 converts the received electrical signal output by the microphone 215 into corresponding audio data, and outputs the audio data to the processor 210 for subsequent processing.

For specific implementations of operations performed by the processor 210, refer to the specific operation such as performing offset on a corresponding time-frequency resource based on at least one of the to-be-offset, the transmission direction indication information, and the at least one group identifier, and the operation such as detecting interference on the current time-frequency resource in the foregoing method embodiments. The processor 210 may include one or more general-purpose processors, for example, CPU, or a combination of a CPU and a hardware chip. The hardware chip may be an ASIC, a PLD, or a combination thereof. The PLD may be a CPLD, an FPGA, GAL, or any combination thereof.

The memory 211 may include a volatile memory, for example, a RAM. The memory 211 may also include a non-volatile memory, for example, a ROM, a flash memory, a hard disk drive (HDD), or an SSD. The memory 211 may further include a combination of the foregoing types of memories. The memory 211 may store a program and data. The stored program includes a time-frequency resource offset program, a channel estimation program, and the like. The stored data includes a broadcast period, a quantity of remaining transmitted times, a quantity of to-be-offsets, an identifier of a group in which a vehicle-mounted device (or a cascaded device) is located, transmission direction indication information, interference indication information, and the like. The memory 211 may exist independently, or may be integrated into the processor 210.

In this embodiment of this disclosure, the controller 210 is further configured to invoke the program code and the data in the memory 211, to perform the method on the second apparatus side (or the vehicle-mounted device side) in embodiments in FIG. 4, FIG. 6, FIG. 10, FIG. 12, and FIG. 14.

Figure 18:
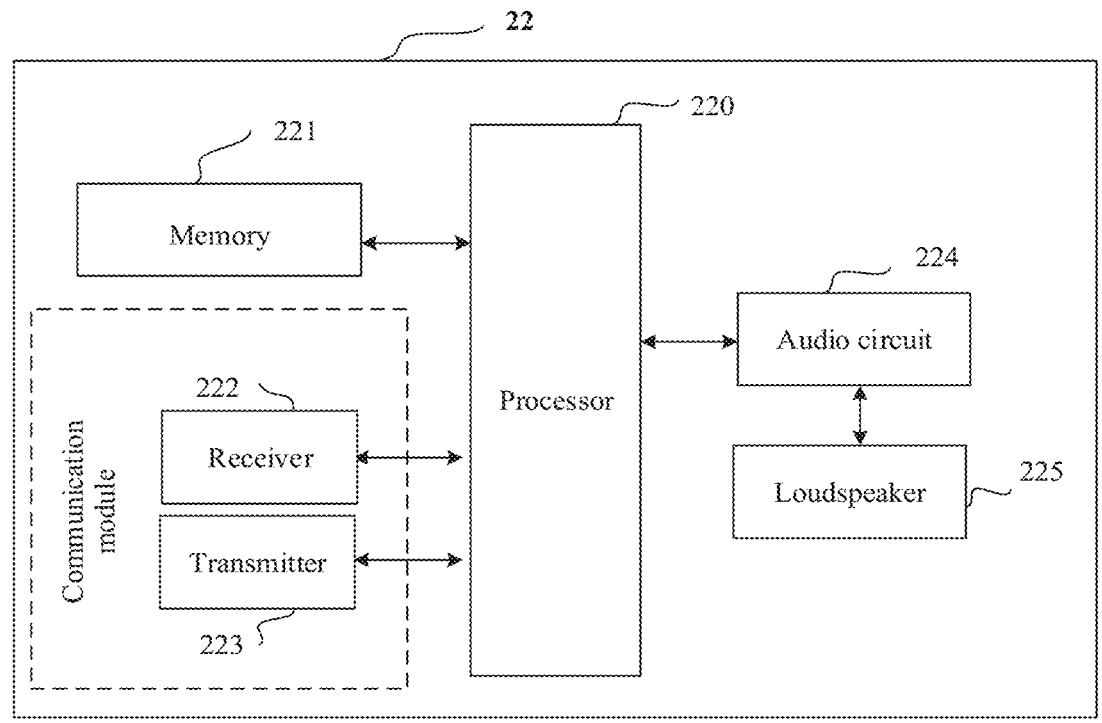
FIG. 18 is a schematic diagram of a structure of another apparatus according to an embodiment of this disclosure.

Refer to FIG. 18. FIG. 18 is a schematic diagram of a structure of another apparatus according to an embodiment of this disclosure. The apparatus 22 includes at least a processor 220, a memory 221, a receiver 222, a transmitter 223, an audio circuit 224, and a loudspeaker 225. The receiver 222 and the transmitter 223 may also be replaced with a communications interface configured to provide information input and/or output for the processor 220. Optionally, the memory 221, the receiver 222, the transmitter 223, the audio circuit 224, the loudspeaker 225, and the processor 220 are connected or coupled through a bus. The apparatus 22 is the second apparatus in the embodiment in FIG. 4. Hardware of the apparatus 22 is described herein by using a vehicle-mounted device configured to receive data from the head unit as an example.

The receiver 222 is configured to receive first information sent by the head unit and further configured to receive data sent by the head unit on a new time-frequency resource, for example, an audio signal or a voice signal. The transmitter 223 is configured to send interference indication information to the head unit, where the interference indication information indicates that a current time-frequency resource is interfered with. The receiver 222 and the transmitter 223 may include an antenna and a chip set that are configured to communicate with the head unit or another entity device in a vehicle directly or through an air interface. The receiver 222 and the transmitter 223 form a communication module. The communication module may be configured to receive information based on one or more other types of wireless communication (for example, protocols), and the wireless communication is, for example, BLUETOOTH, IEEE 802.11 communications protocols, a cellular technology, WIMAX or LTE, a ZIGBEE protocol, DSRC, and RFID communications.

The audio circuit 224 converts audio data, such as an audio signal or a voice signal, received by the receiver 222 into an electrical signal corresponding to the audio data, and transmits the electrical signal to the loudspeaker 225.

The loudspeaker 225 converts the electrical signal that is about the audio data and that is output by the audio circuit 224 into a sound signal for output. The loudspeaker 225 includes a magnet, a frame, a damper, and a cone.

For specific implementations of operations performed by the processor 220, refer to the specific operation such as performing offset on a corresponding time-frequency resource based on at least one of the to-be-offset, the transmission direction indication information, and the at least one group identifier, and the operation such as monitoring interference on the current time-frequency resource in the foregoing method embodiments. The processor 220 may include one or more general-purpose processors, for example, a CPU, or a combination of a CPU and a hardware chip. The hardware chip may be an ASIC, a PLD, or a combination thereof. The PLD may be a CPLD, an FPGA, GAL, or any combination thereof.

The memory 221 may include a volatile memory, for example, a RAM. The memory 221 may also include a non-volatile memory, for example, a ROM, a flash memory, an HDD, or an SSD. The memory 221 may further include a combination of the foregoing types of memories. The memory 221 may store a program and data. The stored program includes a time-frequency resource offset program, a channel estimation program, and the like. The stored data includes a broadcast period, a quantity of remaining transmitted times, a quantity of to-be-offsets, an identifier of a group in which a vehicle-mounted device (or a cascaded device) is located, transmission direction indication information, and the like. The memory 221 may exist independently, or may be integrated into the processor 220.

In this embodiment of this disclosure, the controller 220 is further configured to invoke the program code and the data in the memory 221, to perform the method on the second apparatus side (or the vehicle-mounted device side) in embodiments in FIG. 4, FIG. 6, FIG. 10, FIG. 12, and FIG. 14.

Figure 19:
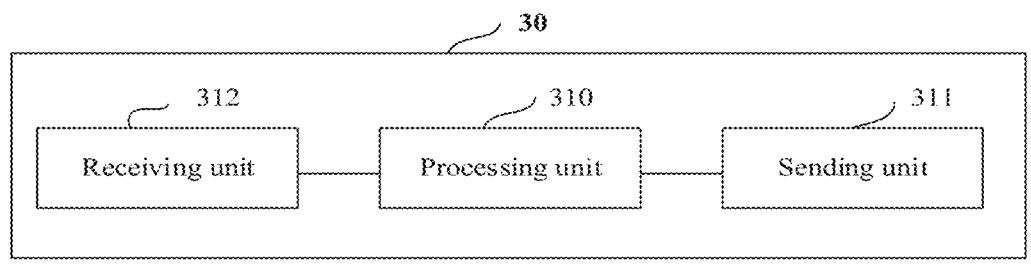
FIG. 19 is a schematic diagram of a function structure of an apparatus according to an embodiment of this disclosure.

Refer to FIG. 19. FIG. 19 is a schematic diagram of a function structure of an apparatus according to an embodiment of this disclosure. The apparatus 30 includes a processing unit 310, a sending unit 311, and a receiving unit 312. The apparatus 30 may be implemented by using hardware, software, or a combination of software and hardware.

The processing unit 310 is configured to determine a first time-frequency resource used by at least one second apparatus. The processing unit 310 is further configured to determine a target time-frequency resource used by the at least one second apparatus. The sending unit 311 is configured to send first information, where the first information is used to indicate at least one of a first time domain resource offset and a first frequency domain resource offset, the first time domain resource offset is an offset from the first time-frequency resource to the target time-frequency resource in time domain, and/or the first frequency domain resource offset is an offset from the first time-frequency resource to the target time-frequency resource in frequency domain. The processing unit 310 is further configured to detect an interference signal on the first time-frequency resource. The receiving unit 312 is configured to receive interference indication information from the at least one second apparatus, where the interference indication information indicates that the first time-frequency resource is interfered with.

The function modules of the apparatus 30 may be configured to implement the method on the first apparatus side in the embodiment in FIG. 4. In the embodiment in FIG. 4, the processing unit 310 may be configured to perform S101 and S102, the sending unit 311 may be configured to perform S103, and the sending unit 311 and the receiving unit 312 may be configured to perform S105. The receiving unit 312 may be configured to perform S201 in the embodiment in FIG. 6. The function modules of the apparatus 30 may be configured to perform the methods on the head unit side in embodiments in FIG. 6, FIG. 10, FIG. 12, and FIG. 14. For brevity of the specification, details are not described herein again in this disclosure.

Figure 20:
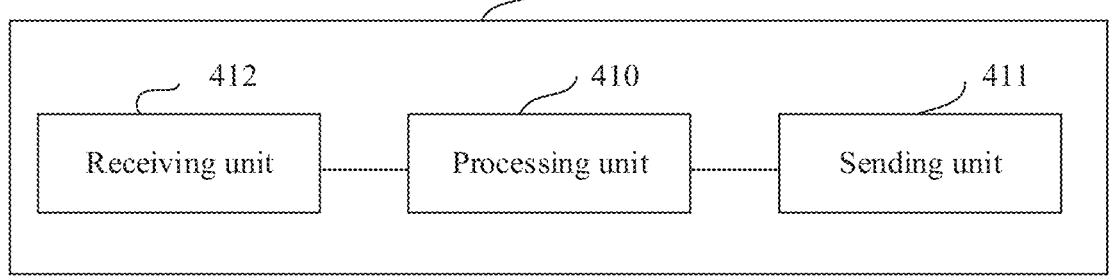
FIG. 20 is a schematic diagram of a function structure of another apparatus according to an embodiment of this disclosure.

Refer to FIG. 20. FIG. 20 is a schematic diagram of a function structure of an apparatus according to an embodiment of this disclosure. The apparatus 40 includes a processing unit 410, a sending unit 411, and a receiving unit 412. The apparatus 40 may be implemented by using hardware, software, or a combination of software and hardware.

The receiving unit 412 is configured to receive first information from a first apparatus, where the first information is used to indicate at least one of a first time domain resource offset and a first frequency domain resource offset. The processing unit 410 is configured to determine a target time-frequency resource based on a first time-frequency resource and the first information, where the first time domain resource offset is an offset from the first time-frequency resource to the target time-frequency resource in time domain, and/or the first frequency domain resource offset is an offset from the first time-frequency resource to the target time-frequency resource in frequency domain. The processing unit 410 is further configured to detect an interference signal on the first time-frequency resource. The sending unit 411 is configured to send interference indication information to the first apparatus, where the interference indication information indicates that the first time-frequency resource is interfered with.

The function modules of the apparatus 40 may be configured to implement the method on the second apparatus side in the embodiment in FIG. 4. In the embodiment in FIG. 4, the processing unit 410 may be configured to perform S104, the receiving unit 412 may be configured to perform S104, and the sending unit 411 and/or the receiving unit 412 may be configured to perform S105. The sending unit 411 may be configured to perform S201 in the embodiment in FIG. 6. The function modules of the apparatus 40 may be configured to perform the methods on the vehicle-mounted device side in embodiments in FIG. 6, FIG. 10, FIG. 12, and FIG. 14. For brevity of the specification, details are not described herein again in this disclosure.

An embodiment of this disclosure further provides a vehicle-mounted system. The vehicle-mounted system includes a first apparatus, for example, a head unit. Further, optionally, the vehicle-mounted system further includes at least one second apparatus, for example, at least one vehicle-mounted device. The head unit may be the apparatus in the embodiment in FIG. 16, or may be the apparatus in the embodiment in FIG. 19. Further, optionally, the vehicle-mounted device may be the apparatus in the embodiment in FIG. 17 or the apparatus in the embodiment in FIG. 18, or may be the apparatus in the embodiment in FIG. 20.

An embodiment of this disclosure further provides a vehicle, and the vehicle includes the foregoing vehicle-mounted system.

In the foregoing embodiments in this specification, the description of each embodiment has respective focuses. For a part that is not described in detail in an embodiment, refer to related descriptions in other embodiments.

It should be noted that, a person of ordinary skill in the art may understand that, all or some of the steps in methods of the foregoing embodiments may be implemented by a program instructing related hardware. The program may be stored in a computer-readable storage medium. The storage medium includes a ROM, a RAM, a programmable ROM (PROM), an erasable PROM (EPROM), a one-time PROM (OTPROM), an electrically-EPROM (EEPROM), a compact disc (CD) ROM (CD-ROM), or another optical disk memory, magnetic disk memory, magnetic tape memory, or any other computer-readable medium that can be configured to carry or store data.

The technical solutions of this disclosure essentially, or the part contributing to the conventional technology, or all or some of the technical solutions may be implemented in a form of a software product. The computer software product is stored in a storage medium and includes several instructions for instructing a device (which may be a personal computer, a server, or a network device, a robot, a single-chip microcomputer, a chip, a robot, or the like) to perform all or some of the steps of the methods described in embodiments of this disclosure.

What is claimed is:

1. A method comprising:
   determining a target time-frequency resource used by at least one apparatus when a first time-frequency resource used by the at least one apparatus is interfered with; and
   sending first information indicating a first time domain resource offset and a first frequency domain resource offset,
   wherein the first time domain resource offset is from the first time-frequency resource to the target time-frequency resource in a time domain, and
   wherein the first frequency domain resource offset is from the first time-frequency resource to the target time-frequency resource in a frequency domain.

2. The method of claim 1, further comprising:
   detecting an interference signal on the first time-frequency resource; and
   receiving, from the at least one apparatus, interference indication information indicating that the first time-frequency resource is interfered with.

3. The method of claim 1, wherein the first information comprises enabling indication information indicating an enabled moment of the target time-frequency resource.

4. The method of claim 3, wherein the enabling indication information comprises duration information indicating the enabled moment.

5. The method of claim 3, wherein the enabling indication information comprises count information comprising a quantity of remaining transmitted times of broadcast information that carries the first information.

6. The method of claim 1, wherein the first information comprises a group identifier of a group of which the at least one apparatus is a member.

7. The method of claim 1, wherein the first information comprises transmission direction indication information, and wherein:
   the first time-frequency resource and the target time-frequency resource are uplink time-frequency resources when the transmission direction indication information indicates an uplink direction;
   the first time-frequency resource and the target time-frequency resource are downlink time-frequency resources when the transmission direction indication information indicates a downlink direction; and
   the first time-frequency resource and the target time-frequency resource comprise an uplink time-frequency resource and a downlink time-frequency resource when the transmission direction indication information indicates the uplink direction and the downlink direction.

8. The method of claim 1, wherein the first information comprises transmission direction indication information and a group identifier of a group of which the at least one apparatus is a member, and wherein:
   the first time-frequency resource and the target time-frequency resource are uplink time-frequency resources when the transmission direction indication information indicates an uplink direction;
   the first time-frequency resource and the target time-frequency resource are downlink time-frequency resources when the transmission direction indication information indicates a downlink direction; and
   the first time-frequency resource and the target time-frequency resource comprise an uplink time-frequency resource and a downlink time-frequency resource when the transmission direction indication information indicates the uplink direction and the downlink direction.

9. The method of claim 1, wherein the first frequency domain offset is a first integer multiple of a frequency domain range of a minimum time-frequency resource unit, and wherein the first time domain offset is a second integer multiple of a time domain range of the minimum time-frequency resource unit.

10. A method comprising:
sending, to a first apparatus, interference indication information indicating that a first time-frequency resource is interfered with;
receiving, from the first apparatus, first information indicating a first time domain resource offset and a first frequency domain resource offset; and
determining a target time-frequency resource based on the first time-frequency resource and the first information,
wherein the first time domain resource offset is from the first time-frequency resource to the target time-frequency resource in a time domain, and
wherein the first frequency domain resource offset is from the first time-frequency resource to the target time-frequency resource in a frequency domain.

11. The method of claim 10, wherein the first information comprises enabling indication information indicating an enabled moment of the target time-frequency resource.

12. The method of claim 11, wherein the enabling indication information comprises duration information indicating the enabled moment.

13. The method of claim 11, wherein the enabling indication information comprises count information comprising a quantity of remaining transmitted times of broadcast information that carries the first information.

14. The method of claim 10, wherein the first information comprises at least one group identifier, and wherein a first identifier of a group in which a second apparatus corresponding to the first time-frequency resource and the target time-frequency resource is located belongs to one of the at least one group identifier.

15. The method of claim 10, wherein the first information comprises transmission direction indication information, and wherein:
the first time-frequency resource and the target time-frequency resource are uplink time-frequency resources when the transmission direction indication information indicates an uplink direction;
the first time-frequency resource and the target time-frequency resource are downlink time-frequency resources when the transmission direction indication information indicates a downlink direction; and
the first time-frequency resource and the target time-frequency resource comprise an uplink time-frequency resource and a downlink time-frequency resource when the transmission direction indication information indicates the uplink direction and the downlink direction.

16. The method of claim 10, wherein the first information comprises transmission direction indication information and at least one group identifier, wherein a first identifier of a group in which a second apparatus corresponding to the first time-frequency resource and the target time-frequency resource is located belongs to one of the at least one group identifier, and wherein:
the first time-frequency resource and the target time-frequency resource are uplink time-frequency resources when the transmission direction indication information indicates an uplink direction;
the first time-frequency resource and the target time-frequency resource are downlink time-frequency resources when the transmission direction indication information indicates a downlink direction; and
the first time-frequency resource and the target time-frequency resource comprise an uplink time-frequency resource and a downlink time-frequency resource when the transmission direction indication information indicates the uplink direction and the downlink direction.

17. The method of claim 10, wherein the first frequency domain offset is a first integer multiple of a frequency domain range of a minimum time-frequency resource unit, or wherein the first time domain offset is a second integer multiple of a time domain range of the minimum time-frequency resource unit.

18. A first apparatus comprising:
a processor configured to:
determine a target time-frequency resource used by at least one second apparatus when a first time-frequency resource used by the at least one second apparatus is interfered with; and
a transmitter coupled to the processor and configured to send first information indicating a first time domain resource offset and a first frequency domain resource offset,
wherein the first time domain resource offset is from the first time-frequency resource to the target time-frequency resource in a time domain, and
wherein the first frequency domain resource offset is from the first time-frequency resource to the target time-frequency resource in a frequency domain.

19. The first apparatus of claim 18, wherein the first information comprises enabling indication information indicating an enabled moment of the target time-frequency resource.

20. The first apparatus of claim 19, wherein the enabling indication information comprises duration information indicating the enabled moment.

* * * * *